US011062547B2

(12) United States Patent
Adelberg et al.

(10) Patent No.: US 11,062,547 B2
(45) Date of Patent: Jul. 13, 2021

(54) VENDING STORE INVENTORY MANAGEMENT AND REPORTING SYSTEM

(71) Applicant: NewZoom, LLC, San Francisco, CA (US)

(72) Inventors: Bradley Scott Adelberg, San Francisco, CA (US); Walter David Gower Smith, San Francisco, CA (US); James Henry Hatton, Lafayette, CA (US); Sabarivasan Viswanathan, Fremont, CA (US); Steven Craig Lusardi, San Jose, CA (US)

(73) Assignee: NewZoom, LLC, San Francisco, CA (US)

( * ) Notice: Subject to any disclaimer, the term of this patent is extended or adjusted under 35 U.S.C. 154(b) by 0 days.

(21) Appl. No.: 16/395,155

(22) Filed: Apr. 25, 2019

(65) Prior Publication Data

US 2019/0251776 A1 Aug. 15, 2019

Related U.S. Application Data

(63) Continuation of application No. 12/603,809, filed on Oct. 22, 2009, now Pat. No. 10,319,173.

(60) Provisional application No. 61/107,599, filed on Oct. 22, 2008.

(51) Int. Cl.
| | | |
|---|---|---|
| *G07F 7/00* | (2006.01) | |
| *G07F 9/02* | (2006.01) | |
| *G06Q 10/08* | (2012.01) | |
| *G07F 11/00* | (2006.01) | |
| *G07F 11/62* | (2006.01) | |
| *G07F 9/00* | (2006.01) | |

(52) U.S. Cl.
CPC ............. *G07F 7/00* (2013.01); *G06Q 10/087* (2013.01); *G07F 9/002* (2020.05); *G07F 9/026* (2013.01); *G07F 11/62* (2013.01)

(58) Field of Classification Search
CPC . G07F 7/00; G07F 11/62; G07F 9/026; G07F 9/002; G06Q 10/087
USPC .................................................. 700/231–244
See application file for complete search history.

(56) References Cited

U.S. PATENT DOCUMENTS

| | | | | |
|---|---|---|---|---|
| 5,415,264 A | * | 5/1995 | Menoud ................ | G07F 11/045 194/217 |
| 7,383,099 B2 | * | 6/2008 | Pollard ................... | G07F 17/32 700/232 |
| 7,826,923 B2 | * | 11/2010 | Walker ................... | G06Q 20/20 700/236 |
| 7,894,936 B2 | * | 2/2011 | Walker ................. | G06Q 10/087 700/236 |
| 8,463,447 B2 | * | 6/2013 | Newman .............. | B67D 1/0021 700/283 |

(Continued)

*Primary Examiner* — Michael Collins
(74) *Attorney, Agent, or Firm* — Merchant & Gould P.C.

(57) ABSTRACT

A data center supporting a network system for vending products to customers and associated vending methods are provided. The network system includes a data center and a plurality of vending stores remotely located from the data center and connected to the data center through a network interface. The vending stores also include an automated dispensing mechanism for immediate dispensing of purchased products to the customers. The data center may include an enterprise resource planning module and the vending stores may contain user interfaces for collecting inventory and maintenance data during stocking and maintenance.

20 Claims, 37 Drawing Sheets

(56) References Cited

U.S. PATENT DOCUMENTS

| | | | |
|---|---|---|---|
| 2004/0155752 A1* | 8/2004 | Radke | G06K 9/00013 340/5.53 |
| 2006/0259190 A1* | 11/2006 | Hale | G06Q 10/087 700/234 |
| 2007/0088459 A1* | 4/2007 | Pollard | G07F 17/329 700/234 |
| 2007/0276537 A1* | 11/2007 | Walker | G07F 9/02 700/238 |
| 2008/0249658 A1* | 10/2008 | Walker | G07F 9/02 700/236 |
| 2009/0069934 A1* | 3/2009 | Newman | B67D 1/0021 700/239 |
| 2009/0157220 A1* | 6/2009 | Walker | G07F 9/026 700/232 |

\* cited by examiner

General Ledger

Maintenance
Budget Maintenance
Chart of Accounts Maintenance
Subaccount Maintenance
Allocation Group Maintenance
Ledger Maintenance
Account/Subaccount Maintenance
Extended Budget Maintenance
Budget Distribution
Budget Group Access
Budget Distribution Types
Budget Version Maintenance
Account Class Maintenance

Setup
GL Setup
Extended Budgeting Setup

Input
Journal Transactions

Processes
Release GL Batches
Generate Consolidation
Read Consolidation
Post Transactions
Generate Recurring
Closing
Delete GL Detail
Generate Allocations
GL Integrity Check

Inquiries
Account History
Account Summary Inquiry
Account/Subaccount Summary Inquiry
Account/Subaccount Detail Inquiry

Report
Reprint GL Batch Control Reports
Trial Balance
Detail General Ledger
Chart of Accounts
Subaccounts
Account Classes
GL Transactions
Allocation Groups
Ledgers
Budget Distribution
Out of Balance Exception
Budget Segment Detail
Budget Version Detail
GL Batch Register
GL Edit

Accounts Payable

Maintenance
Document Maintenance
Recurring Voucher Maintenance
Vendor Maintenance
PO Address Maintenance
Vendor Class Maintenance

Setup
AP Setup

Misc.
Blank MICR Laser Checks
MICR Laser Check Reprint
Bank Account Information

Input
Voucher and Adjustment Entry
Quick Voucher and Pre-Payment Entry
Voucher Entry - Distributed Liability
Manual Check Entry
Void Check Entry
Edit/Select Documents For Payment
Check Reconciliation
Pre-Payment Application

Processes
Release AP Batches
Payment Selection
Generate Recurring Vouchers
1099 Calendar Year Control
Delete AP Detail
AP Check Update (Post)
Generate 1099 Magnetic Media
AP Integrity Check
Process AP Landed Cost Batches

Inquiries
Vendor Inquiry
Vendor History

Report
Reprint AP Batch Control Reports
Cash Requirements
Check Preview
Checks
Detailed Remittance Advice
Check Register
AP Transactions
Vendor Trial Balance
Vendor Period Trial Balance
Document Register
Vendors
Vendor History
PO Addresses
Vendor Classes
Aged AP
Period Sensitive Aged AP
Account Distribution
Recurring Vouchers
Check Reconciliation
1099 Preview
1099 Forms
Document History
Unreleased PO Vouchers
AP Batch Register
AP Edit Report
Unreleased AP Batches - Summary

FIG. 5C

Accounts Receivable

Maintenance
Document Maintenance
Customer Maintenance
Shipping Address
Recurring Invoice
Statement Cycle
Customer Class
Salesperson Maintenance
Sales Territory

Setup
AR Setup

Input
Invoice and Memo
Payment Application
Payment Entry

Processes
Release AR Batches
Small Balance/Credit Write Off
Generate Recurring Invoices
Auto Payment Application
Apply Finance Charges
Age Customer Detail
Delete AR Detail
Close Statement Cycle
AR Integrity Check

Inquiries
Customer Inquiry
Application Inquiry/Reversal
Customer History
Salesperson History

Report
Reprint AR Batch Control Reports
Statements
Aged AR
Period Sensitive Aged AR
Customer Trial Balance
Customer Period Trial Balance
Account Distribution
AR Transactions
Customers
Customer History
Document Register
Recurring Invoices
Statement Cycles
Customer Classes
Sales Analysis by Customer
Sales Analysis by Class
Sales Analysis by Salesperson
Sales by Customer
Sales by Commission
Invoice/Memo Forms
Document History
AR Batch Register
AR Edit
Payment Applications

FIG. 5D

Cash Manager

Maintenance
Cash Account Maintenance
Entry Type Maintenance
Recurring Item Maintenance
Cash Flow Maintenance

Setup
CA Setup
Clear Check/Deposit Import Setup

Input
Cash Account Transactions
Cash Account Transfers
Bank Reconciliation

Processes
Release CA Batches
Clear Check/Deposit Data Import
Clear Checks/Deposits
Generate Recurring Transactions
Generate Consolidation File
Read Consolidation File
Delete CA Detail
CA Integrity Check

Inquiries
Daily Cash Balances

Report
Check Register
Daily Cash Balance
Check/Deposit Reconciliation
Unmatched Item List
Bank Reconciliation
Float Analysis
Cash Flow Projection
PTD Transaction List
PTD Distribution List
Cash Accounts List
Entry Type List
Recurring Item List
Cash Flow Items List
Cash Transactions History
Cash Manager Batch Register
CA Edit

FIG. 5E

Fixed Assets

Maintenance
Asset Book Codes
Asset Fund Sources
Asset Locations
Asset Classes
Asset Categories
Asset Retirement Methods
Asset Depreciation Methods

Setup
Fixed Assets Setup

Input
Assets
Asset Transactions

Processes
Asset AP Records
Asset Project Costs
Asset Depreciation
Asset Inventory
FA Integrity Check

Inquiries
Asset Locations History
Fixed Assets Search

Report
Assets
Asset Depreciation Books
Asset Locations History
Asset AP Records
Assets Trial Balance
Assets Period Trial Balance
Auditors Report
Depreciation Transactions
Purchase Transactions
Sales Transactions
Asset Book Codes
Asset Fund Sources
Asset Locations
Asset Classes
Asset Categories
Asset Retirement Methods
Asset Depreciation Methods
Location Status
Asset Labels

FIG. 5F

MaxQ Supply Chain Planning

Maintenance
Distribution Chain Maintenance
Demand Formula Maintenance
Lead Time Formula Maintenance
Planner Maintenance
APN - CPN Maintenance
Item Movement Maintenance

Hierarchy
Heirarchy Viewer
Item Site Maintenance
Site Maintenance
Inventory Maintenance
Material Type Maintenance

Setup
Work Order Id Setup
Supply Chain Planning Setup

Misc.
Site Class Maintenance Ext
Model After Site
OM Transfer Order Process
Post Planning Allocation

Input
Planned Order Entry
Work Order Entry
Additional Safety Stock

Processes
Planned Order Firming
Transaction Creation
Work Order Operations
Item Movement Load
Calculate Replenishment Values
Generate Daily Forecasts
Future Valuation Update
Generate Planned Orders
Generate Action Messages
Create Documents from Order Mgmt
Advance to Invoice
Site One Time Plan

Inquiries
Planning Inquiry
Action Message Inquiry
Forecasted Inventory Valuation

Report
Material Inquiry Report
Action Message Report
Planned Order Report
Open Work Orders Report
Actual vs Forecast Report
Low Level Code Recursion Report

FIG. 5G

Order Management

Maintenance
Order Types
Freight Terms
Payment Types
Credit Managers
Non-Stock Item Maintenance
Item GL Classes
Miscellaneous Charges
Certification Text
Lost Sale Codes
Chain Discounts
User Defaults
Inspection
Customer Contacts
Sales Price
Sales Price Revisions
Item Price Classes
Customer Price Classes
Task Server
Customer Carriers
Task Schedule Setup
Order Management Setup Input
Sales Order Entry
Shippers
Manifest Entry
Shipment Confirmation Processes
Process Manager
Sales Order Deletion
OM Integrity Check
OM Workstation Install Inquiries
Open Closed Sales Orders
Customer Lookup
Shipper Lookup
Booking Display
Customer Service Assistant
Credit Managers Assistant
Shipper Creation Log Viewer
Shipper Update Log Viewer Report
Order Types
Freight Terms
Payment Types
Credit Managers
Item GL Classes
Miscellaneous Charges
Certification Text
Lost Sale Codes
Chain Discounts
User Defaults
Sales Price
Order Confirmation
Quote
Picking List
Kit Assembly
Inspection Order
Receiver Form
Picking Notice
Assembly Notice
Inspection Notice
Packing Notice
Shipping Notice
Packing Slip
Invoice
Consolidated Invoice
Sales Journal
Update Exceptions

FIG. 5H

Purchasing

Maintenance
Landed Cost Codes

Setup
PO Setup

Input
Receipt/Invoice Entry
Purchase Order Maintenance

Processes
Release Receipt Batches
Reprint PO Batch Control Reports
Delete Purchase Orders
PO Integrity Check
Process PO Landed Cost Batches Inquiries
PO Receipts Inquiry
Item/Vendor History Report
PO Receipts Batch
Print Purchase Orders
Print Change Notices
Purchase Order Register
Purchase Order Status/History
Anticipated Deliveries
Receipts Register
Vendor Performance Analysis
Item/Vendor List
Item/Vendor Summary
Unvouchered Receipts
Applied Vouchers
Reorder Point
PO Receipts Edit Report
Return To Vendor
Recommended Reorder
Open Purchase Order List
PO/AP Batch Cross Reference
Landed Cost Codes

FIG. 5I

Shared Information

Maintenance
FOB Maintenance
Carriers Maintenance
Address Maintenance
Ship Via Maintenance
Terms Maintenance
Tax Maintenance
State/Province Maintenance
Country/Region Maintenance
Tax Category Maintenance
Tax Group Maintenance
Material Type Maintenance
Buyer Maintenance
Authority Level Maintenance
Periods To Post Report
Carriers List
Addresses
Address Labels
Ship Via List
Messages
Terms List
Tax List
Tax Detail
FOB List
Tax Category List
Tax Group List
Material Type List
Buyer List
State/Provinces
Countries/Regions
Flexkey Definitions
Flexkey Tables

Setup
Flexkey Definition
Flexkey Table Maintenance

Processes
Apply Tax Changes

FIG. 5J

KeyChange

Processes
KeyChange
Account - Subacct Combinations
Renumber AR Payments
Change Order Numbers
Change Shipper IDs
Invoice - Customer ID Combo
Inventory Lot-Serial Numbers
Project-Task Combinations
Inventory Site-Warehouse Loc
Renumber AP Checks

Setup
KC Setup
KC Initialize

FIG. 5K

| Customer Service Call | |
|---|---|
| Refund Request | |
| Reciept Request | |
| Wrong Item Received | |
| Problem Report (Machine Issue) | |
| Confirm Charge | |
| Other | |
| | Total |

| Internal Request | |
|---|---|
| Other | |
| Dispatch Request-Bring Live | |
| | Total |

| Manual Alert | |
|---|---|
| overdue contact | |
| No Sales | |
| Other | |
| RRS busy | |
| 13** errors | |
| Inventory Issue | |
| Dividers | |
| Card Reader Issue | |
| Printer Error/Out of Paper | |
| clear bin operation unsuccessful | |
| LCD Monitor Issue | |
| Calibration | |
| Rebaseline | |
| Chamber 2 & 3 Lock Issue | |
| Install Publication | |
| Chamber 1 Lock Issue | |
| pin pad did not respond | |
| Tech Meet Requested | |
| bin is full | |
| Bucket/Arm Won't Move | |
| Diagnose Chronic Misvends | |
| Unable to Log In | |
| | Total |

| Non-Urgent Parts Request | #c |
|---|---|
| Other | |
| OOS Signs | |
| Printer paper | |
| Flashcard | |
| Internal Colorways | |
| Brochures | |
| Customer service stickers | |
| RIF Skirts | |
| Brochure Holders | |
| DVR | |
| LCD Monitor | |
| Light bulbs | |
| | Total |

| Tech Call | #c |
|---|---|
| Other | |
| Return Label | |
| Backdoor PIN | |
| Physical Inventory PIN | |
| | Total |

| Urgent Parts Request | #c |
|---|---|
| Dividers | |
| Other | |
| Card Reader | |
| Baseline CD | |
| Bucket | |
| Printer (Other) | |
| RRS Remote | |
| SSB | |
| Hard Drive | |
| Barcode Scanner | |
| Dell 170 | |
| ABP | |
| Airlink Modem | |
| Card Glide Assembly | |
| Card Reader (Other) | |
| Chamber 1 Lock | |
| DVR | |
| Lock Plate | |
| Printer | |
| Pushers | |
| RRS Software | |
| Shelves | |
| | Total |

FIG. 14A

| Satisfactory |
|---|
| Misvend Cleared |
| Overdue Resolved |
| Repaired |
| No Sales Resolved |
| Cleared 13** Error |
| Replaced |
| Inventory Issue Resolved |
| Re-Baseline |
| Modem Rebooted |
| PC Rebooted |
| Divider Installed |
| Printer Repaired |
| Card Reader Replaced |
| CS Issue Resolved |
| Bucket Replaced |
| Install Publication Completed |
| Internal Colorways Repaired |
| Printer Replaced |
| Card Reader Repaired |
| DVR Replaced |
| GFI Switch Reset |
| Touch Screen recalibrated |
| Barcode Scanner Replaced |
| Regional Tech Required |
| SSB Installed |
| Test Purchase Successful |
| Vend Box Replaced |
| ZoomShop is Live |
| ASP Installed |
| Barcode Scanner Cable Replaced |
| Barrel Lock Replaced |
| Broken Divider Replaced |
| Chamber Doors Re-aligned |
| DSL Service Provider Resolved DSL Line |
| DVR Repaired |
| GFI Cable Replaced |
| Modem replaced |
| PC replaced |
| Pusher Installed |
| RRS Calibration Successful |
| Sending Regional Tech |

| Incomplete (create child) |
|---|
| Other |
| Unable to Clear 13** Error |
| Unable to Clear Misvend |
| Unable to Resolve Overdue Store |
| PC Rebooted Unsuccessful |
| Re-Baseline Unsuccessful |
| RRS Calibration Unsuccessful |
| Unable to Replace Barrel Lock |
| Unable to Resolve Inventory Issue |
| Unable to Resolve No Sales Issue |

*FIG. 14B*

Weekly Dashboard

- Roll up of week's sales
  - Sales by Channel
  - Sales vs prior weeks within fiscal month
  - AUS price by channel
  - Units/Transactions
  - Traffic
  - Comp Stores
  - Sales by top 10 SKUs $/units

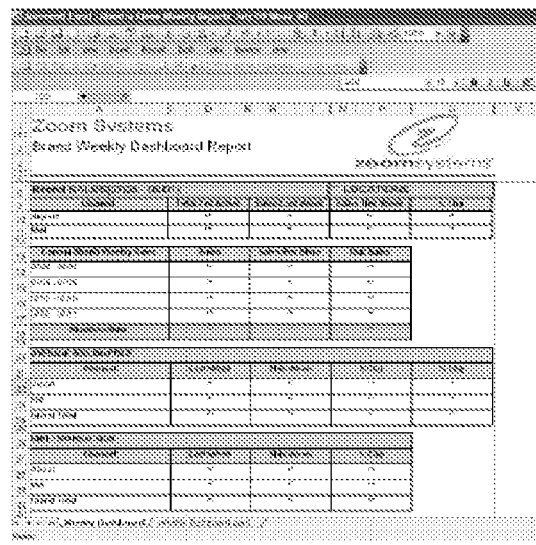

FIG. 21A

Monthly Dashboard

- Roll up of month's sales
  - Sales by Channel
  - Sales vs prior weeks within fiscal month
  - AUS price by channel
  - Units/Transactions
  - Traffic
  - Comp Stores
  - Sales by top 10 SKUs $/units
  - Stores in network trend
  - Average store sales trend

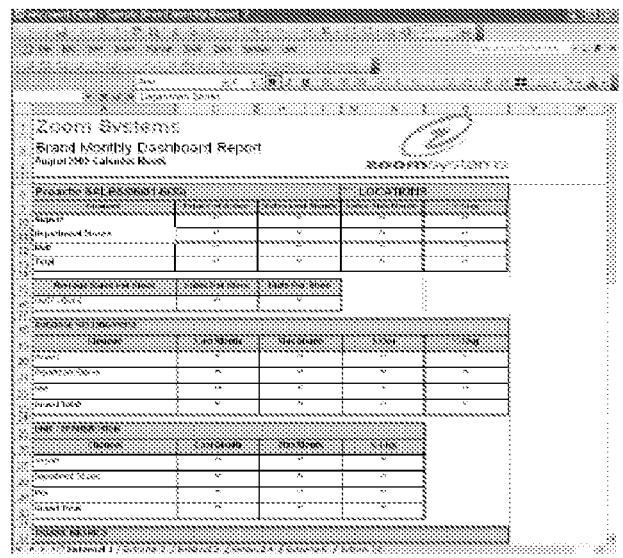

FIG. 21B

Inventory Report

- Snapshot of inventory by SKU, by Store, and DC

Brand - Inventory Report
Week Ending: 8/13/09

FIG. 21C

Customer Information

- Survey Data – General data dump of consumer responses to survey

FIG. 21D

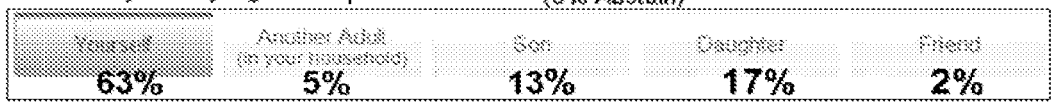
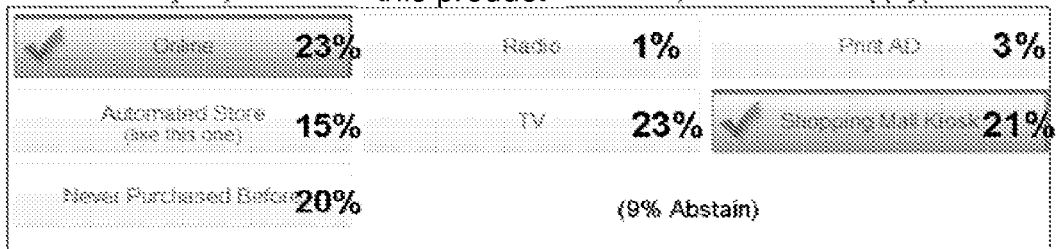
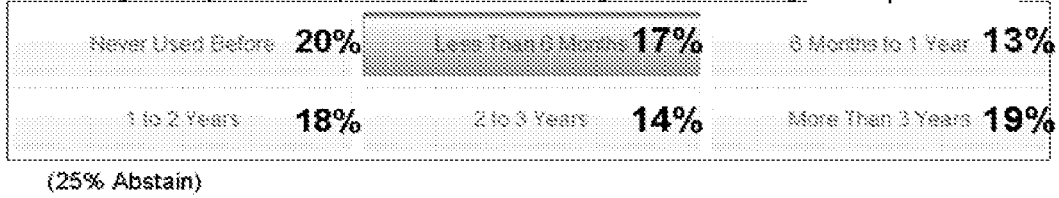
FIG. 21E

VENDING STORE INVENTORY MANAGEMENT AND REPORTING SYSTEM

CROSS-REFERENCE TO RELATED APPLICATIONS

This application is continuation application of U.S. patent application Ser. No. 12/603,809, now issued as U.S. Pat. No. 10,319,173, filed on Oct. 22, 2009, which claims the benefit of U.S. Provisional Application Ser. No. 61/107,599, filed on Oct. 22, 2008, all of which are incorporated herein by reference in their entirety.

TECHNICAL FIELD

The present invention relates generally to methods and apparatus for vending products and, more particularly, to methods and apparatuses for vending products to customers using a vending store remotely located from and connected to a data center.

BACKGROUND

Vending products using automated equipment has gained wide acceptance among retailers and customers. Vending equipment is typically inexpensive to operate and occupies relatively little space in comparison with other retail operations. It does not require much human intervention and supervision, such as store clerks in traditional retail outlets. However, conventional vending machines have limited capabilities suitable for vending inexpensive products, such as soft drinks, candies, and newspapers. It is not uncommon for vending machines to dispense the wrong products or no products at all, but yet contain no mechanism allowing customers to obtain credit or return products. Moreover, restocking merchandise in vending machines is usually performed in a loosely controlled manner at best, frequently resulting in stolen products and products being out of stock. Such deficiencies of vending machines are often tolerated to some degree by the customers because the vended items are low value items and do not involve complex purchasing decisions and transactions.

Vending machines are generally not suitable for vending high value items, such as electronics, software, perfume, and other relatively expensive items. Most consumers are also not comfortable buying expensive products without first collecting relevant product information, assessing various options, and being certain about various aspects of transactions and payment processes. Traditionally, retail clerks were involved in assisting customers with purchasing of such products. However, these tradition retail operations involving clerks have many drawbacks including high costs and large floor space requirements. Many consumers also find that retail clerks lack sufficient knowledge about products and exert excessive selling pressure.

The recent growth of web commerce does not address many identified issues and, in fact, creates some new ones. For example, customers cannot assess physical appearance of actual items that are offered for sale. Reputation of internet retailers can often be hard judge, and customer may be hesitant to tender large payments to unknown entities. Further, products are not immediately available to customers and shipping can take a few days and even weeks. Returns and exchanges tend to be very complex and requires additional shipping.

Overall, there is a need for vending stores that can deliver extensive product information, accept payments, immediately deliver products, and provide other functionalities for vending high value items.

SUMMARY

Certain embodiments pertain to network systems for vending products to customers. Such network systems may include a data center and a plurality of vending stores remotely located from the data center and connected to the data center through a data network, such as the Internet. The vending stores may also be configured to communicate with one or more service providers, such as payment systems, fraud verification services, and membership services. The vending stores hold products that can be dispensed directly and immediately to such customers. In certain designs, the products held in vending stores are visible to the customers. In certain embodiments, vending stores are automated, self-service retail stores that combine the convenience of online shopping with the immediacy of traditional retail. They may employ easy-to-use touch screens and include a network of similar machines.

In certain embodiments, the network system is configured such that a data center can track and control, at least to some measure, chains of custody of high value merchandise from a supplier or distribution center until the merchandise is stocked in one or more vending stores. Much of the process may be automated by, e.g., automatically generating requests to suppliers to fill orders for inventory replenishment at particular vending stores. Further, the vending stores may be outfitted with sophisticated computational and interactive functionality. For example, the vending stores may have user interfaces that prompt stocking and maintenance personnel to take certain actions, such as counting and inputting existing physical inventory in a vending store, entering the amount and type of inventory in a current shipment, identifying discrepancies between actual and estimated inventories of a vending store and an incoming shipment, etc.

In certain embodiments, a data center supporting a network system for vending products to customers from a plurality of vending stores each including a computer system and an interface for communicating with the data center over the network system is provided, The data center may include: one or more data stores for storing inventory information corresponding to inventory in the plurality of vending stores, one or more modules for receiving the inventory information from the plurality of vending stores and processing the inventory information to control inventory in the plurality of vending stores, and a network interface for connecting to the network system. The data center may be configured to connect to network interfaces of the plurality of vending stores over a network.

In one or more of the above embodiments, the one or more modules of the data center are configured to identify vending stores requiring replenishment of products and to send instructions, directly or indirectly, to suppliers or distributors of inventory to deliver particular products to vending stores identified as requiring replenishment. The one or more modules of the data center may be further configured to receive shipment confirmation messages from the suppliers or distributors when a delivery of the particular products is made or initiated.

In one or more of the above embodiments, the data center is configured to generate and upload to the plurality of vending stores user identification information to be used by user interfaces of the plurality of vending stores to determine an identify of stocking personnel. For example, the user identification information may include information for authenticating cards issued to the stocking personnel based on card information, information for authenticating an alphanumeric code entered by the stocking personnel on the user interfaces of the plurality of vending stores, information for authenticating biometric information obtained by a sensor on one of the plurality of vending stores, information for analyzing a photo image and/or a video image captured by a camera of one of the plurality of vending stores, and a combination of thereof. The data center may be configured to generate and upload to the plurality of vending stores vending store access information, which controls access to certain regions of at least one vending store in the plurality of vending stores on information provided by the stocking personnel.

In one or more of the above embodiments, the data store is configured to generate and upload to the plurality of vending stores inventory delivery information, which is used by the plurality of vending stores to prompt stocking personnel to confirm deliveries of shipments of merchandise when said personnel stock the shipment of the merchandise in the vending stores. For example, the inventory delivery information comprises instructions. In the same or other embodiments, the inventory delivery information may include instruction for the stocking personnel to send back a part of the merchandise shipment. Examples of other instructions also include instruction for the stocking personnel to transfer a part of the merchandise shipment to another vending store, instruction for the stocking personnel to count and report inventory in the vending stores.

In one or more of the above embodiments, the one or more modules of the data center are configured to generate stocking requests based on inventory reports received from the vending stores.

One of the plurality of vending stores may include an inventory analysis system for determining inventory of the vending store and wherein the data center is configured to instruct the at least one of the plurality of vending stores to determine the inventory when stocking personnel completes an inventory transfer function.

In one or more of the above embodiments, the data center is configured to establish communication with at least one of the plurality of vending stores and receive dispensing accuracy information collected by a product sensing system of the one of the plurality of vending stores corresponding. The product sensing system may be configured to automatically update inventory information of products stored in the one of the plurality of vending stores and to communicate the updated inventory information to the data center.

In one or more of the above embodiments, at least one of the one or modules of the data center is an enterprise resource planning module comprising logic for performing an enterprise resource planning. The enterprise resource planning module may be configured to send and receive external inventory information between the data center and a third party logistic system. The external inventory information sent by the third party logistic system may include vending store identification data, product identification data, product quantity data, and/or a receiving time period.

In one or more of the above embodiments, the data center is configured to deliver inventory management information to each of the plurality of vending stores for displaying on user interfaces of the plurality of vending stores. The inventory management information may include incoming shipment data, returns data, redirections data, and/or requests for additional inventory.

In certain embodiments, a method implemented at a data store in communication with a plurality of vending stores, where each vending store has a storage space for storing the products and an automated dispensing mechanism for dispensing the products from the storage space to customers, is provided. The method may include identifying a subset of vending stores requiring replenishment of products and sending instructions, directly or indirectly, to suppliers or distributors of inventory to deliver particular products to vending stores identified as requiring replenishment. The method may also include receiving shipment confirmation messages from the suppliers or distributors when a delivery of the particular products is made or initiated.

In certain embodiments, a vending store for vending products to customers is provided. The vending store may include a network interface for connecting the vending store to a network and a computer system with a user interface configured to require stocking personnel to input inventory information regarding products being stocked in the vending store and logic for communicating said inventory information over the network. The vending store may also include a storage space for storing the products and an automated dispensing mechanism for dispensing the products from the storage space to the customers. The vending store may be configured to connect to a data center in a network system over the network and is configured to send the inventory information to the data center for processing the inventory information to control inventory in the vending store.

In one or more of the above vending store embodiments, the vending store also includes a user identification interface having functionality for determining an identify of the stocking personnel. The functionality for determining the identify of stocking personnel may include a card reader and associated logic for identifying individuals who are issued specific cards, a keypad and associated logic for identifying personal identification numbers, a biometric information capture and authentication system, a camera for capturing pictures of the stocking personnel during replenishment, or a combination of any of the foregoing.

In one or more of the above vending store embodiments, an access system for limiting access to specified regions of the vending store is based on an identity of the stocking personnel as determined by the user identification interface.

In one or more of the above vending store embodiments, the computer system of the vending store is configured to prompt the stocking personnel to confirm deliveries of shipments of merchandise when said personnel stock the shipment of the merchandise in the vending store. The computer system of the vending store may be configured to receive confirmation of the deliveries through the user interface. The computer system of the vending store may be also configured to instruct the stocking personnel to send back merchandise. The computer system of the vending store may be also configured to instruct the stocking personnel to transfer merchandise between the vending store and another vending store.

These and other features and advantages of the present invention will be described in more detail below with reference to the associated drawings.

BRIEF DESCRIPTION OF THE DRAWINGS

FIGS. 5B-K illustrate selected screen shots of the store network management application that indicate some functions of the application in accordance with certain embodiments.

FIG. 14A illustrates different alert categories and corresponding elements in accordance with certain embodiments.

FIG. 14B illustrates some example of the correction codes.

FIGS. 21A-E illustrates examples of reports in accordance with certain embodiments.

DETAILED DESCRIPTION OF EXAMPLE EMBODIMENTS

Figure 1A:
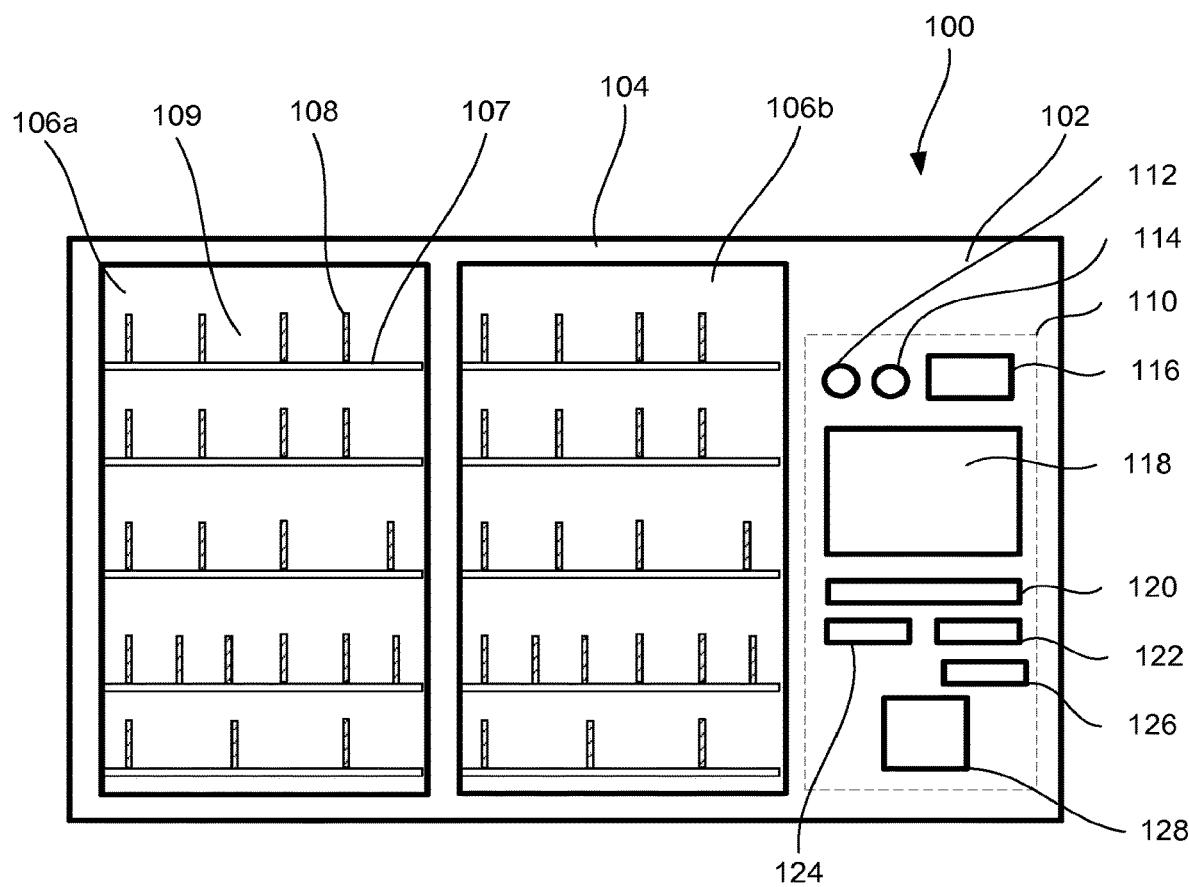
FIG. 1A is a schematic front view of a vending store in accordance with certain embodiments.

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that the invention is not limited to these embodiments.
Introduction As explained, automatic vending has been limited, in large part, to low value products. Selling high value items has been left to retail outlets with sales clerks to help customers with their decision-making processes. Purchasing of high value items and the corresponding decision making process may involve several stages. First, a customer becomes aware of the product and gains some interest in it. Besides using mass media, brand owners and retailers usually try to place some basic product information, such as posters, in high foot traffic areas. Sometimes that leads customers to the next step of gathering additional information and then developing interest in purchasing the product. The entire process leading up to the purchase may take long time, especially for complex and expensive products. Often customers loose interest or become distracted before making a purchase.

Vending stores employed in certain embodiments are capable of presenting extensive product information, guiding customers through the purchasing process, and immediately delivering products, all of which can be performed in short and simple interactions with the vending stores. Unlike traditional vending machines, vending stores described herein are designed or configured to deliver extensive product information and even promptly adjust and tailor the content of this information based on immediate needs of brand owners and customers. These features are available because such vending stores have sophisticated collections of customer interfaces, typically implemented as a combination of peripherals controlled by a powerful processor or computer. Such vending stores also have network connections allowing them to interact with a data center and periodically retrieve product information and other data and instructions for changing various configurations of the customer interface. At the same time, vending stores are relatively inexpensive to operate in comparison to retail outlets and may be much more desirable to customers wishing to avoid interacting with retail clerks. This is particularly valuable to brand owners and retailers operating in highly competitive product markets, such as portable electronics, cosmetics and perfume, and other merchandise, where consumers are continuously targeted by other competitors and often distracted and refocused onto other products along their purchasing process.

Some of the terms used herein are not commonly used in the art. Other terms may have multiple connotations in the art. Therefore, the following definitions are provided as an aid to understanding the description herein. The invention as set forth in the claims should not necessarily be limited by these definitions.

The term "product information" refers to any information that relates to a particular product item or a group of items, such as product images, pricing, description, availability, inventory, advertisement, promotions. Selected product information that has been organized in a particular format suitable for presentation on user interfaces of vending stores is sometimes referred to as "product presentation." A product presentation may take a form of a product page, a catalog page, an advertisement. Product presentations sometimes refer to other information presented on the user interface of a vending store such as a welcome screen, help menus, purchasing transaction screens that may not directly relate to a particular product or contain product information.

The term "template" refers to a specific configuration that is preset and available to selected users for creating product presentations. The template may have certain fields defined in such a way that no further updates or integration is necessary prior to uploading the files containing the presentations created from the templates to the vending stores.

The term "product" (sometimes stated as "product item") refers to an actual physical item stored in a vending store and generally available for purchase and dispensing. For example, a vending store may stock several digital cameras having the same brand and model number. Each of these cameras is a separate and distinct "product." In certain contexts, products made available via vending store include "non-physical" products, such as warranties, service plans, loyalty club memberships, media files, and other services and offerings. In these contexts, a vending store may not need to use an automated dispensing mechanism to provide products to customers.

The term "product type" refers to a category or class of products, such that multiple product items may share the same product type. Generally, a product type may reference a specific model or any level of product category (e.g., digital cameras, SLR digital cameras, 10 megapixels SLR digital cameras, etc.) Various brands of products may fall under the same product type. Divisions between product types may be defined in a hierarchy or other ontology.

The term "user interface" (also "customer interface") refers to a combination of hardware and software that typically includes a display for viewing product presentation content and other content such as inventory content and maintenance content for supply and maintenance personnel, respectively. A user interface typically includes functionality for providing input and navigating among multiple types of information and options provided by the user interface. The user interface may be configured to execute HTML, XML, Java and other commands imbedded into files corresponding to product presentations and other features and functions of vending stores. In certain embodiments, a user interface may include a touch screen and a browser. The browser receives information from a web-server, running either locally within the store or remotely over the data network, and a main program and displays it on the touch screen. A customer may select various displayed options by touching the respective areas of the screen, which are triggers various commands for execution by the web-server and the main program.

The term "brand owner" refers to an entity having products available for purchase in one or more vending stores. In certain embodiments, a brand owner has exclusive or shared control over the content of product presentations pertaining to the brand owner's products. In some cases, a brand owner may be a retailer renting vending stores. Such retailer may define and control product presentations displayed on the rented vending stores. The retailer may share this control with a marketing entity and other entities. The level of control may vary among different entities. A vending store operator may also have some or full control over product presentations to ensure compatibility with vending store configurations.

The term "sales data" refers to information pertaining to one or more purchases from a vending store. This information may include, for example, time stamps identifying timing of various transactions, identification of vending stores where sales took place, lists of products purchased and corresponding prices, methods of payment, personal information about purchasers, membership affiliations, products reviewed but not purchased, and/or product dispensing problems. Sales data may be communicated by a corresponding vending store after each purchase or may be pooled and subsequently uploaded during predetermined communication sessions.

The term "customer interaction data" refers to information pertaining to any interaction of a customer with a vending store that a vending store is capable of detecting. For example, a vending store may count a number of times a customer touched its touch screen. Relevant detection mechanisms in the vending stores include not only computer user interfaces such as touch screens but also various types of sensors. For example, sensors may be configured to detect a customer's presence in certain areas around the store, detect a customer's interest in particular products, count foot traffic near the store, and collect any other data that may be of interest to brand owners, vending store management entity, or any other party. Detailed customer interaction data from analyzing or detecting very specific customer actions, such as touching a computer display in a particular location or moving in a particular manner (as detected by, e.g., analyzing video images of the customer). Examples of sophisticated customer interaction data include conversion and abandonment rates. Some types of customer interaction data qualify as sales data as well.

A "customer parameter" is defined as any characteristics that can be attributed to the customer and detected by a vending store sensor or identified in some other ways (e.g., retrieve from the information handled by the vending store, such as payment information, information stored in the data center, etc.). Examples of customer parameters include, but are not limited to, various demographic information (e.g., age, gender, nationality), house hold income, identification and contact information (e.g., name, address, e-mail, telephone), shopping transaction information (e.g., user interface inputs), payment information, actions in the proximity of the store (e.g., viewing certain product items, approaching various parts of the store, proximity to the store), environmental and situational information (e.g., time of day, nearby traffic, noise level, etc.).

The term "inventory data" refers to information on all or a subset of the product items that are present in a vending store at any given time, such as the time when the inventory was stocked or after a certain type of purchase was made, for example. Examples of inventory data include times when inventory was stocked, product identifications (SKU, etc) and corresponding quantities, arrangements of products inside a vending store (e.g., mapping product items to product compartments), and/or previous or scheduled replenishing events.

I. Vending Stores

A. Mechanical Hardware

FIGS. 1A-1D depict one example of a vending store suitable for use with certain embodiments discussed herein. FIG. 1A presents a schematic front view of a vending store 100 in accordance with certain embodiments. The depicted vending store 100 may be broadly divided into an electronics module 102 and a product storage module 104. In certain embodiments, the vending store has one electronics module 102 and one product storage module 104. It should be readily understood that one or more of each of these modules may be combined into one vending store. Both types of modules may be enclosed in, for example, a single cabinet made from sheet metal or other suitable material. The division of the vending machine into the modules is generally arbitrary. Different modules may share components, such as a delivery mechanism. In a specific embodiment, the product storage module includes two or more cabinets, each for storing some fraction of the total products in the vending store.

The product storage module 104 may be designed to display the products contained therein as, for example, in the manner of many conventional vending machines. The module 104 may also provide access for stocking products. In certain embodiments, the product storage module 104 has two doors 106a and 106b with transparent windows. In other embodiments, the product storage module 104 may have one, three or more doors. Consumers may view all or some of products stored in the product storage module 104 through the windows, although this is by no means a requirement for a vending store. For example, in certain embodiments, a vending store 100 may have a product storage module 104 that does not allow consumers to view products prior to dispensing. However, seeing an actual physical product available for purchase may play a role in product selection and purchase decision. Notably, such feature is not available in Internet commerce.

The doors 106a and 106b, or the vending store 100 generally, may include one or more sensors for detecting the presence of a customer near the store 100. The sensors may be integrated in the vending store in a manner that allows more sophisticated detection. In certain embodiments, the sensors may recognize a customer's focus on a particular product by detecting that the customer has touched a particular point on the door corresponding to the product compartment. In another embodiment, a video camera may be used, with or without infrared light detection, to capture one or more images of a customer. The images are then processed using an algorithm to determine which particular product item the customer was looking at.

The doors 106a and 106b typically include a lock or another mechanism for restricting access to the inside of the product storage module 104. Such mechanism may prevent access except during certain defined events, such as replenishing inventory, performing maintenance on the vending store and related purposes. Various levels of access may be granted. In certain embodiments, the product storage module 104 may be divided into several sub-modules (e.g., cabinets), each having a separate access door and different level of access. For example, in FIG. 1A the left door 106a may grant access to the left storage sub-module only, while a right door 106b may grant access to the right storage sub-module. A module may be divided by a wall 164 as illustrated in FIG. 1C. Sub-modules may be used to store products having different values, brands, product categories, or any other criteria. For example, one sub-module (e.g., with access controlled by the door 106a) may be used to store high value items, while another sub-module (e.g., with access controlled by the door 106b) for lower value items. It should be understood that a vending store 100 may have any number of sub-modules each having its own access level or one that is shared with other sub-modules. In the same or another embodiment, sub-modules may be used to separate inventory according to the ownership. One sub-module may store inventory of one brand owner, while another sub-module may store inventory of another brand owner. Restocking and service personnel may be given different access privileges to permit independent access to particular sub-modules. For example, access to one sub-module may be more restrictive than to another sub-module due to the relative values of merchandise housed in the sub-modules or some other factors. Such differentiation may allow vending store operators to achieve better control over inventory and prevent product theft. In addition, a different level of security, sometimes a higher level, may be applied to the electronics module 102.

In certain embodiments, personnel having access to one sub-module of the vending store 100 may also have automatic access to all other less restricted sub-modules of the vending store. Additional details pertaining to methods of controlling access during the restocking process are discussed in context of FIG. 8.

Access to the modules and sub-modules of the vending store may be controlled based on verification of certain identifiers. One example of an identifier is a mechanical key and different sub-modules may have locks that require different keys. In other embodiments, electronic access cards with programmable codes, access codes/personal identification numbers (PIN) entered on a user interface 110 of the electronics module 102, biometrics inputs including facial features, fingerprints, iris recognition, voice recognition, or other examples of identifiers may be used. Access information may be maintained dynamically and updated during data exchange sessions between a vending store 100 and a data center. For example, the access codes may be routinely changed to enhance security.

In the depicted embodiments, the product module 104 includes shelves 107 and dividers 108 to arrange and display various products inside the module 104. The shelves 107 may be adjusted vertically and positioned in such a way as to accommodate products having various dimensions, within a wide range of acceptable dimensions. In certain embodiments, the acceptable dimensions may be dictated by the delivery (dispense) mechanism. For example, the spacing between two shelves can be between about 3 inches and 15 inches or, more specifically, between about 5 inches and 9 inches. In certain embodiments, each shelf may be adjusted in increments of between about 0.5 inches and 2 inches. The vertical position of the shelves 107 may be recognized and communicated to a control system. The dividers 108 may be attached to the shelves 107 and define product compartments 109. The position of the dividers 108 may also be communicated the control system. In typical embodiments, the control system has information on position of every product compartment 109, which may be provided to the control system in a variety of ways. Additional details regarding mechanisms and processes for dispensing products are presented in the context of FIGS. 1B and 1C.

Various mechanisms may be used for dispensing products, such as a spiral wire displacement, vertical product chutes as described in U.S. Pat. No. 6,758,370, which is incorporated here by the reference in its entirety for the purposes of describing dispensing mechanism, carousel systems, vacuum systems, and dispense systems without moving parts.

The electronics module 102 may include a system controller, e.g. a general purpose computer or a special purpose computer (not shown), and a user interface 110. The entire user interface 110 (or just a part of it) may also be positioned on other modules. For example, the user interface 110 may include a plurality of video screens and audio outputs positioned on various modules, with each screen and/or audio output providing its own set of product presentations. Typically, an interactive part of the user interface 110 is positioned on the electronic module 102.

In certain embodiments, the user interface 110 includes a video input 112, an audio input 114, an audio output 116 (e.g., a speaker), a video output 118, a user data input 120, an interface 124 for visually impaired (VI) customers, a card reader 122, a printer 126, and a product delivery bin 128. The user interface 110 may additionally include various data ports, capabilities for wireless communication, a bar code reader, an RFID reader, and a card dispenser. The user data input 120 may include a keypad that may be used by a customer or restocking personnel to enter corresponding information. Additionally, the user data input 120 may be integrated with the video output 118, for example, as a touch screen that allows to display video information and to receive user input.

The video input 112 may include a camera for capturing video images of a user interacting with the video store 100. The video input 108 may be used, for example, to gather customer demographic data, collect biometric data, provide visual interaction with a call center (e.g., to display improperly dispensed product or as part of a distributed conference/product demonstration), determine whether a customer is standing in front of the store, capture images or video of the customer at various points in the transaction to document that the customer was the actual purchaser, capture images or video of the customer for expression analysis, capture video of the customers to collect testimonials, and allow a customer to present ID for purchase authorization. The video input 112 may include a movable video camera that follows a customer. The audio input 114 may include a microphone and/or an audio input connector, such a microphone jack, jack socket, etc. The audio input 114 may be used to capture voice commands, communicate with a call center, participate in product demonstrations for products that accept voice input (e.g., language learning software, video games, and/or music uploads), or upload audio data onto a purchased storage media. The audio output 116 may be a speaker or an audio output connector, e.g., jack plug, for connecting headphones, hearing aids, or downloading media files from the vending store. The video output 118 may be a video display, for example an LCD display, or a video connecting port. In certain embodiments, the video output 118 may be a touch screen allowing customers to select among various fields displayed on the screen. It may be configured to display catalog pages, product pages, transaction pages, advertisement, surveys, and any other forms of video data and product presentations in connection with other devices.

The user data input elements 120 may be a set of buttons with characters allowing customers to enter information and navigate through the presented information. For example, a customer may select a product from a catalog page, confirm the purchase, enter payment and identification information, reply to the survey, and perform other functions. In various embodiment, the user data input 120 may include a set of numerical buttons, directional arrows, entire alpha characters, pin pads, mouse or track ball, joystick, Braille. Keyboards and keypads may serve the purpose. In some cases, individual buttons may contain embedded displays (e.g., LEDs) in communication with a control system, which programs the content appearing on such displays. The content may vary depending upon which products are currently stocked, the location of the vending store, time of day, the time of year, etc. Note that some or all features shown and/or described as part of user data input elements 120 may be implemented on a touch screen as may be incorporated in display 118.

The visually impaired interface 124 may include, for example, a headphone jack, a set of buttons, dial, joysticks, and any other suitable devices that enable visually impaired customers to interact with a vending store 100. For example, an audible signal may be sent to the headphone jack describing a catalog pages and offering a customer to make a selection using one of the buttons.

The card reader 122 may be configured to scan various types of encoded information, e.g., magnetic code, barcode lines, RFID signals, alphanumeric characters, etc. It may be used with various card types, e.g., credit cards, debit cards, gift cards, and membership cards. In certain embodiments, the card reader 122 may be also configured with appropriate processing logic to authenticate cards presented by customers. In some cases, the card reader 122 may be coupled to a motorize drive and associated card repository, which, for example, may be used to dispense new membership or gift cards. In other words, a card dispenser may be associated with the card reader 122. In one example, the card repository associated with the dispenser is a shelf or a hanger for carrying cards. The dispenser may contain elements allowing information to be printed on the gift card before dispensing, such as price, one of many predetermined designs, or an image uploaded by a customer. In certain embodiments, a gift card may be presented as one of the products to be selected and dispensed from the product compartment 109 in a manner similar to that used for other products.

The user interface 110 may be equipped with various other types of readers and scanners. For example, a bar code may be positioned on a user interface 110 to scan various types of barcodes (linear, two dimensions, etc.) and retrieve product information, such as a UPC barcode. A bar code reader may be also used for scanning the information from gift cards. In another embodiment, the user interface 110 may include an RFID reader for identifying tags of various types (Microwave, UHF, HF, LF, etc.) and data formats.

Vending stores with scanners may contain functionality for communicating scanned information externally over a network to a vending store data center or an external system associated with vending such as a payment system. In the case of a payment system, the scanned and transmitted information may be used to credit or debit the account associated with a card number presented by a customer at the vending store. In certain embodiments, a new gift card may be scanned, and the card number is then communicated to the payment system or other service center to activate the card. This may initiate the first deposit of the account associated with the gift card number. In other embodiments, a customer may present a product to the user interface 110 for identification in order to purchase additional equipment for this product. This may be facilitated by interaction with the product presentation displayed in response to identification of the product as a result of scanning. In some circumstances, a customer may need to communicate to the vending store 100 that an incorrect product was dispensed. Furthermore, a customer may present to the user interface 110 a product identification, such as cardboard placard or a paper receipt including product information, that was issued by a retail outlet. In certain embodiments, a retail outlet may not be capable of stocking (or is not currently stocking) certain items and instead will issue a product identification to a customer interested in the product and may also direct the customer to the vending machine associated with this product. This embodiment may be used for retailing products though vending stores that are frequently stolen in a typical retail environment, e.g., small high value items. In certain embodiments, product identification such as a cardboard placard may be a receipt carrying a UPC barcode. The user interface 110 may be configured to identify the product and add it to the shopping cart. The customer then pays for the product at the vending store and the vending store initiates delivery of the product to the customer.

In certain embodiments, a vending store 100 is configured to reserve products available from other vending stores or retail locations or to dispense products reserved at other locations. Reserving a product may include identifying availability of a product item within a network system and placing a temporary hold on this product item. For example, a product item may be reserved for a predetermined period of time, such as 1 day, 2 days, 3 days, 4 days, 7 days, or any other period of time suitable for a specific operation. During this time, a product item is identified as "reserved", i.e., temporarily unavailable for purchasing by other customers or for removing by stocking personnel. A vending store that stocks the reserved product item is notified about the reservation to prevent dispensing or removal of the product item by others. A customer, who reserved the product item, may be reminded about expiration of the reserved period via an e-mail, text message, automated phone call, or other suitable means.

A customer may reserve a product item using one of the vending stores in the network system, a retail establishment having access to the network system, a computer system connected to the network system (e.g., through the Internet), a call center supporting the network system, or other means. A customer may be offered an option or required to tender a payment for the reserved item or provide a security deposit. Once an item is reserved, a customer may be provided with a product location information, identification information, and reservation period information. For example, a customer may be issued a code for providing to the vending store stocking the reserved product item in order to complete the transaction and receive the item.

A vending store 100 may also include a media bay configured to read and write data to various media formats, e.g., formats employed with flash cards, USB devices, CDs, DVDs, Blue-Ray Disks, data ports, etc. The media bay may be used by a customer to upload and download various forms of media. For example, a customer purchasing a music player may be provided with an option to download music files to one of the media types. A customer may also use the media bay to upload photo files to a website in order to clear up space on customer's camera memory cards.

The printer 126 may be configured to print purchasing receipts or any other information for customers. For example, a customer may request printed product information, available balances on a gift card, membership information, directions to the nearest vending store carrying an item that is out of stock, coupons for use at the vending store or a retail outlet, etc. Vending store users other than customers, e.g., restocking and maintenance personnel, may print inventory information, error codes, etc.

The product delivery bin 128 is configured to permit customers to retrieve purchased products from the vending store 100 delivered to the bon from the one of the product compartments 109. The product delivery bin 128 may be equipped with an indicator light, for example, an LED light positioned near the product delivery bin 128, to indicate that a product has been delivered to the bin 128 and is ready for retrieval by a customer. Likewise, indicator lights may be positioned near other elements of the user interface 110 for directing a user's attention to these elements. The product delivery bin 128 may have a door to prevent access in certain situations. For example, the door may prevent customers from accidently reaching into the bin 128 while a product being delivered.

The vending store 100 may also include other types of module that are not shown. In certain embodiments, a module for interactive display and presentation of products is used. For example, a module may include a display and a video game console that allows a customer to experience games sold in the vending store 100 while going through purchasing decision. In another example, a module may dispense products samples, such as perfume offered for sale in the vending store. In yet another example, a module may contain a securely attached product that a customer may test, such as a digital camera, a music player, etc.

Figure 1B:
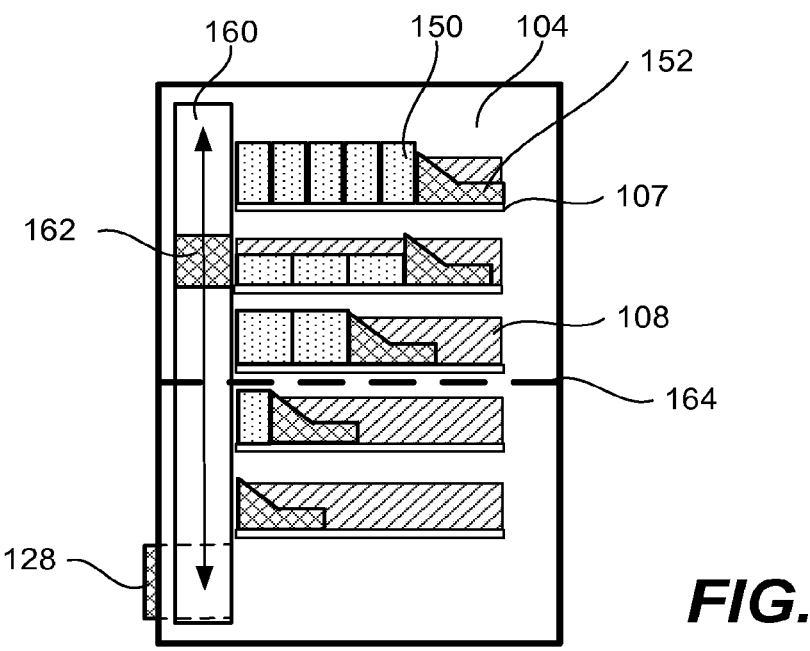
FIG. 1B is a side cross-section view of the product storage module.
Figure 1C:
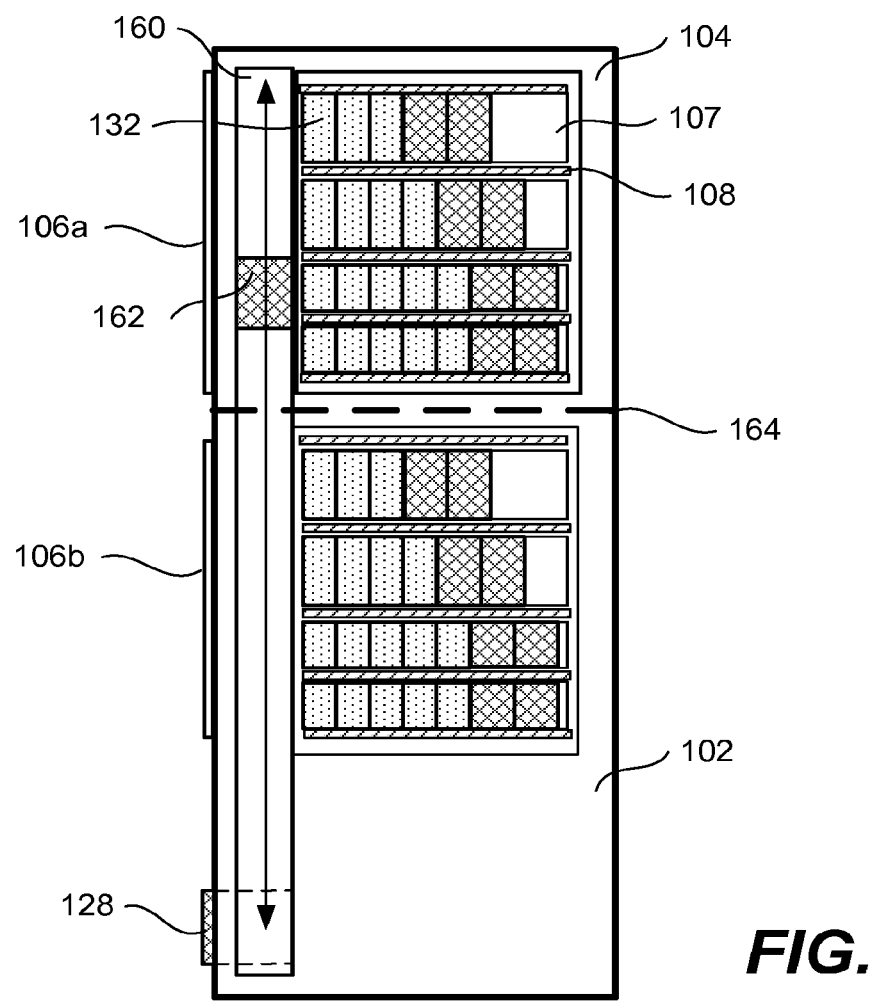
FIG. 1C is a top cross-section view of the product storage module and an electronic module.

FIG. 1B is a side cross-sectional view of a product storage module such as module 104, illustrating the module interior. The left side of the diagram indicating the product delivery bin 128 represents the front of the product storage module (e.g., the side of the module presented to the consumer). Shelves 107 may be stacked vertically above each other and configured to hold product items 150 and accommodate product items' movement across the shelf 107 and towards an automated dispensing mechanism 160. Each shelf 107 may have a set of product displacement mechanisms 152. A single displacement mechanism 152 may be provided for each product compartment 109. Typically, though not necessarily, the dispensing mechanism 160 abuts the edges of shelves 107 to facilitate dispensing. The dispensing mechanism 160 is configured to move a product holder 162 in both a vertical direction (shown in FIG. 1B) and horizontal direction (shown in FIG. 1C). Product holder 162 is sometimes referred to as a bucket. The dispensing mechanism 160 typically employs a robot (not shown) to move product holder 162 to a specific product compartment where the selected product item is stored. When not retrieving products, the robot may be positioned out of view in the electronics module 102.

After a customer selects and pays for a product, the control system sends signals to the corresponding displacement mechanism 152 and dispensing mechanism 160. The dispensing mechanism 160 first moves the product holder 162 into a position next to a corresponding product compartment 109. Then, the mechanism 152 is activated and pushes the entire stack of products in the corresponding product compartment 109 towards the product holder 162.

The pushing continues until the outermost product items falls into the product holder 162. The automated delivery mechanism 160 then moves the product holder 162 with the dispensed product into position next to the product bin 128. A customer may then retrieve the product from the product holder 162 through an access port in product bin 128.

In some embodiments, multiple product compartments 109 (FIG. 1A) may store same product items. If a customer selects such product, the control system may select the product compartment 109 currently containing the greatest amount of the selected product and proceed with positioning the product holder 162 in front of the selected compartment and displacing the outermost product from the compartment. Such approach provides even distribution of products within the vending store 100 and thereby displays a more aesthetically pleasing vending store to customers (e.g., one that is less likely to have empty compartments). In some embodiments, the product displacement mechanism 152 may be provided with product information or even a display of a product on a surface facing the delivery mechanism 160. Thus, when all products are dispensed from a product compartment 109, a customer is presented with product information and not an empty compartment.

A vending store 100 may include sensors for automatic determination of inventory inside the store. Inventory data may be specific for each individual product compartment 109. In certain embodiments, elements defining a product compartment 109, such as shelves 107, dividers 108, or other any elements, may include sensors to determine the number of product items in each compartment. As examples, mechanical, optical, electromagnetic, and other conventional types of sensors may be used. In the certain embodiments, each product item may have its own unique product identifier, such as an RFID tag. In some cases, a vending store 100 may have one or multiple RFID readers to scan RFID tags in the entire store 100 and/or in a specific product compartment 109. In one specific embodiment, mapping of product items' identifiers to the corresponding product compartments 109 may be performed during the restocking operation. After completing inventory for an entire store 100, the control system then determines a number of products remaining in each product compartment 109 based on the product identifications and the mapping information. In another specific embodiment, the vending store 100 may include sensors dedicated to each specific product compartment 109. Such sensors may verify both a number of products in a specific compartment and the accuracy of stocking operations. For example, product identifiers may be matched to specific product types, and the control system may then determine whether product identifications for all products in a specific product compartment 109 correspond to the correct product type.

In certain embodiments, inventory sensors described above may be used to check the inventory of an entire vending store 100 or of a specific product compartment 109 before and after each product dispensing operation. In a specific embodiment, sensors check inventory after the entire purchase transaction is completed. By comparing inventory differences, the control system may determine whether the correct product was dispensed and/or retrieved from the system. Alternatively, a vending store 100 may have a sensor configured to detect movement or the presence of a particular product item during dispensing to determine the accuracy of dispensing. In certain embodiments, a sensor may be positioned or configured to detect a product item in the product bin 162 during the dispensing. In a specific embodiment, an RFID scanner or a bar code scanner is used to detect the presence or absence or a product and provide product identification information before and after the delivery port in bin 128 is opened.

FIG. 1C illustrates a top cross-section view of the product storage module 104 and an electronic module 102. The delivery mechanism 160 is shown to move the product bin 162 in a horizontal direction between one product compartment 109 and the product delivery bin 128. The product storage module is shown to be divided by a wall 164 into two sub-modules or cabinets. Each sub-module has a separate access door 106a and 106b. As described above, customers, stockers, and others may have access to one sub-module but not another.

Figure 1D:
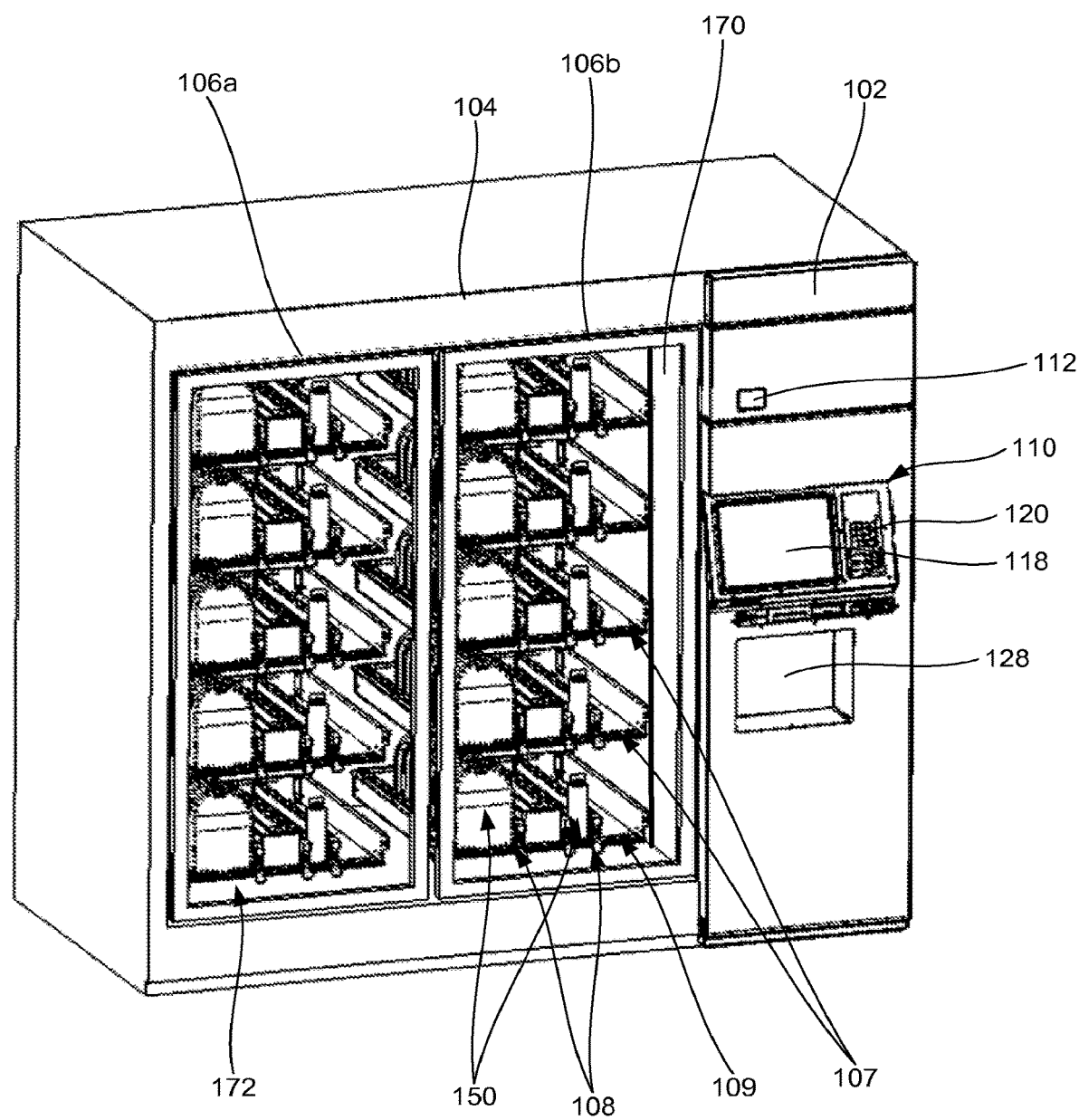
FIG. 1D is a perspective view of the vending store in accordance with certain embodiments.

FIG. 1D shows a perspective view of a vending store. The store includes a product storage module 104 and an electronic module 102. The product storage module 104 is shown with two access doors 106a and 106b that each have transparent inserts and are capable of displaying products stored inside. The product storage module is shown to stock products having various sizes. Adjustable shelves and dividers may be configured to accommodate such products.

A vending store 100 may have various types of external components that collectively contribute to the overall aesthetic or exterior presentation of the store. For example, as mentioned, a store 100 may be equipped with a device to deliver product samples upon customer requests provided through the user interface or through a separate device, such as a push button, a touch sensor, etc. In a specific embodiment, a vending store 100 may be equipped with an atomizer to spray perfume. In some cases, a vending store 100 is equipped with one or more devices for assisting sales clerks in delivering product demonstrations. In certain embodiments, a vending store 100 has a retractable counter that is used for product demonstrations. A store 100 may have external compartments for carrying product information brochures, gift cards, packaging materials (e.g., shipping bags). Furthermore, a store 100 may have a plurality of devices for delivering product presentations that are not part of the main user interface 110. For example, a store 100 may be equipped with one or more video displays, e.g., LCD displays, and/or speakers to deliver product infomercials, advertisement, and other content. In certain embodiments, these external devices may be synchronized with the main user interface (by employing appropriate control logic) to assist a customer in making a purchasing decision.

In certain embodiments, a vending store may include a weatherproof housing. The housing may be resistant to temperature and humidity deviations, tolerate certain direct exposure to rain and sun, have enhanced security (e.g., stronger housing, security alarms), and any other functionality making a vending machine suitable for use in outside environments.

Multiple Store Arrangements

Figure 2A:
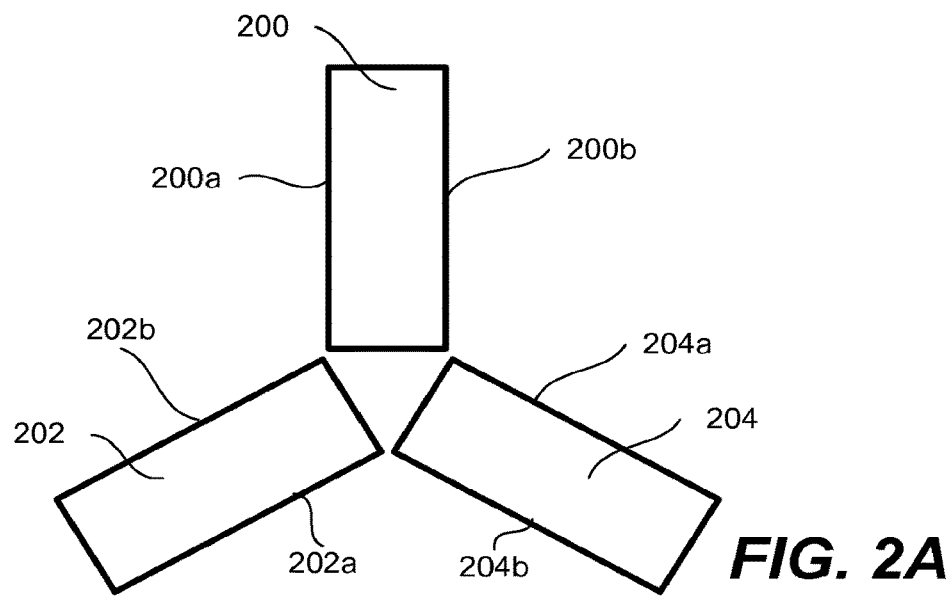
FIG. 2A illustrates an arrangement of three vending stores positioned at obtuse angles relative to each other each.

Vending stores may operate individually or in groups. Group arrangements may provide more effective product marketing. For example, side and/or back walls of one vending store may display advertising close to a user interface or a product display of another vending store. FIGS. 2A-2E illustrates various arrangements of vending stores. For example, FIG. 2A illustrates an example of arranging three vending stores, 200, 202, and 204, at an angle relative to each other. Back sides 200b, 202b, and 204b may be used to display product information. For example, a vending store 200 may offer music players, while a vending store 202 may offer cell phones, and the vending store 204 may offer digital cameras. The front side 200a may display the actual music players and provide a user interface to select, purchase, and receive a music player. The backside 202b of the vending store 202 stocking cells phones may be used to display additional information about the music players. A customer standing between the front side 200a and the backside 202b has immediate access to extensive product information and capable to immediately select and purchase presented products.

Figure 2B:
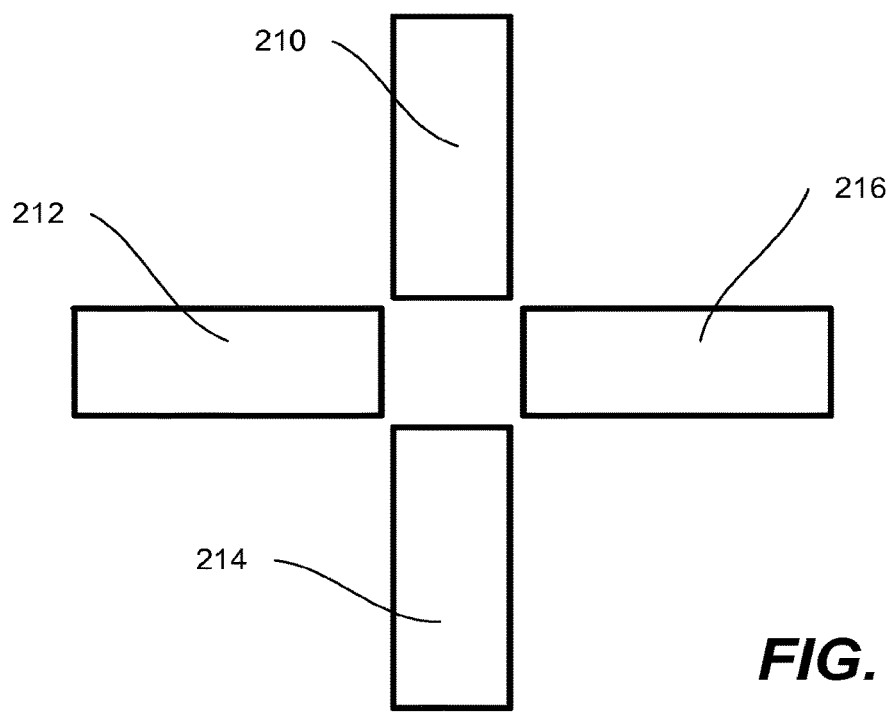
FIG. 2B illustrates an arrangement with four vending stores positioned at approximately right angle relative to each other.

Similarly, FIG. 2B illustrates an arrangement with four vending stores 210, 212, 214, and 216 positioned at approximately right angle relative to each other. The back wall of one store may provide information for products offered for sale in the next store in a manner described similar to that discussed with reference to FIG. 2A.

Figure 2C:
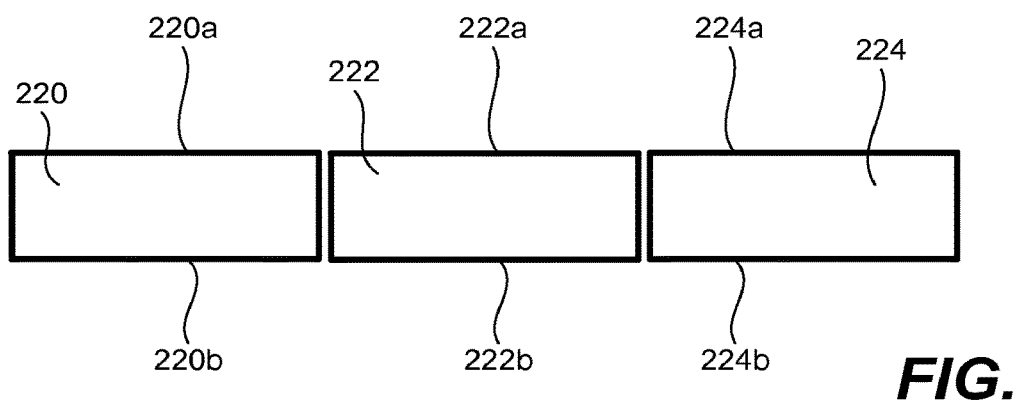
FIG. 2C shows three vending stores arranged in a line.

FIG. 2C shows three vending stores 220, 222, and 224 arranged in a line. It should be readily understood that any other number of stores may be arranged in this format. Each of the stores has a front side (220a, 222a, and 224a respectively) and a back side (220b, 222b, and 224b respectively). Depending on types of products offered, retail environment and other factors, all front sides may be used to display and vend products, while all the backsides may be use for advertising. In other embodiments, an arrangement may have the displaying/selling sides alternate with advertising sides. For example, the front sides 220a and 224a may used to display/sell products, while the backside 222a in the middle of the arrangement may be used to advertise the products offered for sale in 220 and 224.

B. Electrical Hardware

Figure 3A:
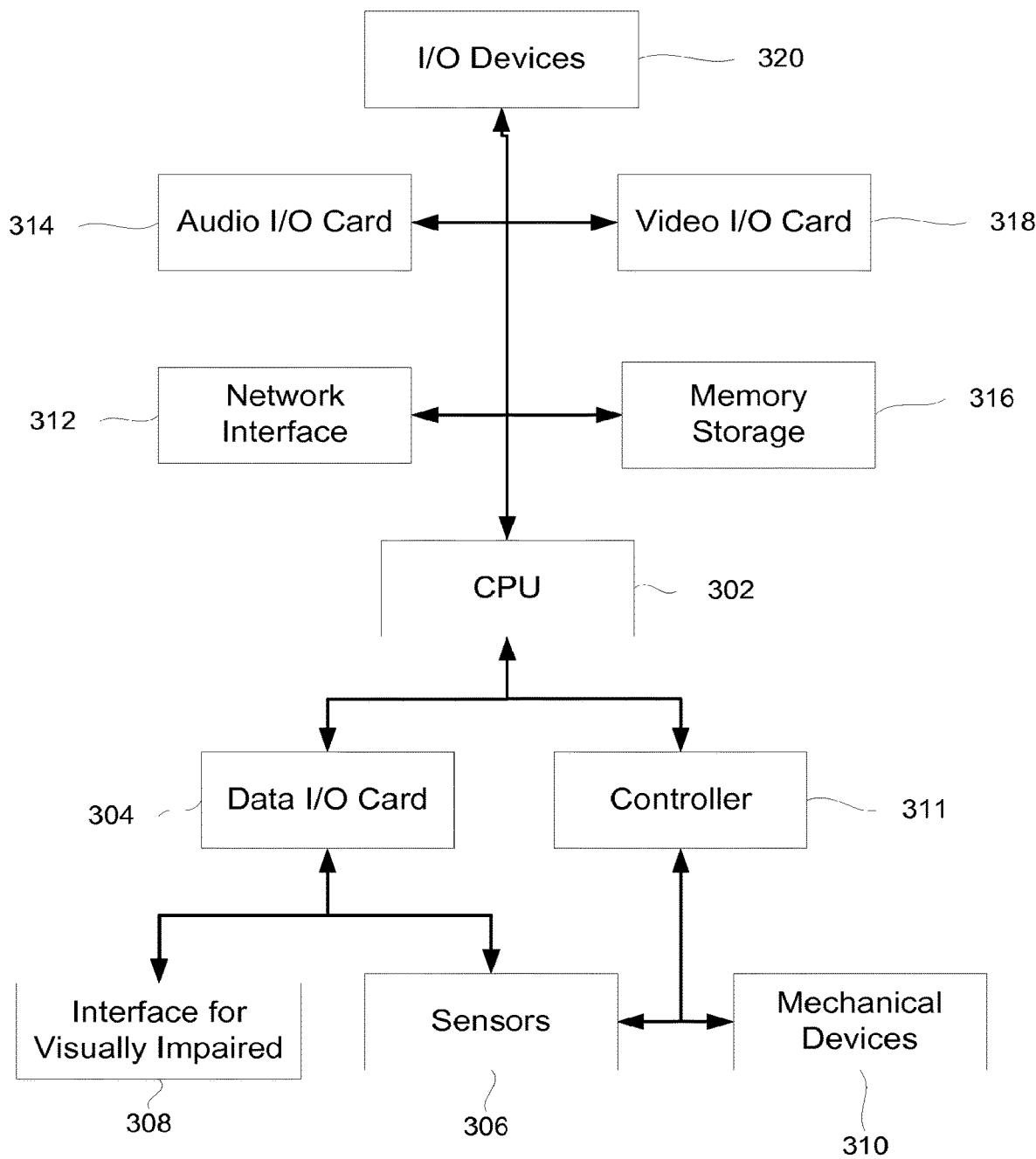
FIG. 3A illustrates a hardware arrangement and associated interconnections within a vending store according to certain embodiments.

FIG. 3A illustrates a computational hardware arrangement and associated interconnections within a vending store 100 according to certain embodiments. Some of the components may be included in a computer, a controller, or other combination of elements interconnected among each other. A computer, one or more controllers, microprocessors, and/or other hardware processing elements may be configured to run software, further described below. For example, a computer may include an operating system, such as Windows XP, and a browser (e.g., Internet Explorer), a web-server (e.g., Tomcat), application software, controller software, and other components. Additionally, the vending store processing apparatus described here may serve to control any one or more of the various vending store functions described above.

In the depicted embodiment, a central processing unit (CPU) 302 is connected to a data I/O card 304. The card in turn may interface, via a serial connection or other type of connection, with one or more sensors 306 and a VI interface 308 for the visually impaired. Additionally, the CPU 302 is connected to a controller block 311 for interacting with mechanical devices 310, such as motors, actuators, valves, and other mechanical hardware components, which could be done through a serial connection port. In some embodiments, the controller block 311 represents multiple controllers, each configured to execute its own specific control algorithm(s), which may be encoded in software, firmware, combinations thereof, etc. In certain embodiments, the controller block 311 controls the dispensing mechanism 160. When a customer selects and purchases a product, the CPU 302 detects a signal from the user interface 110 and directs the dispensing mechanism 160 to deliver the product to the product port.

Various sensors 306 may be also connected to the CPU 302 through the data I/O card 304 with one or more connections, such as serial connections, USB connections, single wires, pairs of wires, or other suitable interconnection. As explained, one or more proximity sensors may detect the presence of potential customers near a vending store.

In the depicted embodiment, the CPU 302 is also connected to the network interface 312, which may be a network card, a modem, or any other device allowing a vending store to interact with a network system such as the internet or a wide area corporate network. In certain embodiments, the network interface is a DSL modem and/or high-speed cable or cellular modem. Such interface and associated communications logic may be used by the vending store 100 to exchange data with the data center and/or other services during a communication session, e.g., a packet switched IP communications session. In certain embodiments, the communication portions of the vending store are configured to initiate communication with the data center and/or other services, although in some embodiments, they may be configured to respond to requests from external network entities.

The CPU 302 is typically connected to a memory storage unit 316, such as a non-volatile hard drive, a main memory or Random Access Memory (RAM), a Read Only Memory (ROM), or a combination of these or other memory devices suitable for use with computing systems. The memory storage unit 316 may comprise one or more of a magnetic drive, a semiconductor memory, and the like. The memory storage unit 316 may be used to store software programs, routines, scripts, and modules, as well as data such as product presentation data, transaction data, and/or sensor data.

Additionally, in the depicted embodiment, the CPU 302 controls various features of the user interface 110 via connections to an audio I/O card 314, a video I/O card 318, and various other I/O devices 320, such as a pointing device (e.g., a mouse), a keyboard, etc. These provide functionality as necessary to implement user interfaces suitable for use with vending stores of this invention.

Figure 3B:
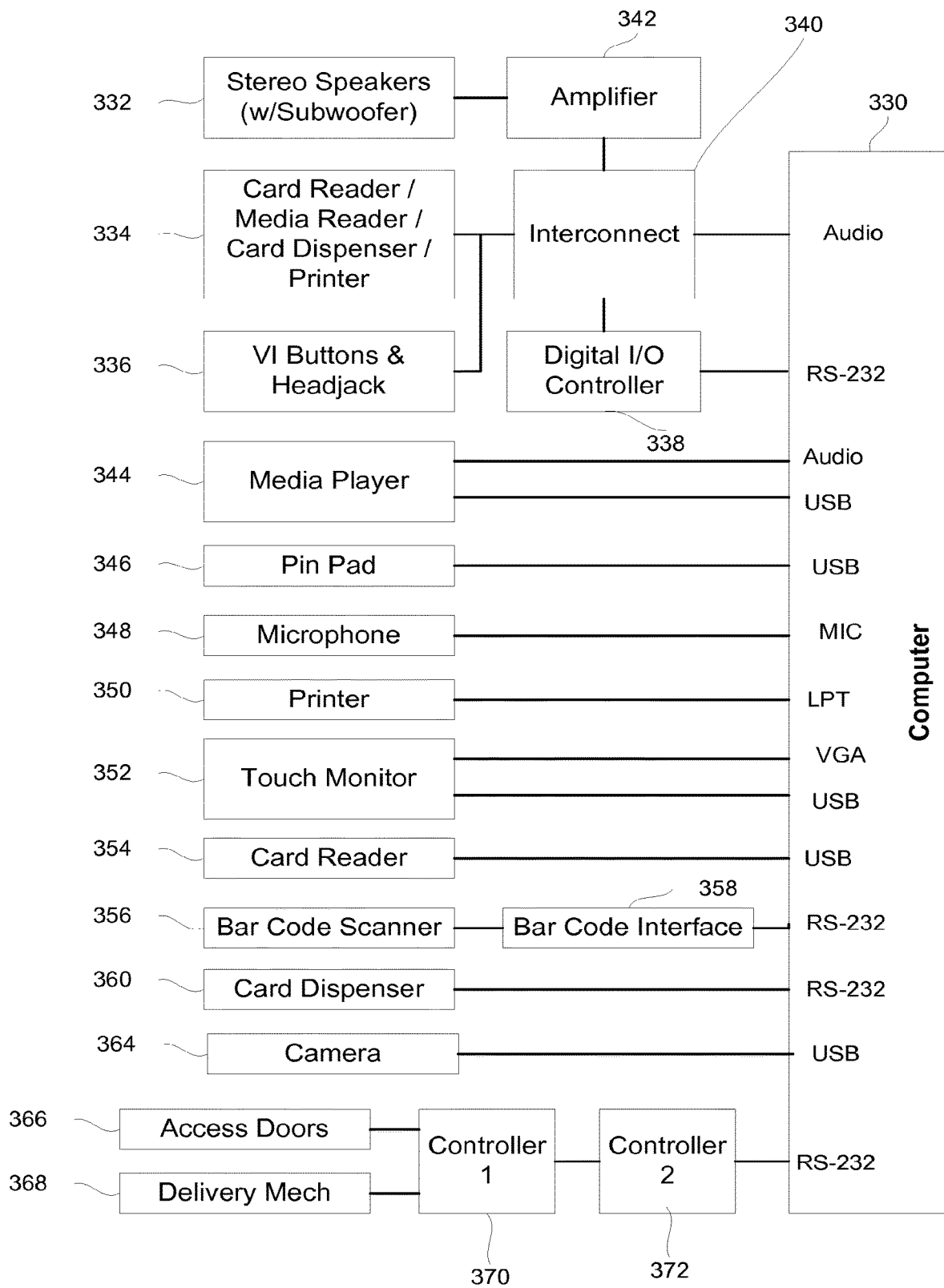
FIG. 3B is an example of electronic schematic of a vending store in accordance with certain embodiments of the present invention.

FIG. 3B provides an electronic schematic of a vending store's hardware in accordance with certain embodiments of the present invention. A computer 330 is interconnected with various devices (including various peripheral devices) in the vending store through a variety of different ports. As illustrated, stereo speakers 332 may be connected to an amplifier 342, which is in turn connected to an interconnect 340. Another set of devices 334, (e.g., a card reader, a media reader, a card dispenser, and a printer in this example) may also be connected to the computer 330 through the interconnect 340. As shown, a printer 350 is directly connected to the computer 330 via an LTP port; while a card reader 354 is connected using a USB port. As noted, the interconnect 340 is connected to the computer 330 using an audio port. In addition, the interconnect 340 is connected to the computer 330 using a digital I/O controller 338 and an RS-232 port. A visual impaired interface 336, including a set of buttons and a headphone jack, is also connected to the computer 330 through the interconnect 340. In the depicted embodiment, a media player 344 uses both an audio port and a USB port for its connection to the computer 330. A PIN pad 346 and a camera 364 are typically connected using a USB port. The computer 330 has a microphone port for connecting a microphone 348. A touch monitor 352 is connected using a VGA port and a USB port. Finally, a combination of a barcode scanner 356 and a barcode interface 358 as well as a card dispenser 360 and access doors 366 in combination with a delivery mechanism 368 and a set of controllers 370 and 372 are connected to the computer 330 via RS-232 ports.

C. Software

A software installed on a computer system of the vending store maintains the store configuration, manages the user interface, performs payment processing, and initiates product dispensing. Additionally, the software includes features for replenishment, self-diagnostics, reporting, and communication of all relevant information back to the centralized network.

Figure 4A:
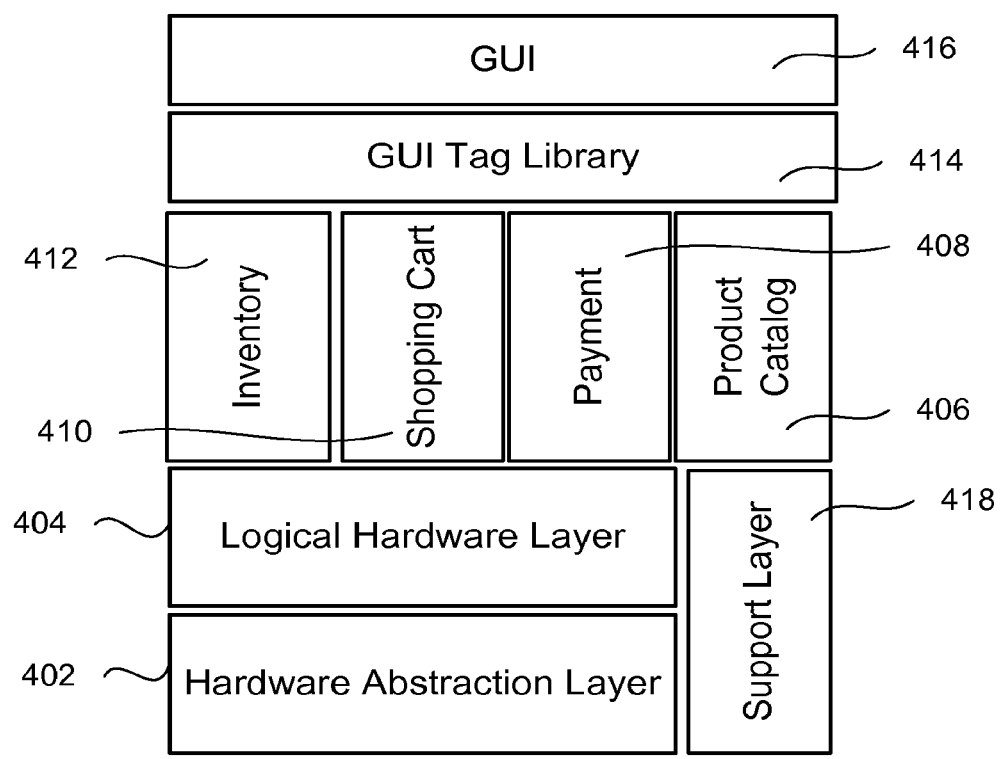
FIG. 4A illustrates a multilayer architecture of the software implemented on a vending store according to certain embodiments.

FIG. 4A illustrates a multilayer architecture of the software implemented on a vending store according to certain embodiments. A hardware abstraction layer 402 is the base level in the software architecture, and provides an interface to the physical hardware of the vending store described above. It provides a consistent software interface for vending stores, which may have various alternative hardware configurations. The hardware abstraction layer 402 effectively hides differences in the hardware from the operating system kernel. The next level in the depicted embodiment is a logical hardware layer 404 sitting on top of the hardware abstraction layer 402. The logical hardware layer 404 provides a framework that may exist across multiple implementations of the vending store business logic, and may represent such concepts as a dispenser, mapping of the dispenser to a product, a product item count in the dispenser, and operation of the dispenser. Peer to the hardware abstraction layer 402 and the logical hardware layer 404 are the support functions 418 that may be used by the business logic for communication, security, persistence, etc. Above the hardware layer 404 and the support layer 418 (at a higher level of abstraction) resides various modules enabling customers and, in some situations, service personnel and administrators to review product information, select a product, pay for the selected product, and manage inventory of a vending store. The depicted modules include a product catalog module 408, a payment module 408, a shopping card module 410, and an inventory module 412. Each module may comprise software to perform function listed above. For example, the inventory module 412 may maintain current inventory data, check availability of specific products in the inventory, and change inventory data after the product been paid for and dispensed.

All modules may interact with the GUI tag library layer 414, the support layer 418, and the logical hardware layer 404. The GUI tag library layer 414 provides properties and methods of the business objects to the GUI layer 416. In this or another embodiment, the GUI layer 416 may include JSP pages that use JSP tags. The specific GUIs that implement the GUI layer 416 may be different for various vending stores corresponding to different brand owners. This approach may enable a vending store to have a unique presentation and overall appeal. For example, the GUI layer 416 may implement the layout of information on the screen, the color scheme, logos, and any custom implementation for a particular brand, such as a product demo.

Figure 4B:
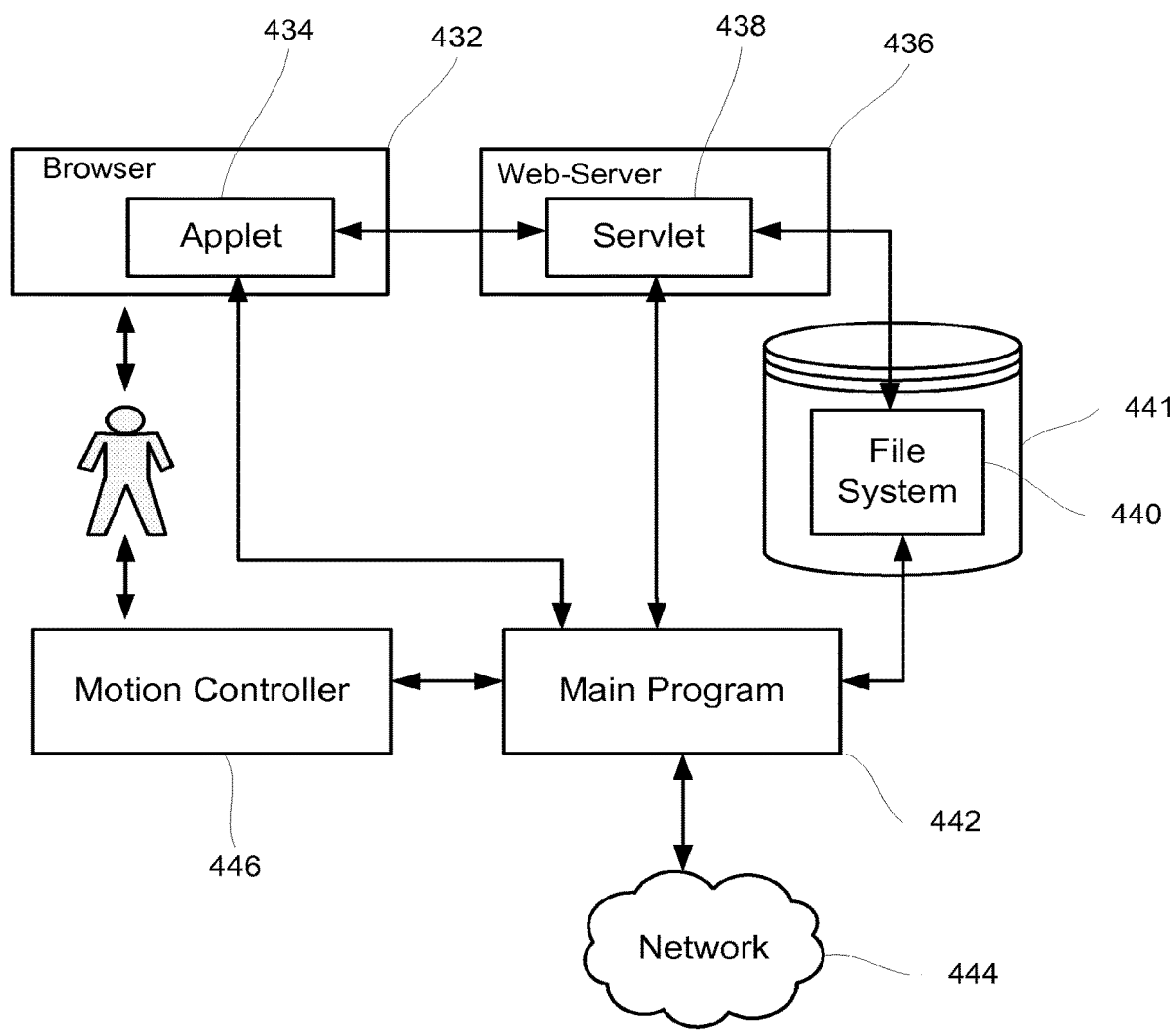
FIG. 4B is a block diagram of various vending store components and their interrelationships.

FIG. 4B is a block diagram of various vending store components and their interrelationships. All components may be included in a single vending store and communicate with other elements of a product vending system through a network 444, e.g., the Internet. Such communication may be controlled by a main program 442 running on a computer system of the vending store. In certain embodiments, the main program 442 is a Java application. Regardless of how it is implemented, the main program 442 may control and interact with various other software components of the vending store. In the depicted embodiment, for example, the main program interacts with hardware devices through a hardware controller 446, accesses a file system 440, and interacts with other programs, such as a servlet 438 on a web server 436 and an applet 434 on a browser 432. For certain embodiments, aspects of hardware controller 446 are also described in context of FIGS. 3A and 3B.

The file system 440 may be a collection of data files stored on a memory storage device 441. Data files may include inventory information, transactional and activity history of a vending store, product presentations, sensors feedback, and other information. The main program 442 coordinates file system 440 data exchanges with the data center as described elsewhere herein. For example, the main program may include a timer or any other criteria to trigger communication with a data center.

The main program 442 may be in direct communication with a web-server 436 installed on the vending machine. Alternatively, the system may provide other user interface configurations, for example, using an operating system such as Microsoft Vista™ or other sophisticated client technologies. In certain embodiments, the web-server 436 is a Tomcat web server available from the Apache Software Foundation, in Forest Hills, Md. The web-server 436 may implement Java Server Pages (JSP). Various custom tags may be implemented that give the JSP access to the application objects described above, such as the shopping cart 410, the payment 408, the product catalog 406, and the inventory 412. In general, and regardless of the specific implementation, the web-server 436 acts as a container for a collection of servlets 438 that actually perform the web-based processing. The servlets 438 are programs that run within the web server 436 and process requests from an applet 434 running in the browser 432. The web-server 436 is responsible for accepting HTTP requests from the browser 432 and providing HTTP responses along with some data, such product information.

A customer interacts with the browser 432. In a specific embodiment, the browser is Microsoft's Internet Explorer™, Mozilla's Firefox™, or any other suitable browser. As mentioned, the browser 432 may include the applet 434, which may be, for example, implemented in Java to allow web pages to communicate with the main program 442 and the servlets 438 on the web-server 436.

The main program 442 may also communicate with the servlets 438. The primary means of communication between the servlets 438 and the main program 442 is writing to, reading from, and/or sharing files. For example, the servlets 438 may store information about a customer's shopping card. The main program 442 may process the payment associated with this shopping card, such as communicating the amount and account information over the network 444, and then instruct the hardware controller 446 to dispense the products corresponding to the shopping card.

II. Network

Figure 5A:
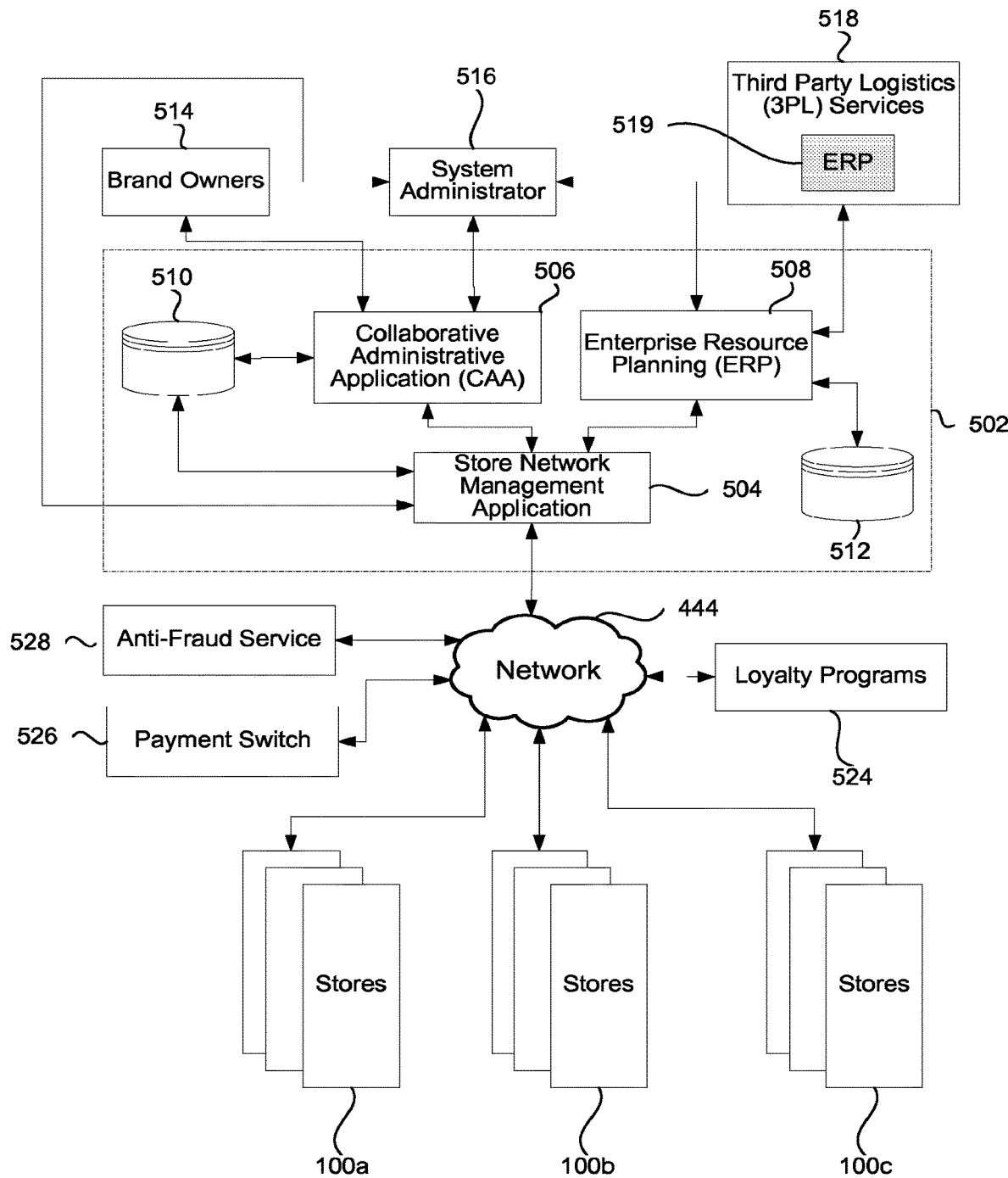
FIG. 5A is a block diagram of a network system in accordance to certain embodiments.

FIG. 5A is a block diagram of a network system in accordance with certain embodiments. A network system includes a data center 502, which is connected through one or more networks 444 (e.g., the Internet) to a plurality of vending stores, illustrated as 100a-c (also referred to as a "vending store 100" in singular form). The vending stores 100a-c may be grouped based on the brands they sell. The overall network system may be configured to support different planograms, hardware peripherals, user interfaces, etc. It should be understood that the vending stores 100a-c on the network need not all have the same functionality. Often the vending stores 100a-c will be heterogeneous, with some vending stores having some functionalities that others lack.

The data center 502 may include an application 504 (sometimes referred to as a store network management application) for interacting with the vending stores 100a-c and managing vending store information. The data center 502 may also include a collaborative administrative application 506, an Enterprise Resource Planning (ERP) module 508, and at least one data store 510. It should be understood that any number of data stores 510 may be used to provide data storage for any of the applications and modules of the data center 502. For example, a designated data store 512 may be used to support the ERP 508 functions. Alternatively, a single data store 512 may serve all needs of the entire data center 502. In certain embodiments, various physically discrete data stores 512 connect to one another via a storage area network.

Providing the store network management application 504, the collaborative administrative application 506, and the ERP 508 as logically distinct modules allows significant flexibility and functionality of the data center 502. In the depicted embodiment, the store network management application 504 is used primarily for communication with the vending stores 100a-c and uploading new data and collecting historical data from the stores. In many embodiments, only a system administrator 516 has access to the store network management application 516. The collaborative administrative application 506 may be used by brand owners 514 to manage product catalog data and review selected data from the corresponding vending stores 100a-c. The ERP 508 manages inventory information for the vending stores 100a-c and interacts with various third party logistics (3PL) services. In some embodiment, some or all applications (i.e., store network management application 504, collaborative administrative application 506, and ERP 508) may be integrated into a single integrated application. The reasons for integration or separation of these applications may include the amount of time users spend with each application, users proficiency, networks' configurations (e.g., whether the users are within the vending companies networks or outside of those networks), degree of fine control needed over the configuration, collaboration requirements, needs for versioning of product presentations and data reporting, and other various factors.

While many business models can benefit from the disclosed network system, one will be emphasized herein. In this particular model, one business entity, a vending store management entity, which is generally represented by the system administrator 516, provides the vending stores 100a-c and maintains basic network infrastructure. It controls most functions of the data center 502 and interacts with multiple brand owners 514 and potentially multiple third party service providers, such as a payment switch 526, a third party logistics services 518, anti-fraud service providers 528, loyalty programs provider 524, and the like. The brand owners 514 provide products for the vending stores 100a-c and define or help define the product presentation content for individual vending stores 100a-c that stock their products.

The store network management application 504 may be implemented on one or more servers that are configured to communicate with the vending stores 100a-c. The complexity and number of servers may depend on a number of the vending stores, store locations, the type and amount of data transferred between the stores and the servers, and other parameters. In certain embodiments, the store network management application 504 is partitioned, and the partitions are designated for particular sets of vending stores. The store network management application 504 may allow centralized configuration and monitoring of the vending stores 100a-c. For example, a brand owner 514 may select and arrange certain data or other information in the collaborative administrative application 506 (e.g., to create or modify product presentations) and propagate the information to specific sets of vending stores via the store network management application 504. The brand owner 514 may collaborate with the vending store management entity, such as a system administrator 516, to create and/or modify product presentations. The configured data may be stored in one or more data stores 510 of the data center 502. The store network management application 504 typically processes this data by providing additional configurations and attributes specific to the selected vending stores. For example, some vending stores may have different hardware and/or software configurations and the uploaded data may need to reflect this difference. FIGS. 5B-K illustrate selected screen shots of the store network management application that indicate some functions of the application in accordance with certain embodiments.

The collaborative administrative application 506 is an application that facilitates collaborative generation of content for vending stores 100a-c and, as well, administration and reporting of the network system performance at a higher level of abstraction than that provided by the store network management application 504. The collaborative administrative application 506 may be used by both a system administrator 516 (or more generally a vending store management entity) and a brand owner 514, while the store network management application 504 is primarily for use by the system administrator 516. In certain embodiments, the collaborative administrative application 506 provides an interface for multiple brand owners 514 to separately manage vending store configuration data and view data received from the vending store.

The collaborative administrative application 506 will be exemplified in more detail below. It may be an application implemented in Java, C++, or another suitable programming language. The collaborative administrative application 506 may use its own designated data store or that of the store network management application 504 to store configuration information, e.g., product presentations and their attributes that may be still in draft mode. Once a change is authorized for deployment, the collaborative administrative application 506 needs to update the store network management application data store 510 with the new/revised data, either by direct access to the data store 510 or through an integration process.

In certain embodiments, the collaborative administrative application 506 includes a web-interface. Individuals employed by or representing brand owners 514 may be required to provide login information for example, prior to accessing the collaborative administrative application 506. The data center 502 may provide access rules specific for different users of the collaborative administrative application 506. For example, some rules may give users access to all aspects of the brand owner's data including all product presentations and all reporting data from the brand products sold at the vending stores (e.g., sales performance of individual stores). Other rules may limit user access to preselected aspects of the brand owner's product presentations (e.g., only certain templates used to create new product presentations). In general, each brand owner 514 can only access the presentations and data for its own products. Of course, there may be situations where brand owners 514 collaborate and share portions of their data relevant to the collaboration.

In many embodiments, the collaborative administrative application 506 enables the brand owners 514 to update their existing product presentations and create new product presentations. In some embodiments, the collaborative administrative application 506 allows the brand owners 514 to upload data about vending of their products at the vending stores 100a-c. It may also permit the brand owners 514 to use such data for product presentations, and to generate and view reports.

The ERP module 508 is a system for managing the data pertaining to financial transactions and inventory management of the vending stores 100a-c. The ERP 508 may process information received from vending stores through the store network management application 504, such as current inventories and sales data. The ERP 508 may also process information from third party logistics (3PL) services 518, such as warehouse inventory availability, restocking requests, and the like. The ERP module 508 may exchange data with the 3PL services 518. For example, the ERP module 508 may prepare and communicate restocking requests to the 3PL services 518. In certain embodiments, the ERP 508 is configured to exchange information with an ERP module 519 of the 3PL service 518. The ERP module 508 may be partitioned into multiple sub-modules, in some cases running on separate processing devices, depending on the number and location of vending stores, the variety of products offered for sale, number of parties involved vending store logistics and other parameters.

In certain embodiments, the system administrator 516 can access all modules of the data center 502. He or she may have access to the all levels of brand owner information, or only certain less sensitive information. In some implementations, the system administrator 516 may review, change, and publish product presentations in either the collaborative administrative application 506 or the store network management application 504. The system administrator 516 may manage error messages, service requests, and other issues specific to vending stores in the store network management application 504. Similarly, in some embodiments, the system administrator 516 may review the inventory related data in the ERP 508 and set parameters for managing this inventory. For example, the system administrator 516 may review requests for rerouting products between the vending stores based on relative sales performances, create triggering points for restocking requests based on sales trends, etc.

Examples of the 3PL services 518 include product distributors, and other services used for managing inventory on vending stores. In a specific example, several different 3PL service 518 entities are involved in replenishing inventory of vending stores. The ERP 518 may send restocking requests to both a distributor and a restocking service. The distributor may then ship requested products to a pick-up location near the designated vending stores. The restocking service then picks up the shipment and replenishes inventory of the vending stores.

As indicated above, each of the vending stores 100a-c is connected to a network or a plurality of networks 444 using a network interface. The vending stores 100a-c may be configured to initiate communication through the networks 444 with any other entities and ignore all or some incoming request for communication. Such functionality may be implemented for security reasons, for example to avoid unauthorized access to the vending stores 100a-c. In addition to being configured to communicate with the server (or servers) hosting the store network management application 504, the vending stores 100a-c may also be configured to communicate with other systems (which may be servers) such as, for example, payment switches 526, anti-fraud services 528, and loyalty programs 524.

In general, the payment switch 526 may be any payment processing service that can authorize payments tendered using credit cards, debit cards, gift cards, or any other forms. The vending stores 100a-c may be configured to use a pluggable payment architecture that allows them to accept multiple forms of tender and send the payment traffic to different services depending on the tender type and the corresponding designation of the store. In certain embodiments, a brand owner 514 may choose to accept only certain types of payments and only specific methods of processing these. For example, selected types of credit and debit cards may be processed by one payments service, while gift cards may be redeemed by another. The payment switch 526 may direct the traffic accordingly. In certain embodiments, a customer may use multiple payment services for the same purchase, e.g., a split tender. For example, a customer may charge a certain amount on one credit card or a gift card and use one or more other credits cards, gift cards, cash, or any other forms of accepted payments for the remaining balance.

The anti-fraud services 528 may be used to verify information about a particular payment, e.g., verify the identity of a credit card user, control purchasing patterns, etc. The vending stores 100a-c may be configured to communicate with the anti-fraud services 528 in order to decide on whether to permit a particular purchase. The vending stores 100a-c may be also configured to determine when to invoke communication with the anti-fraud service 528 and initiate gathering some information from a customer based on a set of parameters pertaining to payment, such as amounts, payment types, shopping patterns, and others. In certain embodiments, the vending stores 100a-c are configured to request a customer to provide personally indentifying information, such as a zip code and/or last four digits of their social security number. The vending stores 100a-c then send this information to the anti-fraud services 528 for verification. In this or another embodiment, the anti-fraud services 528 may also perform velocity checks against all or a sub-set of vending stores 100a-c. For example, the anti-fraud service 528 may identify when and where the same credit card number was used in the network system including the vending stores 100a-c. Selection of anti-fraud services 528, security configurations, etc. may be specific to each store.

The vending stores 100a-c may be configured to participate in different loyalty programs and interact with the corresponding loyalty program servers 524. For example, a brand owner 514 may designate a specific loyalty program for the vending stores 100a-c carrying products of a particular brand. In another embodiment, a vending store operator may establish a loyalty program to promote purchasing and gather customer information from specific vending stores. Loyalty programs typically gather basic personal information and purchasing trends of customers in exchange of some incentives, such as discounts, redeemable membership points, etc. Moreover, the vending stores 100a-c may be configured to use selected third party loyalty programs; for example, programs implemented by credit card companies. A vending store may prompt a customer about the availability of loyalty programs and inquire whether the customer may be interested in selecting one and providing membership information. A vending store may indicate any incentives offered by available loyalty programs. Additionally, a vending store may offer customers membership in one or more loyalty programs.

In certain embodiments, a customer can provide membership identification information to a vending store either by swiping a card, entering codes on a touch screen or a set of buttons, or other means. The vending stores 100a-c may contact the corresponding loyalty program server 524 and retrieve membership information. Alternatively, the vending stores 100a-c may keep limited membership information in its own secure data storage medium and retrieve the information locally. The store can then use the information to greet the customer by name, to tailor certain aspects of the shopping experience (e.g., fill in zip code or shipping address automatically), to allow the customer to redeem membership points as full or partial payment for products, and/or to credit the customer with membership points for purchases. Each vending store may be configured individually with a specific set of loyalty programs, choices available to customers, gathered information, offers presented, and other parameters.

In the above-described embodiments, the vending stores 100a-c communicate directly with the loyalty program service provider 524, payment service provider 526, and anti-fraud service provider 528. In certain embodiments, communications with one or more (including all) of these such as incorrect dispensing, temporary power outage, and/or restocking. If a vending store cannot connect to the data center 502, it will periodically retry until it succeeds. In certain embodiments, the data transfers are always initiated by the vending stores 100a-c and cannot be initiated by the store network management application 504 to prevent unauthorized access to the stores. A combination of triggering events may be used with the occurrence of either one initiating a communicating session.

In the depicted protocol, once the triggering event 602 occurs, the vending store may send a communication request to the data center (block 604). The vending store may then upload activity logs and other data, e.g., sensor responses and inventory to the data center 502. An activity log may include various inputs registered by the user interface, control system responses to these inputs (e.g., adding products to the shopping carts, removing products from the shopping cards, vending products, payment processing information) and other data. A partial example of an activity log is provided below.

| LOG FILE EXAMPLE |
| --- |
| 2009-02-17 23:36:21.254 I estation.services.processors.ScreenTouchMessageProcessorRecording touch on button 'Revitalizing Toner V' of screen 'KitsPage' for session 'FC301D9D1F96691FD1D8550CE329139F' at 2009-02-17 15:36:21.250 after an interval of 3.14 seconds |
| 2009-02-17 23:36:22.093 I zbop.util.PropertySet Added a new model to the list of uploadable models : com_zoomsystems_common_model_ScreenTouch_1234913782093.xml |
| 2009-02-17 23:36:22.097 I estation.services.processors.ScreenTouchMessageProcessorRecording touch on button 'Repairing Lotion V' of screen 'KitsPage' for session 'FC301D9D1F96691FD1D8550CE329139F' at 2009-02-17 15:36:22.093 after an interval of 0.86 seconds |
| 2009-02-17 23:36:22.906 I zbop.util.PropertySet Added new model to the list of uploadable models : com_zoomsystems_common_model_ScreenTouch_1234913782890.xml |
| 2009-02-17 23:36:22.910 I estation.services.processors.ScreenTouchMessageProcessorRocording touch on button 'Oil Free Moisture with SPF 15 V' of screen 'KitsPage' for session 'FC301D9D1F96691FD1D8550CE329139F' at 2009-02-17 15:36:22.906 after an interval of 0.80 seconds | services is conducted through the data center 502 in some or all situations. In such situations, the individual vending stores 100a-c requiring the service may not directly communicate with the service and instead communicate only with the data center 502, which acts as a proxy for the vending stores when accessing the requisite service(s).

A. Data Transfer/Host-Synchronization

Figure 6A:
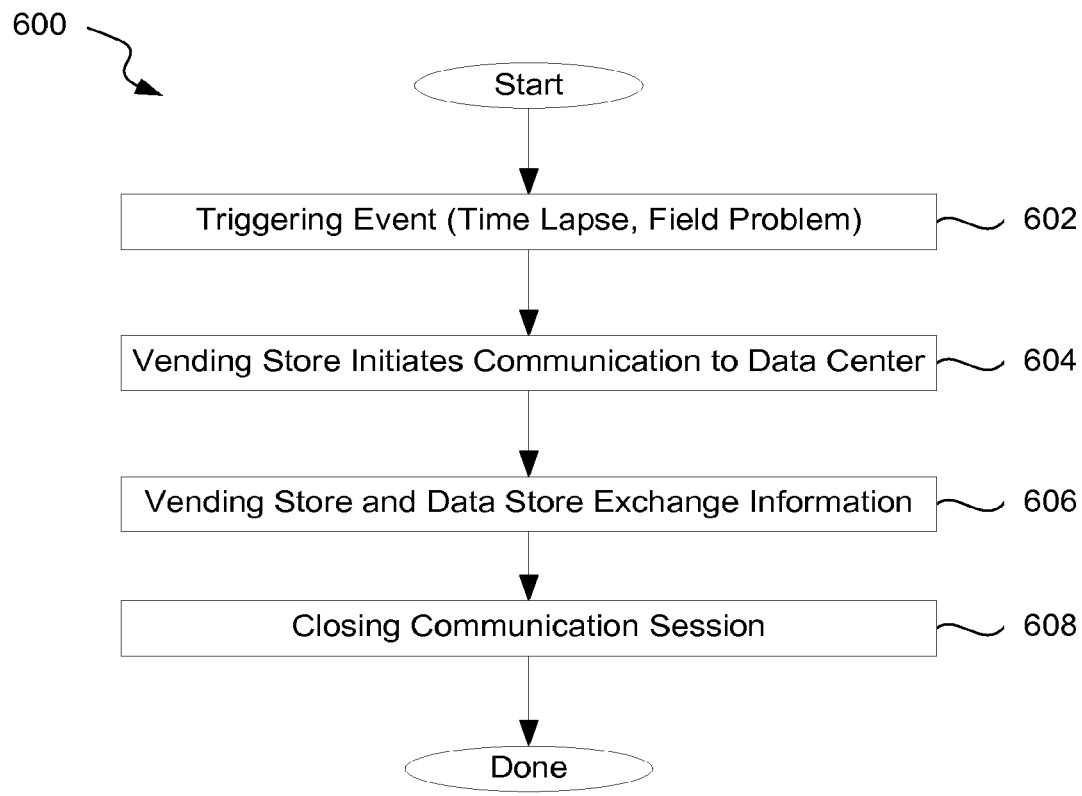
FIG. 6A illustrates a process for transferring data between the data center and a plurality of vending stores.

FIG. 6A illustrates a process 600 for transferring data between the data center 502 and one or more vending stores 100a-c, sometimes referred to as a host-sync process. This process allows the vending stores 100a-c to upload relevant information such as their activity logs that include information on purchases, restocking, errors, and other events, and to download any software or configuration changes. The process occurs in the background and customers may continue interacting with vending stores during the data transferring.

The process 600 is initiated by a triggering event (block 602). The triggering event 602 may be a completed sale, a hardware error, a fixed period of time, or various other scheduled or unscheduled events or conditions recognized by a vending store. In certain embodiments, the triggering event 602 is a predetermined period of time of, for example, between around 15 minutes and 24 hours, or more specifically between 1 hour and 4 hours. In the same or other embodiments, the triggering event 602 is a hardware event, In certain embodiments, the data center 502 concurrently loads software updates and/or configuration changes to the vending store, such as new product presentations and information on upcoming restocking events (block 606). In some cases, such information is loaded from the data center at times unrelated to the triggering event received at block 602. The data center may have its own schedule or set of triggering events for downloading information to the data center.

In the depicted embodiment, the vending store 100 or the data center 502 then closes the communication session (block 608). The vending store 100 determines whether configuration changes require rebooting the computer system included in the vending store 100. If such rebooting is required, the vending store 100 then determines whether there is any current interaction with a customer. If the vending store 100 determines that there is an on-going interaction, the store 100 then waits until the interaction is completed for rebooting to occur. In certain embodiments, the vending store 100 may also employ proximity sensors to determine whether a customer is near the store and waits to reboot until the customers leaves the vicinity of the store 100.

Figure 6B:
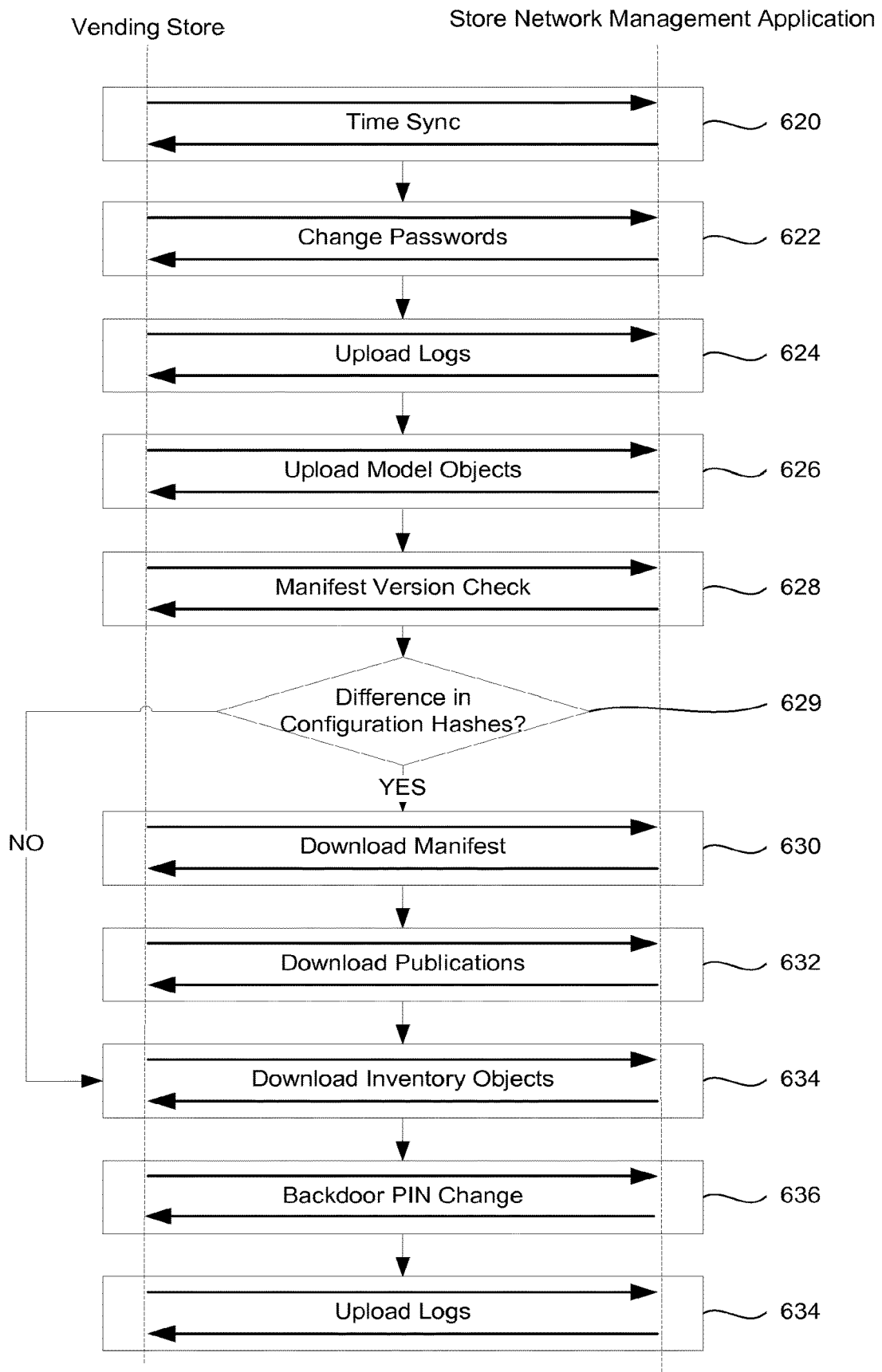
FIG. 6B illustrates a specific process of information exchange operation in accordance with certain embodiments.

FIG. 6B illustrates an example of the information exchange operation 606 in accordance with certain embodiments. A vending store 100 initiates communication with the store network management application 504 at the data center 502. In each information exchange operation, the vending store 100 sends specific information, e.g., time stamp, change password request, etc., and then waits for reply from the store network management application 504. Once the store network management application 504 replies to this information, the process continues with the vending store sending another type of information and so on. If the vending store 100 does not receive confirmation from the data center 502 after any one of its information transmissions, then the vending store 100 will end the communication session but schedule another one at some point in the near future. The next communication session will attempt to continue from the last successful step of the prior session or can start from the beginning.

In the depicted information exchange operation, the process starts with a time synchronization operation (block 620). During this operation, the vending store 100 requests a current GMT time from the store network management application 504. The response from the store network management application 504 is then used to reset the clock on the vending store computer system. An offset for the local time zone of the vending store 100 is part of its configuration and does not change in this operation. After synchronizing its time, the vending store 100 and the store network management application 504 agree on a password to be used during the next communication session (block 622). In operation 624, the vending store 100 sends its diagnostic logs to the store network management application 504. In a specific embodiment, it then receives an acknowledgement of the upload, and then truncates its local log indicating the completion of the operation. The process continues with the vending store 100 uploading any model objects (block 626), which could be Java objects serialized into XML or any other information carrier objects, that have been created since the last communication session. This may include any objects created by consumer interactions (e.g., screen touches, checkout attempts, sales transactions, etc.) as well as diagnostic objects (e.g., alerts for hardware, software, or payment errors). After the vending store 100 receives the acknowledgement of the upload, it deletes the local copies of the objects.

A manifest version check is then performed as indicated at block 628. In a specific embodiment, the vending store 100 requests a hash for all configuration objects in the store network management application 504 that are related to this particular vending store (block 628). This may include the store's hardware configurations, software updates, product catalogs, GUI, etc. The vending store 100 compares the new hash with the hash of the currently configured objects to determine if anything has changed since the last communication session (block 629). If there are no changes, then the process skips the operations of downloading a manifest (block 630) and downloading publications (block 632) and continues with downloading inventory objects (block 634). Alternatively, if the vending store 100 determines any differences in the configuration hashes, then it first proceeds with downloading a manifest (block 630). In this operation, the vending store 100 downloads a list including names and versions of every configuration object. The store 100 then compares the list against its local configuration objects and identifies any new and/or modified objects. The store 100 proceeds with requesting any new and modified configuration objects from the store network management application 504 in operation 632 also referred to as downloading publications. For example, a brand owner may create a new product presentation corresponding to product items stored in the vending store. A publication is an object containing this presentation prepared for being uploaded to the vending store. The store network management application 504 pushes this presentation in the form of the publication object to the vending store (assuming this product presentation was designated for this vending store) in operation 632. Once the store 100 has all new objects, it then combines them with the corresponding unmodified objects to assemble a new configuration of the vending store. The new configuration will be used by the vending store after its next reboot.

The process continues with downloading inventory objects (block 634). An inventory object may contain information about the current inventory of the vending store, inventory changes since the last communication session, requests for additional inventory, and other. An inventory object may have format similar to other objects, for example, a Java object serialized into XML. This operation allows the vending store 100 to communicate any inventory changes to the store network management application 504 and learn about any upcoming restocking events and changes in inventory locations. For example, the vending store 100 may upload information about any inventory movement from the store initiated by restocking personnel and report any discrepancy in incoming transfers identified by the personnel, e.g., when items shipped did not match earlier transfer information or when a restocking operation was initiated before the vending store received any the related transfer information. The vending store 100 may also provide a confirmation to the data center 502 that there were no discrepancies identified during the restocking operations. Furthermore, the vending store 100 may request updates on scheduled transfers and updated listings of inventory locations.

The vending store 100 and the store network management application 504 then agree on a new password to be used by maintenance technicians (block 636) also referred to as a backdoor PIN change. Maintenance and restocking personnel may access the vending stores 100a-c using their key card, PINs, or any other authentication methods and/or devices. Finally, the vending store 100 uploads its diagnostic logs that were generated during this communication session to the store network management application 504 and truncates its local log (block 634).

III. Configuring and Operating Vending Stores

As mentioned before, setting up and operating a vending store may involve two parties, such as a brand owner and a vending store operator. In some models, a brand owner (or a retailer) controls, at least partially, a vending store network including one or more vending stores and a data center. A brand owner or retailer may be responsible for defining certain aspects of product marketing and supply chain distribution, while a vending store operator may be responsible for most aspects of daily operations involving vending stores. In certain embodiments, a vending store operator owns and/or controls both vending stores and the data center supporting these stores and provides retail services to various brand owners. It should be understood that responsibilities of these parties may vary from one engagement to another.

A. Business Concept Development/Network Set Up Functionality

Figure 7:
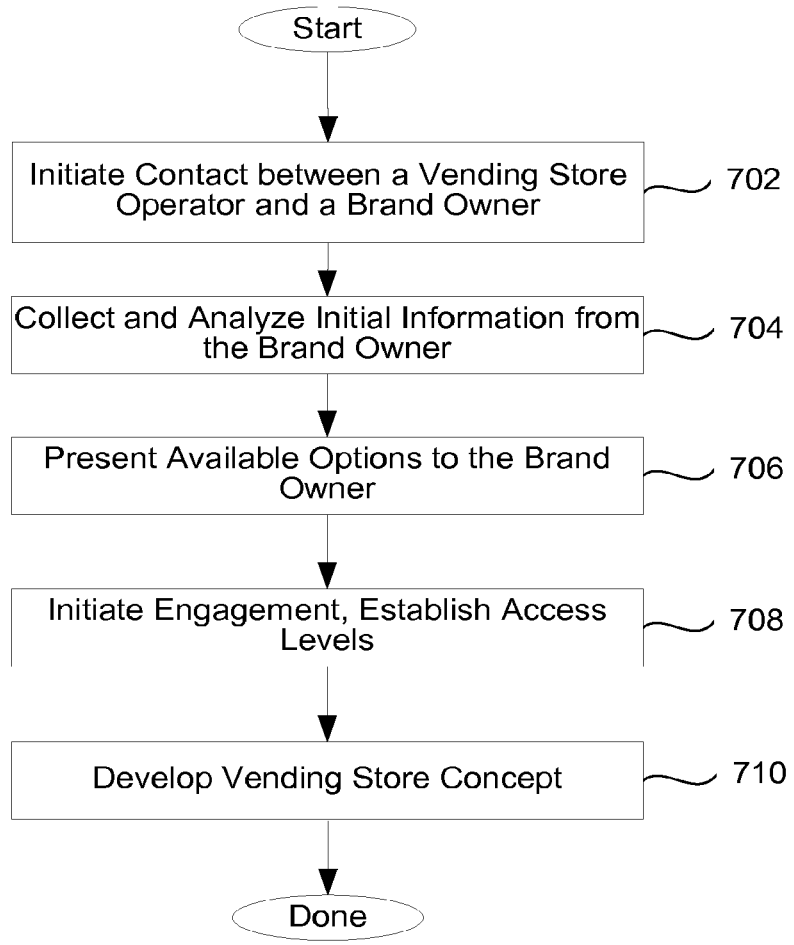
FIG. 7 is a flowchart corresponding to one example of a process for establishing and developing a vending store concept.

A data center may have one or more interfaces specifically configured for various functions that involve brand owners, retailers, and/or vending store system operators. These functions and corresponding interface details may be explained in the context of the following workflow. FIG. 7 is a flowchart corresponding to one example of a process for establishing and developing a vending store concept. The vending store concept may define various features and/or operational details of one vending store or multiple vending stores, such as multiple vending stores operating on behalf of a single brand owner or retailer or under a single theme. A process may start with initiating a contact between a vending store system operator or franchisor and a brand owner, retailer or other entity interested in maintaining one or more vending stores (block 702). For example, a brand owner may enter a web-site hosted by the vending store operator containing general information about services offered and inviting to submit brand owner's information for initial concept evaluation. A brand-owner or retailer may then provide some initial information that is collected and analyzed by a computer system of the vending store system operator (block 704). Such information may include brand owner identification and contract information, product descriptions, product pricing, product packaging information, target markets (geographical, demographical, etc,), target sales, and other information. A vending store system operator may then analyze this information, for example, by comparing to various data points collected in the course of operating other vending store. Some or all of this process may be automated using a computer system or multiple computer systems including relevant data, which may be organized in spreadsheets, databases, and the like. Based on this analysis and currently available technological solutions, the vending store system operator may provide via an appropriate software portal various options for the brand owner to evaluate (block 706). For example, a vending store system operator may have available multiple hardware options for vending stores (e.g., planogram options, sensor devices, product demonstration stations, and/or advertising space), software options (e.g., different levels of user interface interactivity, data collection and reporting options, and/or marketing campaign executions), and other options. Also, a vending store system operator may offer various payment schemes for brand owners or retailers that may include fixed payments, variable payments (e.g., a percentage of the sales), miscellaneous fees (e.g., fees for specific data collections and reports), and combination of thereof. Typically, some or all of these options may be automatically generated, presented, and/or selected using software and/or hardware implemented heuristics.

Based on this information, the brand owner or retailer may initiate a formal engagement, at which point the vending store system operator may set up an account for the brand owner or retailer in the data center (block 708). This account, which may be generated automatically by the associated logic, may specify various levels of access (from a security standpoint) for the brand owner or retailer. For example, one access level may allow the brand owner to view data and configure data collection options. Another access level may allow the brand owner to participate in hardware and software configuration process. Different individuals or entities affiliated with or employed by the brand owner may be given different levels of access. Certain examples of these options are described below in more details. The process may continue with a collaborative development of a vending store concept (block 710), which typically includes developing "look and feel" of the hardware and user interface (e.g., gathering logos and brand images, generating initial samples of various screens of, e.g., a product presentation), identifying and analyzing products items (e.g., developing initial planogram examples), and/or performing initial back-end integration (e.g., setting up merchant accounts, specifying a supply chain process, setting up loyalty programs, providing call center support options, etc.). Relevant details of these various vending store concepts are described elsewhere herein. A collaborative administrative application, of the type described herein, may be employed to develop the vending store concept alone or in conjunction with a higher level business concept. In one example, the development of the concept at block 710 involves the following sequence of operations: (1) creating one or more product presentations (for the products to be vended from each of the vending stores), (2) developing a set of planograms (at least one for each of the individual vending stores), and (3) performing "back end integration" (e.g., setting up merchant accounts, accounting software tools, supply monitoring and control instructions or software, loyalty program monitoring and reporting features, and/or other forms of reporting). Each of these operations may be provided via a separate menu (or other UI feature) in a collaborative administrative application.

The collaborative effort, which involves both the vending store system operator and the brand owner or retailer, is only one example. In some embodiments, the operator or the brand owner or the retailer solely controls these development operations. Of course, the development process employs one or more computational machines or systems to present options (e.g., templates for the look and feel, planograms, etc.) to the developer(s) and, in some cases, to filter and/or flesh out one or more options based on information provided.

In certain embodiments, a vending store system operator and/or associated computational system may offer a list of available retail locations for the brand partner or retailer to select from. For example, the operator may have previously reserved certain retail locations from retail space providers and may have integrated certain aspects of the vending store support into these locations (e.g., network communication links, products replenishment points, etc.). Further, the vending store system operator may have collected and made available for review by brand owners or retailers various relevant data points pertaining to retail location, such as floor plans, traffic data, demographic information, household income, adjacent retail stores, and other factors. This information may be available for pre-selected location or for new locations suggested by either party. The vending store system operator may rely on the previously collected data (from previous operations) to analyze such locations. For example, the relevant vending store data (such as demographic profile and a foot traffic volume) may be used to predict performance features of a new locations by comparing these data points to those of previous or existing locations with similar parameters. Additional data points may include consumer profiles and their marketing needs generated by surveying respondents at a potential location, a drive-time radii map to view area coverage and any overlaps with existing locations, counts of "core customers".

Location examples include, but are not limited to, airports and private air terminals, shopping centers, department stores, grocery stores, mass retail stores (e.g. Target, Wal-Mart), big box retail stores (e.g., Home Depot), drug stores, fashion stores, casinos/hotels/resorts, military, railroad stations and railroad cars, schools/colleges/universities, corporate offices, government, prisons (e.g., telephone cards), hospitals, mail and shipping supply retailers, cruise ships, entertainment parks, and the like.

B. Configuring Physical Hardware

Subsequent development of the vending store concept can be separated, for description clarity, into configuring physical hardware and configuring software. It should be understood that usually these processes are closely interrelated.

1. Planograms

Product items are positioned within product storage modules of the vending store in accordance with a defined configuration, e.g., an arrangement designating each product items to a specific storage compartment in a storage module. This configuration is often referred to as a planogram. In addition to specific locations of each products, a planogram may include, for one or more products in the planogram, product pricing, product codes (e.g., UPC, EPC, SKU, GTIN, etc.), and quantities. The planogram may also include positions of advertisement signs within the product storage modules. Further, in certain embodiments, a planogram includes a list of hardware components of the store to assist during maintenance and repairs. In short, a planogram is a data structure (a logical arrangement of data) depicting the layout of a vending store and including product information and optionally advertising. It may be created with the aid of software and/or hardware for defining and editing vending store layouts. It should be understood that one or more of the products depicted in planogram may be intangible; e.g., media content such as video, audio, game, and/or instructional content. As explained elsewhere herein, a vending store may including one or more interfaces or ports for delivering data to and/or receiving data from users. It is not uncommon for vending stores to include heterogeneous product types such as some tangible and some intangible products.

Criteria or parameters that may be considered in developing a planogram include dispensing capabilities of a vending store (e.g., size and weight limitations), relative positions of the vending store products (e.g., grouping by product categories, grouping by brands, grouping by size, positioning complementary products next to each other), determined or predicted purchase frequencies, lines of sight, visual impacts, and other criteria. A goal of the planogram may be to maximize profits generated by the vending store. A vending store operator may rely on data collected from other vending stores in development planograms for new stores. Further, planograms may be adjusted based on performance results of the store itself (e.g., running comparison tests with different planogram options). One examples of a planogram is presented in the table below. A vending store operator may also develop and provide to the brand owner a corresponding financial representation of the planogram, which includes a product assortment mix in terms of monetary values.

nism illustrated in FIGS. 1A-1D. Other requirements may include packaging size, packaging weight, drop limitations, surface finishes, and position of the bar code and other identifiers relative to sensors of the vending store.

2. Advertising Space

In addition to advertising products through the display windows (i.e., by allowing those products to be viewed through transparent doors of the product storage compartment) and on the user interface, vending stores may provide substantial space for advertizing and other purposes on its side panels. Certain aspects of the exterior signage have been described in the context of FIGS. 1A and 1D as well as FIGS. 2A-2C. Vending stores also provide some space inside the product storage modules 104 that may be used for similar purposes (e.g., signage). For examples, an area where the product delivery mechanism 160 moves in front of the shelves (but behind the windows of the product storage module) has two side panels (element 170 in FIG. 1D) and a floor panel (element 172 in FIG. 1D). Further, a vending store may provide certain exposed areas around the product shelves parallel to the window of the product storage module, which are sometimes referred to as colorways. The product delivery mechanism itself can be used for advertising purposes as it may expose one or more panels to customers at particular times. Finally, some product storage compartments may be used to display advertising instead of carrying products. This may be appropriate when, for example, the product dispensing from one of the compartments is completed and the compartment has not been refilled. A vending store operator may offer a choice of shapes, graphics, materials, finishes for a brand owner to select from both for exterior and interior signages.

3. Sensors

As explained, a typical vending store includes, at least, a computer system, a user interface, and a network interface. Further, in certain embodiments, a vending store is configured to lead customers through the purchasing process starting with a product information presentation and finishing with product dispensing. A vending store allows gathering, analyzing, and reporting of relevant information in a cost effective manner. The unique combination of the hardware elements and functional capabilities, which is not found in traditional retail or web commerce environments, presents unique opportunities for performing a detailed analysis of the purchasing process. An appropriately configured vending store permits, for example, measuring customers' responses to different advertisements, product presentations, hardware configurations, and the like.

One way of gathering information is to use one or more sensors. Some examples of sensors and their uses in a vending store environment were presented above in the

TABLE

| UPC 12 Digit | Product Name | Product Number | Divider Position | Column Spacer | Pusher Req. | Out of Stock | Capacity | Min/ Max | Retail Price |
|---|---|---|---|---|---|---|---|---|---|
| 094000412840 | Kit 1 | 221 | 13 | | 3 | Sign 1 | 9 | 0/9 | $25 |
| 094000412841 | Kit 2 | 222 | 26 | | 3 | Sign 2 | 9 | 0/9 | $45 |

Planogram development may involve extensive dispensing testing to ensure high accuracy of vending (e.g., greater than about 99). In this regard, packaging of certain products may need to be redesigned to improve a dispensing process for a specific dispensing mechanism and product location within a planogram. For example, boxes with flat backs, flat bottoms, and flat fronts are suitable for a dispensing mechacontext of FIGS. 1A-D. Most generally, a "sensor" is a device for capturing data representing a vending store's internal and/or external environment. Most sensors are transducers, which transduce a signal in the environment (e.g., an acoustic or an electromagnetic fluctuation) to an electrical signal, which can be interpreted by a computing system. Typically, a sensor is a device specifically designed to capture one type of information such as an infrared beam in the case of a traffic-counting sensor. In other cases, a sensor (in a broad sense of the term) has multiple roles. Thus, it should be understood that the concept of a sensor extends to the user interface of a vending store. Touch screens, keyboards, microphones, and mice all capture actions taken by a vending store patron, which actions can be treated as sensed signals used by the vending store and/or data center to track relevant information. Other examples of sensors having multiple functions include locks on product storage compartments, card readers, and the like. In certain embodiments, a vending store includes one or more sensors for detecting customer interactions with the vending store and for collecting related information such as details of product selection and purchasing transactions.

4. Samples and Product Demonstration

In certain embodiments, vending stores may be equipped with sample presentation mechanisms which allow potential customers to "test drive" products prior to purchase. Such mechanisms include, for example, sample dispensers, media players and/or download tools, and demo interfaces. Additionally, the main product dispensing mechanisms may be employed to dispense sample size products (e.g., small volume versions of the standard products). Product samples help customers make their purchasing decision in a more informative manner. Certain aspects of a vending store provide unique opportunities for distributing media and physical samples to customers in a cost effective manner. A vending store is typically equipped with a computer system that can be used to perform multiple control functions. The store may also have a user interface, and, in some instances, various sensors (such as those described above) capable of gathering and analyzing customer preferences. Further, the vending store typically has a multi-compartment product storage facility and an advanced dispensing system that allows storing and delivering samples similar to the actual product items. Finally, a vending store is typically equipped with a network interface configured to connect to other data storage systems (e.g., the data center) and can be used to retrieve media samples.

In certain embodiments, a vending store includes one or more liquid storage compartments and atomizers to deliver scented products. Atomization is a process of converting bulk liquid into a spray or mist when the liquid is passed through a nozzle. The liquid may be perfume or any other similar product. In some implementations, a vending store includes a sample liquid storage reservoir, a nozzle, and a pump to pressurize the liquid into the nozzle. Such store may also include a valve that controls the flow of liquid through the nozzle. In certain embodiments, the valve is controlled via a user interface, through which a potential customer can, e.g., touch a region of a display screen to release the sample. In another embodiment, the vending store is outfitted with a separate activation button, specifically designed and utilized for activating dispensing of the sample. It should be understood that vending stores may be designed or configured to dispense a variety of liquid, vapor, and/or solid samples, which are not limited to scented products. Depending on the nature of the sample, a dispensing mechanism other than an atomizer may be appropriate. Examples of such dispensing mechanisms include hand or facial lotion dispensers, perfume, and other substances.

In certain embodiments, a vending store is configured to dispense small, sample-sized versions of a particular product that could be purchased using the vending store. In certain embodiments, the samples are stored in and dispensed from a compartment of the vending store and/or make use of the store's available product dispensing mechanism(s). See e.g., dispensing system 160 and product compartment 109 in FIGS. 1A-D. Thus, small samples can be dispensed to potential customers who visit a vending store but who are not yet prepared to purchase a full-sized product. These small samples may be provided in packaging similar to that provided with the saleable version of the product, just on a smaller scale (e.g., less than about one-half the normal sized product—or less than one-quarter in certain embodiments). Frequently, the samples are provided free of charge to potential customers.

Some vending stores may include features supporting demos for presenting one or more software or media products to potential customers. For example, for video game demos, the store may include a separate LCD screen, a set of speakers, and one or more game consoles. Alternatively, the store may utilize one or more features from the touch screen or other components of user interface 110 (FIG. 1A). In certain embodiments, a vending store contains functionality configured to conduct one or more media demonstrations (e.g., music, films, e-books, photo samples) directly through the user interface or a separate set of video and audio output devices. For such embodiments, a vending store may connect to a data store through the network interface while (or prior to) interacting with a potential customer and use the connection to retrieve media samples from a data store based on the customer's input. The media samples may be stored locally on the vending store and accessed directly during the demo or they may be stored remotely at the enterprise's data center or a third party location (e.g., the Internet site of a brand partner) and accessed via the network connection.

In some cases, a vending store is configured to send a software or media sample to a customer's cell phone or e-mail account. Media samples are sent to service provider servers or directly to customer's devices. For example, a customer can wirelessly connect to a vending store using a Wi-Fi, a Bluetooth, a cell phone network, etc. or physically plug the device into one of the ports provided at the user interface, such as a USB port, a conventional serial port, and other types of ports.

In certain embodiments, a vending store may be configured to ask a potential customer to provide a feedback after trying a sample. In other embodiments, a store may be configured to require that the potential customer provided feedback as a condition of receiving the sample. Such feedback may be solicited and provided by any of various techniques; for example, the vending store's user interface may be designed to display a series of questions about the sample provided to the customer. The store can contain logic for using the responses to recommend a product available from the vending store, other vending stores, and/or in a corresponding retail outlet.

Vending stores are typically configured to gather, analyze, and report information corresponding to samples. The information may include a potential customer's interactions with a vending store before, during, and after receiving a sample, information from sensors, the customer's feedback, information gathered about the customer, and any other available information. For example, sensors may provide demographic information and emotions exhibited by a customer while trying the sample. In some embodiments, sensors may be embedded directly into samples or tools for interacting with the samples. For example, one or more sensors in a game console may be used to capture the temperature of a user's hands and/or the pressure exerted by the user on a game console during playing.

C. Configuring Software

1. Configuring Product Presentation

For the purposes of this document, a "product presentation" is typically an important part of the "graphical user interface (GUI)" of a vending store. A GUI of a vending store may include one or more product presentations (each associated with one or more products vended by the vending store) and optionally additional features not necessarily associated with any specific product vended in the store. In accordance with some embodiments, the main stages of the product presentation development include: gathering information from the brand owners, designing various elements of the product presentation (e.g., wireframes, navigation functions), and building the product presentation to the specification established in the first two stages. Note that development of some aspects of a product presentation may be conducted in conjunction with development of a product presentation. During the gathering stage, a brand owner may provide its visual and/or editorial style guides. Further, a planogram, product images and descriptions may be gathered from previous development processes. A wireframe is then developed. The wireframe is a logical component of the user interface, which establishes how information appears on screens (e.g., navigation) and how various product presentation elements are categorized. Subsequently, visual designs of each screen (e.g., a product page, a catalog page, an idle screen, etc,) are developed. In some embodiments, each screen may include multiple designs. Selection among multiple screens at the user interface level (e.g., which screen to display on the display) may be invoked by user responses (e.g., a discount for purchasing multiple items reflected in the "sale" screen), sensor outputs (e.g., identification that a customer belongs to a certain demographic group and selecting the screen developed specifically for that group). The final building stage involves developing a set of files to be uploaded to the corresponding vending stores that perform functions described above.

In certain embodiments, a brand owner may be closely involved in the software development and configuration processes. For examples, a vending store operator may host a development application in the data center that provides an interface (e.g., a website, a downloadable application, etc.) for brand owners to develop their product presentations. The system may guide brand owners through some stages of the development and configuration, some of which are further described below in the context of product presentations.

2. User Interface Screens

Figure 8A:
FIGS. 8A-D illustrates four examples of the screen types in accordance with certain embodiments.

Screen types may belong to one of many categories determined by the wireframe architecture. FIGS. 8A-D illustrates four examples of the screen types in accordance with certain embodiments. FIG. 8A illustrates an example of a "screensaver" that can includes an attract loop and various screen elements (e.g., product images, video clips, product information, sales information). The purpose of the screensaver is to capture attention of a customer who is close to the user interface but has not yet initiated any interactions with the interface. It may optionally be part of a product presentation or more generally part of the store's GUI.

Figure 8B:
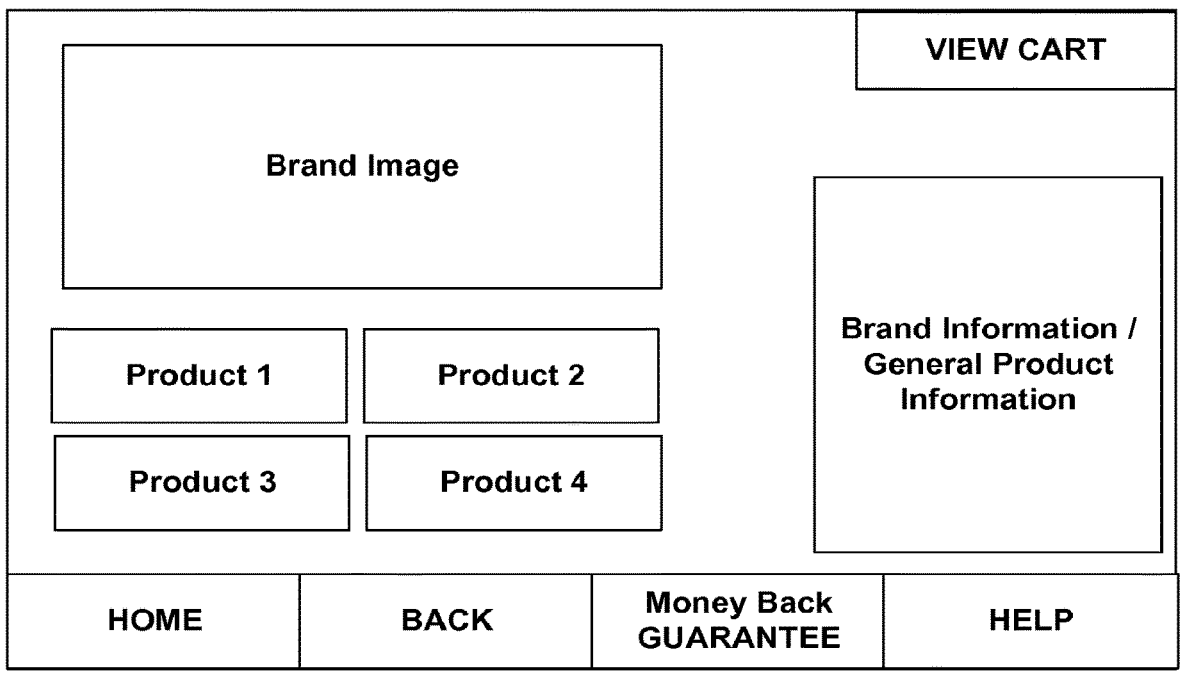

FIG. 8B illustrates an example of a "home screen", which is brought up on the user interface immediately after the customer initiates some interaction with the user interface or triggers one of the sensors. The home screen may include some brand information and general product information. A customer can access additional information by providing some input on the user interface (e.g., touching a designated area on the touch screen). For example, a screen may include one or more buttons that would direct the customer to one of the product category screens or one of the product screens.

Figure 8C:
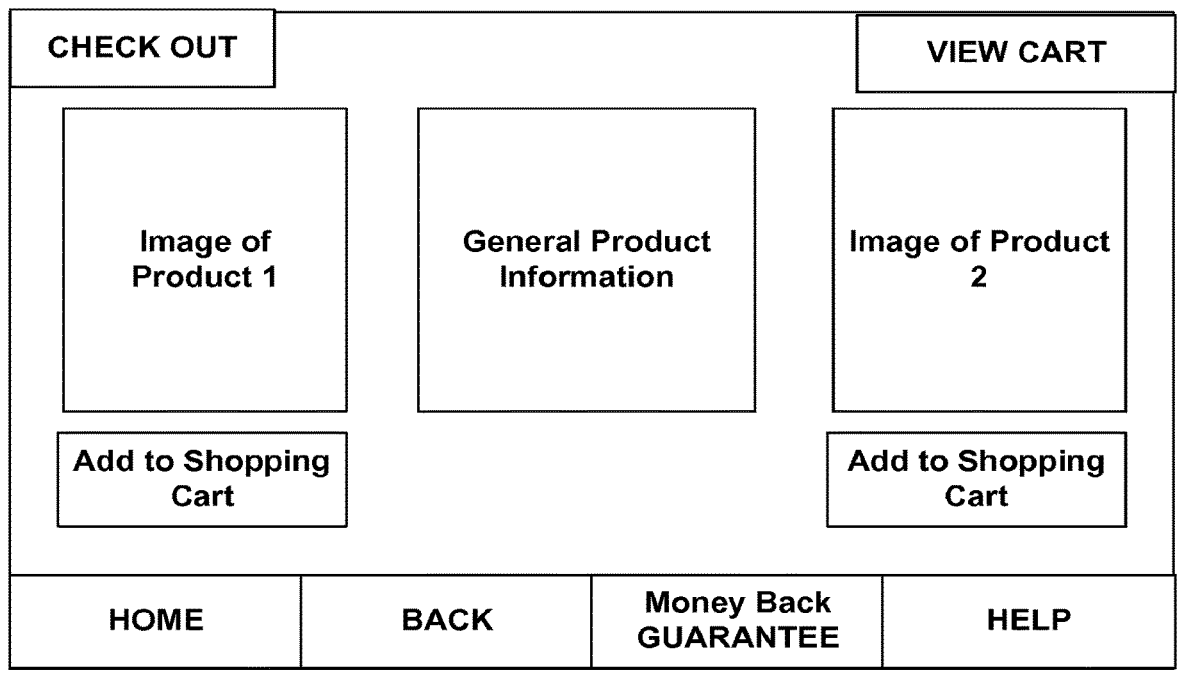

FIG. 8C illustrates an example of a "product category screen" (or simply a "category screen") in accordance with certain embodiments. Such screen typically includes links to one or more product screens and some general information about this product category (e.g., media players, digital camera). A brand owner may choose to categorize its products for ease of navigation among the product screens.

Figure 8D:
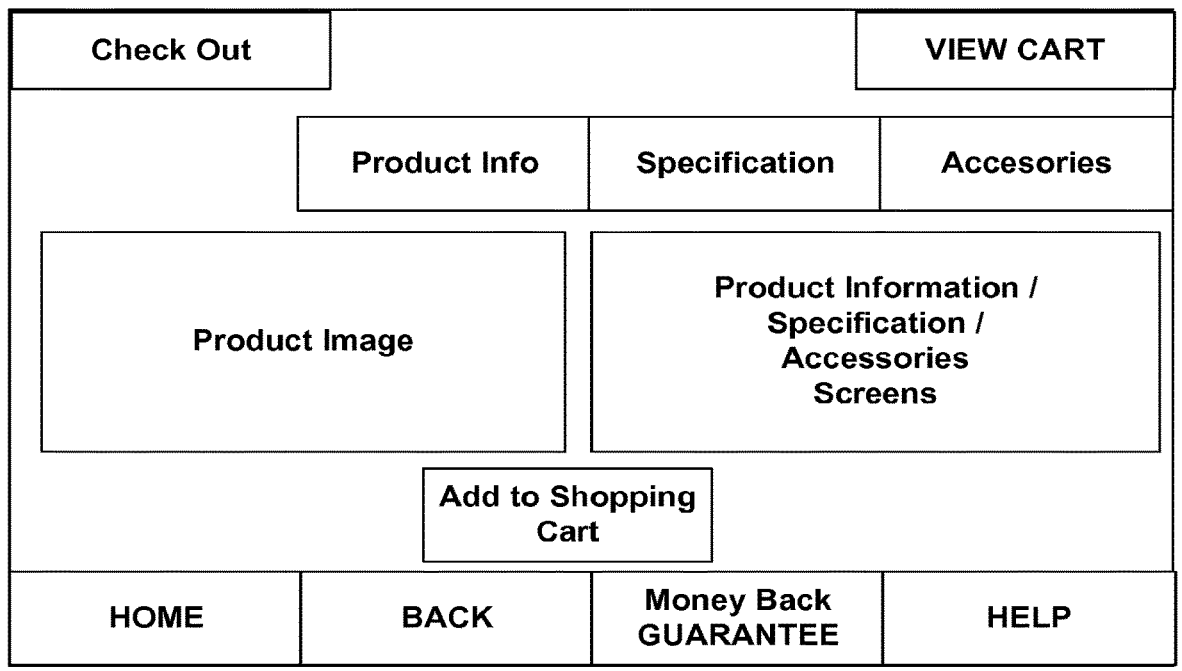

FIG. 8D illustrates an example of a "product screen" in accordance with certain embodiments. It contains information specific to a particular product items, such as a product images, product prices, options, product information, product specification, available accessories, etc. It also includes an option of adding a product item represented by that screen to the shopping cart.

Generally, a home screen, a category screen, and a product screen, include a set of navigation links (e.g., "home", "back", "help", etc.) that directs a customer to other screens. Further, in certain embodiments, the home screen, the category screen, and the product screen includes a shopping cart area (shown in the upper right corners of FIGS. 8B-D) that appear prior to the checkout. It may show the total payment amount and the total number of items currently in the cart. It may correspond to the input that invokes the "shopping cart" screen.

Other types of screen (not shown) include a shopping cart screen, a help screen, a return policy screen, a product comparison screen, a cross-sell/up-sell screen, a survey screen, a multimedia presentation screen, a wizards screen, and an advertisement and promotions screen. For example, the shopping cart screen may allow customers to collect and view selected products before they pay for them. Comparison screens may be used to help customer to determine the differences between multiple products offered for sale in the vending store (or elsewhere). For example, a comparison screen may show side-by-side selected portions of product specifications. When a customer adds a product to the shopping cart, a user interface may invoke a cross-sell/up-sell screen to help the customer to find other available products. A survey screen may be displayed after the customer paid for the product and while the vending store is dispensing products. The screen may invite the customer to participate in a survey that collects demographic and shopping experience information. Multimedia viewing screens may be used for product demonstrations, tips, and previews. Wizards screens can be used an interactive tool to help customers to compare and choose between similar products. Finally, advertisements and promotions screens can display various marketing materials.

3. Brand Owner Development Interface

Figure 9:
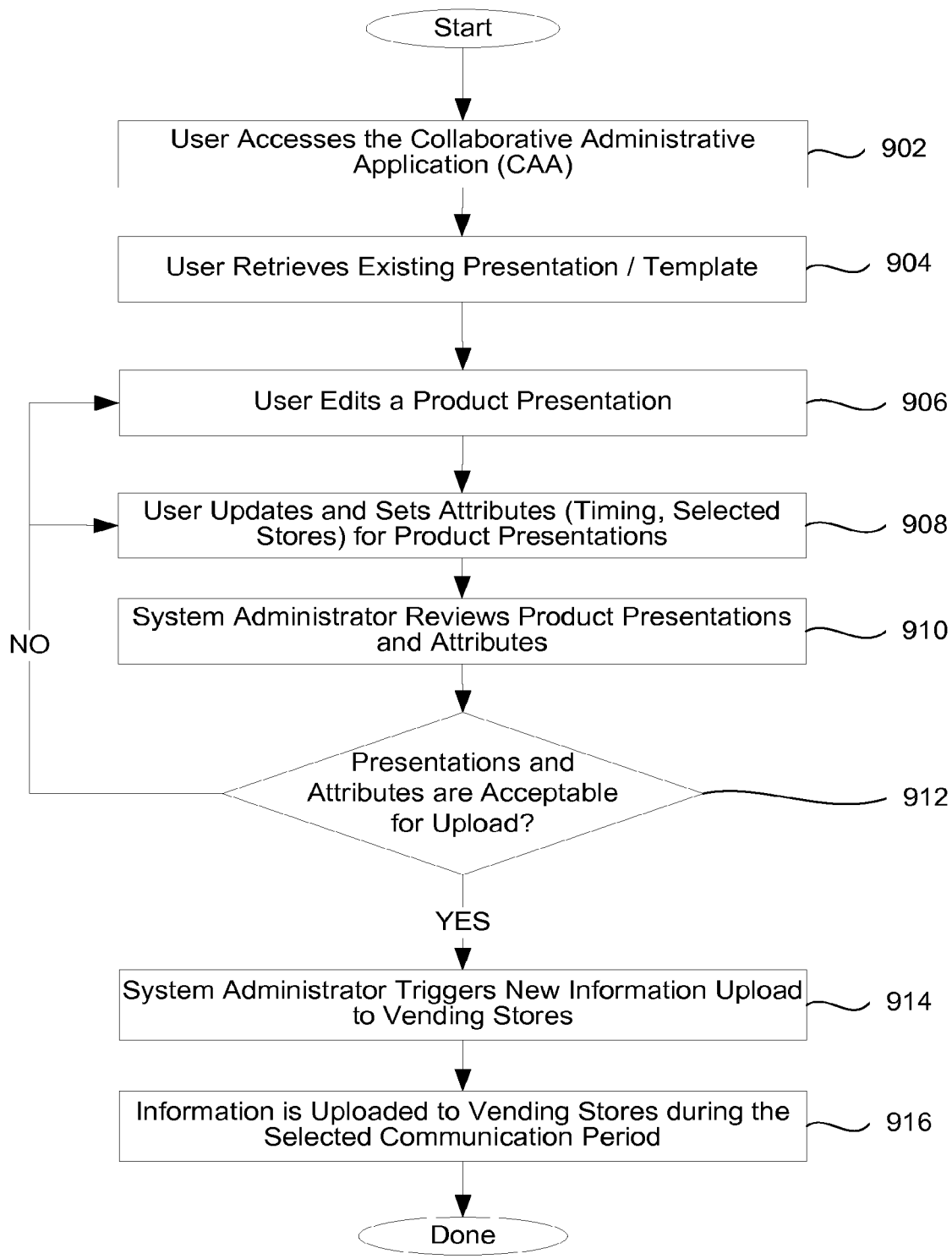
FIG. 9 illustrates an example of a general process for creating product presentations using a collaborative administrative application and uploading the product presentations from a data center to vending stores in accordance with certain embodiments.

FIG. 9 illustrates, as one example, a general workflow or process flowchart for creating product presentations using the collaborative administrative application 506 and uploading presentations from the data center 502 to the vending stores 100a-c. The collaborative administrative application 506 is designed to provide a controlled access to product information to different users, such as brand owners 514. Users can retrieve existing product information, upload new information, delete, modify, control access, and perform other functions related to the product information stored in one of the data centers 510. These functions can be performed through a user interface of the collaborative administrative application 506.

Typically, the collaborative administrative application 506 is configured to provide different levels of access to the product information based on the login information provided by a user. Certain product information may be shared among multiple users: product manufacturers, marketing organizations, wholesalers, retailers, vending store operators, administrative agencies, and others. Some users may require higher level of access than other users. For example, a marketing organization may be limited by the application to the following options: (1) uploading new product information, (2) creating new product presentations, (3) reviewing product information related to effectiveness of the existing product presentation. A retailer may be provided with separate control over product information including: (1) creating, changing, deleting product presentation, (2) designating product presentations to particular vending stores, (3) reviewing product information collected from the vending stores. A system administrator 516, which may act on behalf of a vending store management entity 708, may be allowed to modify certain content and attributes of product presentation, for example, ones that are specific to vending store configurations. This is just one example of allocating access to various functions between different parties. The collaborative administrative application 506 is scalable and can be configured to control access for any number of parties and any number of ways.

The process typically starts with a user accessing the collaborative administrative application 506 in operation 902. The application may provide a web-based interface accessible by entering an appropriate URL in a web browser, a software link installed on a user's computer system, or any other suitable mechanism.

The collaborative administrative application 506 may request that a user provide certain user identification information in order to authenticate users. For example, a user may be prompted to provide a username/password combination and/or some other forms of identification information, such as biometric information or some encrypted identification information stored on some electronic storages medium (e.g., an electronic card, a memory stick, etc.). Various authentication techniques can be used in combination. In some embodiments, a system administrator 516 sets up different levels of access based on individual users or the roles of groups of users and provides authentication information to each user. However, the application may be configured where existing users having defined access levels may set up additional users that have the same or "lower" levels of access.

The collaborative administrative application 506 may provide several functions for managing product information and working with product presentations. Specifically with respect to product presentations, the application may be configured to allow authorized users to view, edit, copy, delete, create, and set attributes (or perform some subset of these operations). Some of these functions will now be described in more details.

An example process of editing product presentations, which also includes creating new product presentation, is illustrated in FIG. 9. The collaborative administrative application 506 may provide one or more interfaces for managing graphics, video, audio, and other formats of product information as well for managing attributes, relations and features of product presentations. Various commercially available software packages for managing different data formats may be integrated into one or more of these interfaces, e.g., Microsoft Office, Microsoft Publisher, Adobe Photoshop, Adobe Illustrator. Managing dynamic fields, attributes, relationships, and other features may be performed using one or more interfaces based on a commercially available database packages, e.g., Microsoft Access, Microsoft Sequel Server, Apache Derby, Oracle DB.

In certain embodiments, a user will retrieve a template or an existing product presentation from a data store (block 904). In other embodiments, the user will create a new product presentation from scratch, using available tools provided in the application. Product information availability may be determined based on a user's access level described above. Templates and existing product presentation may be categorized by their type (general advertisement, a catalog page, a product page), theme (brand specific, demographic specific, holiday seasons, marketing campaign), and other parameters, which are stored as attributes in the corresponding file. The application may include an interface for browsing and searching among available (and accessible) templates and product presentation. The application may also allow certain users to create new templates.

Continuing with the workflow depicted in FIG. 9, the user then edits a product presentation or a template (block 906). The editing process may include arranging the product information available to the user and stored in the data store or externally uploaded by the user. A product presentation may contain one or more dynamic fields populated with information contained in one or more databases. For example, the fields may include links to other pages (e.g., a catalog page, payment page, help page, or product information page), common data (e.g., brand logos and trademarks), dynamic information (e.g., pricing), conditions for invoking certain information (e.g., user input, proximity sensor response).

A product presentation generally includes one or more attributes that can be set and/or modified using the Collaborative Administration Application (block 908) in developing a product presentation. The attributes may be used to define a type of the presentation (e.g., general advertisement, a catalog page, a product page), establish relationships among different presentations (e.g., product pages correspond to a catalog pages, providing input on one page invokes displaying another page, designating types of pages, etc.), designate certain vending stores for uploading the presentation, set rules for displaying the presentation (e.g., timing, sensors data), and other parameters. Other product presentation attributes may pertain to characteristics of vending stores, such as hardware and software configurations, grouping of vending stores (e.g., designating a group of vending stores and establishing various rules for invoking product presentations), utilizing various relationship established among the vending stores in the established group for displaying product presentations, etc. In certain embodiments, attributes may be used to compare the effectiveness of two or more product presentations in the same retail setting.

Generally, a user can exit the collaborative administrative application 506 at any time during editing of the presentation. Before exiting, the user may identify the presentation, which the user has been working on, as completed and ready for uploading to vending stores or as a work-in-progress. The application may be configured to assign corresponding tags to the product presentation file. Further, the application may be configured to initiate review of the product presentation. For example, the collaborative administrative application 506 may send a request to a system administrator 516 to review and approve the presentation. Other configurations for invoking the reviewing operation may be used. For example, a user may be assign reviewers or reviewing may be performed automatically by the application 506 or other modules of the data center 502.

During a review operation 910, a system administrator 516 or any other assigned reviewer may determine whether the completed product presentation meets certain predetermined criteria, e.g., contains all required information, the included information meets specified criteria, and/or is compatible with the configurations of the designated vending stores. In certain examples, the reviewer may update the presentation to ensure its compliance with the criteria, re-route the presentation back to the user for modifications, generate a request for changing configurations of the designated vending stores. Some or all of the review may be automated using internal heuristics.

If the product presentation is determined to be acceptable for upload (block 912), then the reviewer may trigger an uploading request (block 914). For example, the collaborative administrative application 506 may assign a new tag or a change existing tag of the product presentation indicating that it is ready for upload. The product presentation is then uploaded to the designated vending stores (block 916).

4. Purchase Process

Figure 10A:
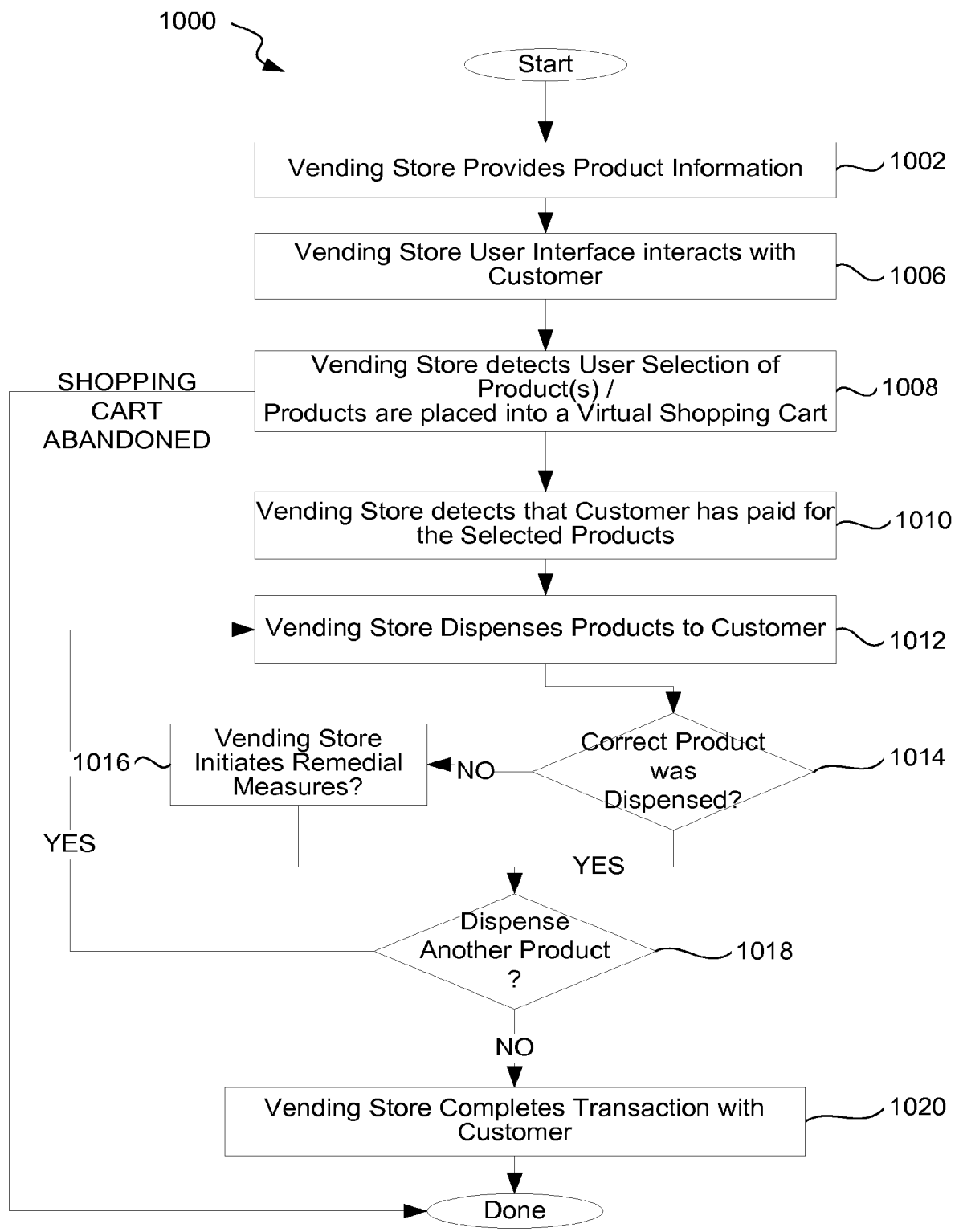
FIG. 10A illustrates an example of a general process flow chart of customer's interaction with a vending store.

FIG. 10A presents an example of a general process by which a vending store may respond to customer actions. In the depicted example, the process starts with a vending store entering an attract mode in which it displays or presents some product or store information or otherwise invites customers to start an interaction (block 1002). Such presentation is conducted through the vending store's user interface using, e.g., visual, audible, and/or mechanical modes of presentation. Such presentation may be driven by a predetermined set of rules and inputs, for example, responses from proximity sensors.

The vending store user interface may transition to a different mode in response to receiving defined input from a user (block 1006); for example, the user may touch a touch screen or trigger one of the proximity sensors. In certain embodiments, the vending store has voice recognition features used to initiate audio interaction with the customer. In response to receiving a triggering interaction, the vending store, through its user interface, may deliver a welcoming message. The user interface may then lead the customer to appropriate product information in the form of, e.g., product presentations (e.g., catalog pages, product pages, or an advertisement) and/or various options, such as help menu, payments, customer service, loyalty club services.

This interaction with the user interface may lead the customer to select one or more products for purchase, e.g., by adding information about such products to a virtual shopping cart depicted via the vending store user interface. The user interface detects this selection and changes state, as appropriate, to reflect this selection (block 1008). In response to detecting particular user selections, the vending store may analyze such selections (e.g., the content of the shopping cart) and suggest, via presentation of new information, other products and services available from the store or other retail locations. For example, if the vending store detects a digital camera in the shopping cart, the store may display information encouraging the user to also select a memory card, a battery, an extended warranty, and/or photo printing services. From the software perspective, services and non-tangible products offered by a vending stores, such as warranties and uploading media files to the customer's device, are handled by the overall system as inventory objects without inventory limits. Non-tangible products don't require physical dispensing but may be transferred as electronic files to the customer's device or media carrier using a direct connection to the vending store (e.g., wire, Wi-Fi, Bluetooth, etc.) or an indirect connection (e.g., a vending store sends an e-mail with the file or a link to the file). Further, some products may be offered as media files that are recorded on media carriers stored in a vending store (e.g., burning a movie on a DVD or Blue-Ray disk, uploading song libraries on to a flash card). In such cases, both media files and media carrier may determine product description and other characteristics (e.g., pricing, inventory).

In certain embodiments, a vending store offers gift cards for purchasing. Such cards may be stored in a designated product storage area of the vending store and dispensed in a manner similar to that of other product items or they may be dispensed via a specialized card dispenser. For example, in certain embodiments, gift cards are dispensed via a cardholder on a side of the vending store and there made available for retrieval and activation by customers. In either approach, gift cards may be made available to customers for selection via the vending store user interface for retrieval and subsequent activation. Using the user interface, the customer can enter a chosen value for the gift card or select one of various values displayed as options via the user interface. For activation, a customer may be instructed to provide additional information such as the type of products that be purchased, the geographic locations and/or retailers where purchases can take place, etc. In certain embodiments, the vending store then adds an item representing the gift card to the virtual shopping card. Some or all parts of the gift card purchase can proceed in the same manner employed to purchase other items from a vending store. Once the payment is processed, the vending store communicates the information on the card, if appropriate, to a corresponding loyalty club service provider or other entity, which effectively activates the card. This information is then used by the networked system and, possibly, other entities outside of the networked system to redeem the card.

In certain embodiments, the vending store is equipped to read from and write to gift cards and may be configured, as well, to redeem gift cards fully or partially. For example, a vending store may be equipped with a magnetic card reader, a bar code reader, an RFID reader, or any other suitable data acquisition and/or recording device.

In certain embodiments, the vending store may be equipped redeem gift cards and record new information on cards during the gift card purchasing process. A vending store may be supplied with the gift card activation information by one or more gift card vendors before any purchasing occurs. Alternatively, the vending store simply reads a card presented by a purchaser at the time of payment, applies the necessary value stored on the card to pay for purchased items and writes a new value on the card. Thus, when a customer completes the payment operation, the vending store records corresponding gift card activation information to the gift card. In these example embodiments, vending stores optionally need not communicate the transaction to the card vendor.

Returning to the description of the general purchase process, a customer may sometimes encounter that a desired product item is not available for immediate delivery from the vending store. The reasons may include a product item is out of stock, a vending store's mechanical malfunction (e.g., a problem with a delivery system) a vending store has advertised a product items that will be available only in the future or is available only in other retails location (e.g., drive back purposes, offering of complementary products and services that can not be delivered from a vending store), etc.

In such situations, a customer may be offered information on where such product item is available (e.g., a nearest corresponding retail location, such as another vending store or a traditional retail outlet, offered an option to reserve the product item (e.g., after paying a nominal deposit), offered an option to pay for the product at the vending store and then received the product item from another location (e.g., shipped to the customer's address).

At some point during interaction with the vending store user interface, a customer may indicate that the product selection is completed and the user interface of the vending machine may present an option to initiate a payment operation 1010. For example, a user interface may display a "Pay Now" or similar message that may be selected by a customer to proceed to the payment operation 1010. In some cases, a potential customer may select one or more product items and then leave. Such situation is sometimes referred to as abandonment. In such cases, the operation 1010 is not invoked. Typically, a vending store waits for a predetermined period of time (e.g., about 1 minute, 2 minutes, 5 minutes, or 10 minutes) to determine whether any further user interactions with the user interface will be forthcoming. If no interactions follow, the vending store empties a shopping cart and reconfigures into the original mode. A user interface may provide a field or icon (e.g., a resetting button) that accomplishes the same function without a need to wait for the predetermined period of time. For example, the next customer may want to start interacting with the vending store immediately after the previous customer left and would like all previous information and selections be ignored. Also, customers may prefer deleting their selections from vending stores before leaving the vending store without making purchases.

Figure 10B:
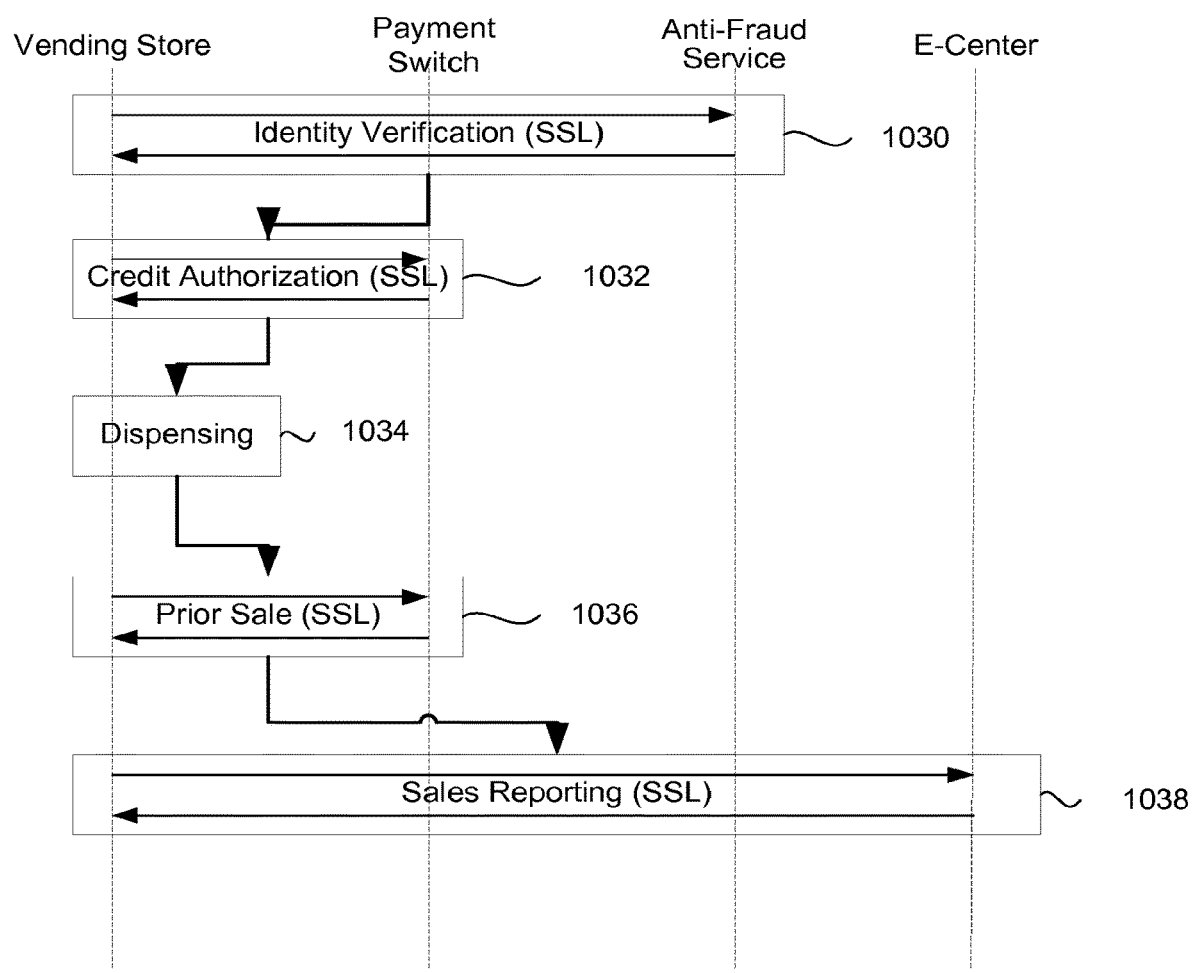
FIG. 10B illustrates an example of a general flow chart of a credit card payment process in accordance with certain embodiments.

If the vending store determines that a customer has elected to proceed with the payment operation 1010, the vending store may proceed directly to requesting and receiving payment for the purchase. In some implementations and/or in certain retail situations, the vending store interface first presents options to the customer prior to collecting payment. For example, a vending store may indicate availability of loyalty club services, suggest additional products and services (e.g., complimentary to the selected products), or provide other services, which are further described in corresponding sections of this document. Thereafter, the payment operation 1010 is invoked. It may start with a vending store presenting payment options, e.g., credit card, debit card, membership points, instant credit, cash, etc. FIG. 10B illustrates an example of credit card payment process. Payment using debit cards, gift cards, or other forms of payment may follow this or similar process.

Continuing with the process illustrated in FIG. 10A, the vending store attempts to dispense the purchased product to the customer. See block 1012. As part of the dispensing process, the vending store determines whether the product was correctly dispensed (decision block 1014). Various internal sensors and/or feedback from the customer may be employed to allow the vending store to make this determination. If the vending store determines that it failed to correctly dispense the purchased product (decision block 1014 is answered in the negative), then the vending store may initiate certain remedial measures (block 1016). In some embodiments, a vending store may request that the customer confirm that the vending store dispensed the product items that were selected. In certain embodiments, the store may request such confirmation after dispensing of every item or only certain predetermined products (e.g., high priced items) during the dispensing operation (block 1014). Confirmation may be done by providing input on the touchscreen, a scanning a product identification (e.g., a Universal Product Code barcode, an Electronic Product Code encoded on the RFID tag), or other forms of input. The store may compare the customer's input to response from the sensors used to monitor the dispensing of the product.

In some situations, the vending store dispenses an incorrect item. The remedial measures configured into the vending store may include providing means for returning incorrectly dispensed product items back into the vending store, providing a receipt indicating the discrepancy and directions for returning the incorrectly dispensed items to another location (e.g., another vending store capable of accepting products, a traditional retail location, or a customer service), providing incentives to the customer to keep the incorrectly dispensed items. In certain embodiments, a vending store may initiate a communication session with one or more of the call centers, and the call center operator assists the vending store in resolving the dispensing problem.

In other situations, a vending store may fail to dispense any item. For example, an item may have been available for selection through the user interface, but was not physically present in the product storage compartment. In other examples, a dispensing mechanism may fail after the item has been selected. In any case, a remedial measure is invoked when a selected items is not dispensed to the customer. In certain embodiments, the vending store indicates to the customer that he or she will not be charged for the items that have not been dispensed. The store may also offer the customer the opportunity to cancel the entire transaction or some part of it. For example, if the store has already successfully dispensed at least one product item, it may offer that customer can either keep the item or return it. Further, when the purchaser has selected a series of items for purchase or has left open the possibility that other purchases will be made, the vending store may through its user interface show the purchaser that additional items are available for dispensing (e.g., when the store dispensing mechanism is still functional and capable if dispensing other items). In the situations where at least one items is kept by the customer (i.e., the entire transaction is not aborted), the vending store may adjust the payment obligations accordingly (to reflect the new adjusted total amount) and/or provide a credit or refund to the user.

Assuming that all of a customer's purchased products that the store has attempted to dispense were determined to have been correctly dispensed or any incorrectly dispensed products have been accounted for by remedial measures, the vending store determines whether additional products are to be dispensed for the customer (block 1018). If so, the process continues as depicted in FIG. 10A by returning to process block 1012. If not, the vending store completes the transaction in an operation 1020. At this point, the vending store may print a receipt indicated a list of products selected and dispensed, payment amount, and coupons. The store may ask the customer to take a survey that includes a set of questions about selected product and retail venue (e.g., why the purchased was made from this vending store?), customer's opinion about the transaction, and other questions tailored to gather information that may be of interest to various parties involved in the networked system.

In certain embodiments, some operations of the purchasing process illustrated in FIG. 10A may be performed by different vending stores or other apparatuses on a network. For example, a product may be selected and, in some examples, paid for at one vending store (or a retail location, or a computer system connected to the networked system)

and retrieved from another vending store. In some embodiments, this is required when a product item is not available or suitable for dispensing from the first vending store. The vending store may be configured to determine a product item's availability from different constituents (e.g., other vending stores, retail locations, warehouses, or even future deliveries) of the networked system and assist the customer with at least certain operations of the overall process.

FIG. 10B depicts one example by which customer payment for a vending store product can be processed by systems used with this invention. Depending on the configuration, a vending store may determine whether identity verification is required. In certain embodiments, the store has an internal set of rules that are used for such determination, e.g., a total transaction amount, a purchasing pattern, membership information, date and time of the transaction, sensor responses, and any other available information. The store may be configured to collect additional information to make the determination.

If the vending store determines that identity verification is required, then it proceeds with such operation (block 1030). For example, a particular transaction may be identified as a chargeback risk based on one or more factors. A risk level may be determined. The identity verification 1030 typically involves collection of addition information, such as a zip code, last four digits of the social security number, an address, a telephone number, a date of birth, a driver license number, and/or any other suitable personal identification information. In certain embodiments, the store will add one (zip code) or two steps (zip code and last four digits of the social security number) to the checkout flow. For example, a store may prompt the customer to enter his or her zip code and then verifies that the accuracy of the zip code in another screen. In a two-step operation, a customer may then be asked for the last four digits of customer's social security number, which are then similarly verified on one of the subsequent screens.

The identity verification operation (1030) proceeds with the vending store initiating Secured Socket Layer (SSL) communication with one of the anti-fraud services available to the store. The store sends information collected from the customer to the service, such as customer's name, zip code, and the last four digits of the social security number to determine if there is a match between the three and/or to any corresponding information from external sources. The anti-fraud service makes appropriate determination and replies back to the vending store, for example, indicating that the provided information matches the information available to the service from other sources. If the information does not match, then the vending store and/or the anti-fraud service may add the information about this particular customer into a lockout database and the transaction is aborted.

In certain embodiments, if the provided information matches, then additional verification is performed by an Address Verification Service (AVS). The AVS verification may still fail, in which case the customer is likewise added to the lockout database and the transaction aborted. However, if both matching authentication and AVS verification succeed, then the payment process continues. Any personal identification information entered during the verification operation 1030 may be discarded. Alternatively, some of the information may be temporary retained to be later used by the vending store in providing additional services, such as signing up for a loyalty club membership, shipping certain items to the home address, and others.

In certain embodiments, the identity verification operation 1030 may involve a velocity detection algorithm, which is implemented on the entire networked system. This algorithm may restrict a customer from completing a transaction, if such transaction triggers certain rules set for the overall networked system. For example, a customer may be prevented from buying more high value items than it is allowed by a predetermined threshold that is established for a predetermined time period. The threshold may be expressed in a number of certain items (e.g., one item more than $500), a total value of the transaction (e.g., more than $1000), or any other suitable forms. The predetermined period may be about 1 hour, about 8 hours, about 24 hours, 3 days, 7 days, 30 days, etc. It will be understood that any combinations of thresholds and periods may be used to set the rules for velocity detection algorithm.

After the identity verification operation 1030 is completed and the customer identity is verified to fall within an acceptable risk level, the store proceeds with contacting the credit authorization operation 1032. This operation may also be the initial operation of the overall payment process illustrated in FIG. 10B, if, for example, the vending store determines that the identity verification operation 1030 is not required. The credit authorization operation 1032 involves contacting one of the payment switches available to the vending store using a Secure Socket Layer (SSL) for authorization of the full cart value including tax (block 1032). In certain embodiments, the communication is compliant with the SAQ level C Payment Card Industry (PCI) standard. The vending store compiles a message to be sent to the payment switch by requesting certain information from the customer. The contents of the message may include entire credit card (or other card types) tracking data. The information may be provided by the customer by swiping the card through the card reader, entering information on the user interface, or other means. The payment switch uses this information to charge the customer's credit card account (or any other types of accounts depending on the method of payment). The payment center then sends an approval message back to the vending store using the same SLL communication connection.

Once the approval from the payment center is received by the vending store, the store starts dispensing the products items corresponding to the list contained in the virtual shopping cart (block 1034). One or more sensors may be used to confirm that: (a) a item was successfully loaded into the bucket, (b) a robotic arm successfully returned to the home position, (c) the dispenser door successfully opened, (d) the customer removed the product from the dispenser. Structural and operational characteristics of the sensors are further described in U.S. Pat. No. 6,758,370 and WO 1994/28497, which are incorporated here by the reference in its entirety for the purposes of describing the sensors.

If all of the items were successfully dispensed, then the store sends the prior sale message to the payment switch (block 1036). On the other hand, if the vending store detects or the customer identifies that certain product items were not correctly dispensed, then the vending store initiates a remedial measure further described in the context of FIG. 10A. Ultimately, if the vending store identifies that it is not capable to correct the dispensing problem, the store indicates to the customer that the total amount is adjusted to reflect only the prices of the items that has been dispensed. In certain embodiments, a vending store is configured to provide an additional discount to the customer to improve customer's overall satisfaction with the transaction. The vending store modifies provides a new total amount and sends a new message to the payment switch for charging the customer account with the new total amount (block 1036).

The contents of the message may contain the full track data on the card. Finally, when the payment is completed, the store may initiate a new communication session (hot-sync) with the data center, as described above, and report the sale and other details corresponding to the transaction (block 1038). Examples of the information include, but are not limited to, identification of the store that recorded the sale, the date and time of the sale, the contents of the cart and which items were successfully dispensed, the name on the card, the last four digits of the card number, and the expiration month of the card. In certain embodiments, the store may perform reporting during the next scheduled communication and group the information pertaining to all transactions occurred since the last session.

5. Loyalty Programs

Loyalty clubs are entities that collect customer information, for example, for marketing purposes. Usually, loyalty clubs provide some incentives to the customers in exchange for their information. In certain embodiments, the networked system is configured to interact with systems operating existing loyalty club programs or to provide the networked system's own loyalty club services. Existing loyalty club programs may be provided by retailers, manufacturer, payment services, and other entities. Vending stores 100*a-c* may be configured to indicating availability of different loyalty club services to customers and deliver such services.

Before customers can use loyalty club services, the networked system must be integrated with one or more of the existing loyalty club programs or configured to provide its own loyalty club service. A user, such as a brand owner 514, a payment service provider 526, or a loyalty programs provider 524, may request a system administrator 516 to implement such services to a set of vending stores. With respect to the existing loyalty club programs, the system administrator may need to determine whether the networked system and the corresponding vending stores have been already configured to execute the requested loyalty club services. If so, the system administrator may need to simply provide a change in the software configurations of the vending stores to make such services available. Otherwise, the system administrator needs to gather information from the loyalty club service provider 524 that would enable the system administrator to configure the network system and the corresponding vending stores.

The data center 502 may be configured to provide the networked system's own loyalty club services. The data center 502 may have a designated application for a brand owner or other user to create and manage such service program or loyalty club service functions into one of the existing applications, such as the collaborative administrative application 506 or the store network management application 504. Any form of software implementation is collectively referred to as a loyalty club application.

For example, a user may be interested in providing discounts to stimulate return of customers to a particular set of vending machines. The user may provide a set of rules for integration into the loyalty club application. An example of a loyalty club rule is issuance of a discount for future purchases to potential customers who made a purchase from a designated vending store during a designated period. Another rule provides a discount to potential customers who interact with particular vending stores, but do not necessarily make a purchase. For example a discount may be awarded to potential customers who complete a survey. The rules are then processed and stored on a server that is used for the loyalty club service and that could be communicate with the designated vending store when customers request the loyalty club services. The designated vending stores are configured to offer and deliver the services to the customers.

Loyalty club services usually require some means of identifying loyalty club membership. Vending stores may be configured to accept customers' input of the identifying information in different forms, such as alphanumeric touch-screen or keyboard entries, magnetic strips, barcodes, RFID tags, biometrics, etc.

In certain embodiments, vending stores are configured to broadcast availability of loyalty club services to customers and, in certain embodiments, identify the likelihood that a particular customer is a member of one of the available loyalty club services based on information provided by the customer during a previous interaction with the vending store. For example, a customer may have already entered payment information or responded to a survey. The store then may use this information to identify the likelihood that the customer is a member of a loyalty club. Further, vending stores may be configured to use previously collected information to recommend, during a particular customer's interaction with a vending store, that the customer subscribe to one or more available club memberships.

If a vending store determines that a customer is a member of one the available loyalty club services, then the store may display to the customer (or otherwise present to the customer) some of the available options. Relevant information concerning these options may be presented through the vending store via, e.g., the vending store's user interface. In some cases, vending stores are configured to accumulate and redeem membership points, issue and accept coupons, and provide additional services, such as gift wrapping and media uploads. Vending stores may be configured to select among available options based on other information pertaining to the current transaction with the customer, e.g., a product type of interest, a stage in the transaction process. Further, vending stores may be configured to customize their user interface based on the retrieved membership information, e.g., displaying a customer's name, suggesting certain products, selecting particular color schemes.

6. Call Centers

In accordance with certain embodiments described herein, a vending store is configured to interact with a call center. Generally, a call center is a centralized office used for the purpose of receiving and transmitting a large volume of requests by telephone. A call center is operated by an entity such as a brand owner, a collection of brand owners, trade group, or an entity responsible for managing the vending stores. Many major businesses use call centers to interact with their customers for purposes such as sales support, help desks, and providing customer support for, e.g., computer hardware and software.

Figure 11:
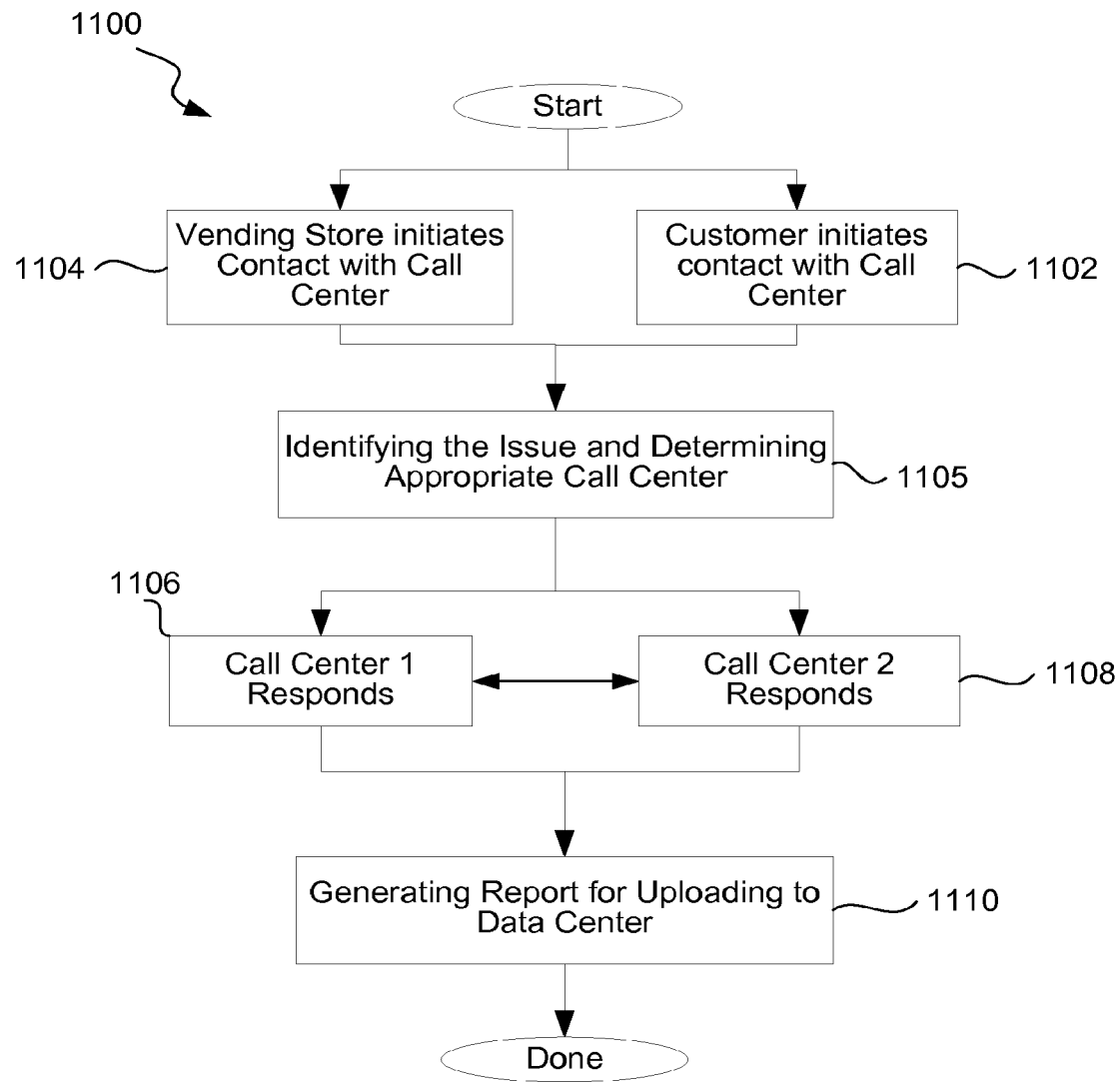
FIG. 11 illustrates a general process flowchart of a communication process between one or more call centers and a vending store.

FIG. 11 illustrates a general process flow for communicating between one or more call centers and a vending store. Communication may be initiated by a customer (see block 1102), by a vending store (block 1104), or by any entity in the networked system, e.g. a payment center, anti-fraud service, loyalty club service provider. For example, a vending store may offer customers the option of contacting a product specialist in order to obtain additional information about a product item or to contact a vending store management entity to report and resolve a problem with the vending store. In certain embodiments, the vending store user interface provides the necessary input and output tools (e.g., audio and video inputs and outputs, and/or a touch screen) for initiating such communication.

In some situations, a vending store may itself initiate a call, for example, after detecting a problem with a dispensing of the product item. The store may directly contact a vending store management entity, which in turn, contacts a call center where an attendant speaks with the customer to guide her or him through the process of aborting a transaction, obtaining a replacement product item, adjusting a payment amount, or performing any other function to mitigate the perceived problem that caused the vending store to initiate the contact. Communication with the call center may be established at any stage of the product selection and purchasing processes.

In certain embodiments, a vending store is configured to execute commands received directly from a call center. For example, a vending store may be instructed to dispense a replacement product or to print a confirmation receipt.

Multiple call centers may be available for a given communication session. Different call centers may be used to address different types of questions and issues: product information, vending store operation, loyalty club services, payments and credits, etc. The vending store may be configured to identify a type of question or issue and initiate a communication session with the appropriate call center (block 1105).

A call center may receive and respond to the call as indicated in block 1106. In certain examples, a call center or a vending store may determine that one or more other call centers may also need to be contacted to address a particular question or issue or combination of questions/issues. The vending store or a call center may be configured to redirect the communication session to another call center (block 1108). A vending store and call centers may also be configured to maintain multiple communication sessions between multiple call centers and one vending store. For example, there may be situations where multiple call centers need to be involved. Such situations may arise sequentially (e.g., a vending store contacts one call center, which redirects the call to another call center) or simultaneously (e.g., a vending store operator and a brand owner may be on call at the same time to address customer's questions about a product item, or a vending store may show an interview with a celebrity from one call center, while taking orders and resolving standard operational issues with another call center).

Typically, a vending store and/or a call center that has been contacted generates a report detailing the questions and issues handled during the session for subsequent analysis by an interested party (block 1110). The data center may process such reports and generate various summary reports to appropriate parties, e.g. brand owners, vending store operators, 3PL services, etc. Examples of data collected by call centers for reporting to brand owners, etc. include, but are not limited to, a number of inbound calls for each vending store, a call volume, a call abandon rate, call durations, wait durations, a distribution of calls throughout the day or a geographic locale, network availability, and various other call statistics (e.g., call types). Data related to customer support calls may be aggregated into, e.g., the following categories: customer terminated calls, refund requests, receipt requests, product inquiries, complaints, billing issues, customer technical assistance, and the like. Data related to technical support calls (e.g., calls to or from restocking or maintenance personnel) may be aggregated into the following categories: basic technical support, complete dispatch reports, opening or closing store modules assistance, replenishment assistance, service dispatch assistance, and the like.

In various embodiments, the call center is contacted directly by or from an vending store. In some cases, however, communication with a call center may be initiated using a different device. For example, a customer may send an e-mail, place a telephone call, use a webpage provided by the vending store operator, or use some other way to provide information to the call center. In one embodiment, a vending store may print a receipt for a customer that lists various options of contacting a call center (e.g., providing a phone number) or send an electronic communication (e.g., an e-mail, a voice mail, a text message) with such options. A triggering event for the vending store to provide this information may be a completed sale, an alert indicating various problems with the vending store (e.g., incomplete dispensing), and/or a customer's input.

A cell center may generate alerts to be addressed by various services of the network system as described below. A data center, or more specifically a Store Network Management Application, may provide an interface for a call center operator to enter information corresponding to an alert, such as vending store identification (e.g., assigned identification number, location, address, etc.), type of the alert (e.g., auto-alert, customer service call, etc.), description of the alert, and a severity level.

In certain embodiments, a data center, or more specifically a Store Network Management Application, automatically generates work orders corresponding to some alerts and dispatches these work orders to corresponding service entities (e.g., based on an alert description and geographic locales). More generally, various actions taken by a call center (including various of the operations described above) may be automated using appropriate heuristics coded in the data center.

7. Using Sensor Outputs to Modify a User Interface and/or Collect Data

Various types of sensors may be used with vending stores. Examples of sensors that may be suitable for certain applications include electro-optical sensors, imaging sensors, infrared beam sensors, laser rangefinders, microphones, motion detectors, photodiodes, photoelectric detectors, piezoelectric transducers, ultrasonic transducers, radio frequency tag scanners, iris scanner, biometric sensors, voice pattern recognitions, eye tracking, facial recognition, retinal scans, and the like. Sensors may be used to detect position, motion, speed, proximity, size, sound, pressure variations, capacitance variations, etc. They may be located directly on or in the vicinity of a vending store.

Sensors may be disposed inside the vending store (for, e.g., monitoring a product dispensing operation), on the outer walls of the vending store (for, e.g., monitoring different areas around the store), or externally with respect to the vending store (for, e.g., capturing images of the vending store and proximity). The last category includes sensors located on ceilings, walls, floors, etc. that are reasonably proximate to the vending store. Certain aspects of internally disposed sensors and their applications are described in U.S. Pat. No. 6,758,370 and WO 1994/28497, which are incorporated herein by reference.

In some cases, a sensor or combination of sensors may be used by multiple vending stores. For example, a foot traffic counter may be used by a set of vending stores positioned in a common location within a building or plaza. The traffic counter may be positioned to count people who come within a defined distance of one or more of the vending stores in the set. In another example, a proximity sensor informs multiple vending stores of a cluster that a potential customer may be in their region. The affected stores may be configured to then, in response to this sensed information, change their presentations (e.g., change the information displayed on their screens, change the volume of their presentations, change a video clip, etc.).

Sensors are typically connected (directly or indirectly) to a processing tool (e.g., a computer system) that processes sensor outputs. Note that, in some cases, the sensor output may be buffered in a storage medium for a period of time before transmission to the processing tool. In certain embodiments, this computer system is the main computer system of the vending store, such as the computer illustrated in FIG. 3A. However, in certain embodiments, one or more sensors may employ a dedicated and separate computer system, which may control the sensors and/or analyze, and even act on, their outputs. For example, a complex video imaging capturing system may include a sensor and an associated processor for evaluating potential customers' profiles (e.g., gender, age, or nationality), emotions, and other characteristics. An associated computer system may be configured to analyze the captured video information and provide evaluation results to the main computer system.

Sensors for use with this invention may capture a wide variety of information types. Examples include customer demographics, customer counts, customer interactions with the vending stores, customer reactions (including emotions) to particular events, and traffic distribution. In one example, sensors are configured to capture customer details in high customer traffic areas. Simple traffic counts at particular locations may determine or indicate lease or property values at retail locations, marketing effectiveness of advertisements in the location, sales volumes, and various other factors that impact profitability of retail businesses. Some retailers are keenly interested in traffic distribution throughout a period of time, traffic speed, customer demographics, emotions and other characteristics of potential customers in the surrounding retail environment. As explained elsewhere herein, it may also be important, particularly for high value items, to ensure the accuracy of product dispensing and inventory and to quickly detect and mitigate any problems with the internal operation of the vending store.

Information captured by a sensor (or a combination of sensors) can be used by the vending store and/or data center for various purposes. In one example, the captured information is used to control and/or modify the actions of the vending store. Such actions include, for example, changing a product presentation (in whole or in part) on the user interface, activating communication with a call center, activating one or more additional sensors to collect further information, analyzing the collected data to, e.g., prepare a report, triggering reporting of an event or a report to the data center or other external entity, etc. In another example, the captured information is conveyed to the data center or other external entity where it triggers one or more actions by the external entity. In certain embodiments, information reported from a sensor (whether raw, filtered, or analyzed) is provided to a brand partner via the data center. Such information available to brand partners may include, for example, abandonment and conversion rate reports organized by particular vending stores, product lines, customer demographic (e.g., age, gender, nationality), shopping patents, etc. In some cases, the captured information is simply stored or buffered by the vending store or external entity in a storage medium.

As indicated, a vending store may be equipped with a traffic counter. Such counter may count individuals who pass in the general vicinity of a vending store (e.g., within about 10 or 15 feet of the store), individuals who pass by more closely or stop and observe the store (e.g., within about 3 to 5 feet of the store), and/or individuals stop for a defined period of time in close proximity to the store (e.g., within about 1 to 3 feet of the store). In some cases, the traffic data shows how individuals react to a particular vending store. Such data includes, for example, the level of interest based on the fraction of individuals in a given region who actually approach and/or interact with a vending store. In this regard, traffic counting data may be used in conjunction with user interface interaction data for individuals who not only come in close proximity to a vending store but also carefully interact with it. Other sensor types that may be used to gauge individuals' reaction to vending stores include eye movement tracking, gaze time, body movements, etc.

In certain embodiments, a traffic counter is implemented in a sensor employing one or more of the following features: an infrared beam, computer vision, thermal imaging technology, and the like. The counter's output to a computer system typically represents the number of people that have passed through an area monitored by the counter. Further, the direction and speed of such people may be evaluated using a combination of counters. A typical beam-based counter increments a count value each time the beam is broken. A computer vision counter uses a camera to capture video images and provide them to a logic module, e.g., a computer system of the vending store, configured to analyze the video images to determine volume, direction, and other relevant characteristics of the traffic. Further, video images may be analyzed for demographics, security criteria, and other information, some of which will be described below in more detail. Thermal imaging counters employ thermal sensors to detect heat sources that correspond to consumers located within the sensor's range.

Certain sensors used on vending stores may count and/or capture detailed information about customers who are near to the store. Such sensors are sometimes referred to as proximity sensors. In certain embodiments, a proximity sensor generates electromagnetic or electrostatic fields and then detect any changes in this field. Some such sensors make use of the human body's ability to absorb electromagnetic waves in certain radio frequency ranges. Analyzing proximity sensor output over a period of time allows a logic module to determine if, for example, a customer approaches a vending store.

Figure 12:
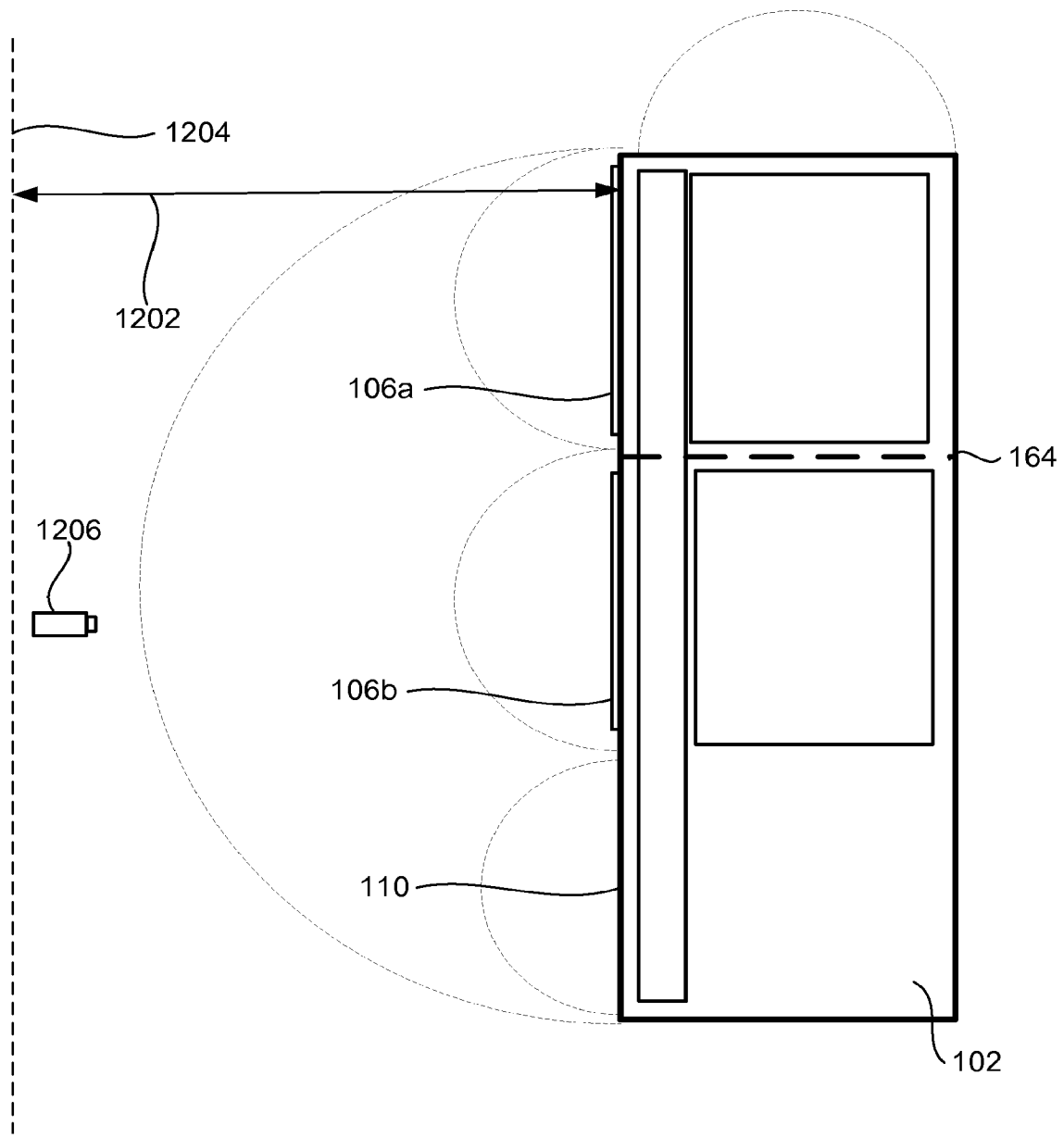
FIG. 12 is a schematic top view of a vending store illustrating different sensor areas around the vending store in accordance with certain embodiments.

Sensors are typically designed to capture signals within certain designated areas inside or outside of the vending store, i.e., a sensed area. The location, size, and geometry of a sensed area generally depend on the sensor configuration (e.g., location, direction, range, settings). FIG. 12 illustrates an example of a top view of the vending store and several illustrative embodiments of the external sensed areas. In one example, a sensed area is adjacent to the front side of the vending store that includes a user interface 110 and access doors 106a and 106b. The sensed area may be defined by a distance 1202 from the front side. For example, the distance may be between about 2 feet and 24 feet, or more specifically, between about 4 feet and 14 feet. It will be understood by the skilled artisan that sensors may be configured to analyze areas in front of either side of the vending store. For example, traffic counters may be installed on multiple sides of the vending store in order to determine the most effective orientation of the store in the retail environment.

In certain embodiments, sensors are configured to obtain information in a predetermined sensed area next to a specific component of the vending store, such as a user interface, a product storage display, or advertisement display. For example, a proximity sensor may be used to detect customer's presence and distance from the user interface 110. The vending store may be configured to change its user interface content and/or message format in response to information regarding the distance of the customer from the user interface (as provided by the sensors). For example, when a customer is far from the user interface (e.g., more than about 6 feet), the user interface may use audio format to invite the customer for additional interaction with the vending machine. As the customer approaches (e.g., between about 3 feet and 6 feet), the audio message may be supplemented with a video message on one of the user interface's displays. The volume of the audio message and the size of the video message (e.g., text fonts) may correspond to the distance of the customer from the respective video and audio outputs measured by the sensor.

As mentioned, some sensors may be physically separated from a vending store 100. For example, a video camera 1206 shown in FIG. 12 may be positioned in front of the store and directed at the store's front side in order to capture customer's interactions with the vending store, appearance of the vending store, and security purposes. The camera 1206 transmits captured images to the vending store using a wireless or wired connection. The images may be analyzed by the computer system of the vending store to determine, for example, information about a customer or customers as discussed above and/or information about the condition of the vending store itself or a stored product item (e.g., that a product item has been misplaced or is missing or that certain parts of the vending store are damaged). The vending store computer system may further transmit images or an analysis report to the data center or to a different location such as one or more call centers.

As mentioned above, sensors may provide information used to determine demographic profiles of customers. In certain embodiments, the relevant sensors have a camera and an associated logic module. These components may also be used for other purposes such as call center communication, traffic counting. For demographics purposes, the captured image may be analyzed by the logic module to estimate, e.g., age, gender, nationality, and/or other demographics characteristics based on algorithms provide on the logic module. The vending store may be configured to personalize its user interface presentation based on the detected demographic information of a potential customer; this is an example of micromarketing. For example, the vending store may be configured to select among multiple product presentations or advertisements (or the language of a product presentation or advertisement) corresponding to the same product item based on the demographic information provided by the sensors. The selected information presented based on demography may be presented via, for example, the user interface 110 including one or more video displays and/or touch screens such those shown in the embodiments of FIGS. 1A-D.

Further, the responsible logic module may be capable of identifying emotions of the customers from the captured images. For example, the image may represent customer's reaction to an advertisement and capture how long the customer actually watched the advertisement, subsequent actions of the customer (e.g., left, proceeded to the user interface, proceeded to the product display), transaction details (e.g., purchase, abandonment, product pages viewed), and other information. Some or all of this information may be shared with a data center and/or specific brand partners. In some cases, the vending store employs a facial recognition system to detect the presence of particular individuals. The store can be configured to use this recognition to trigger a customized presentation based on past purchasing history or other information about the potential customer. Further, the store may activate a loyalty program mode of operation if the potential customer is recognized (via the facial recognition system) to be a member of a particular program.

In certain embodiments, the sensed information measures the impact of new products on consumers interacting with a vending store. Most directly, the vending store provides information regarding the number and frequency of purchases for the new product. Additionally, in some cases, the vending store provides information regarding the interaction of potential customers with product presentations or other content focused on the new product. From such information, conversion and abandonment statistics may be generated and reported. Processing and reporting functionality at the data center can be configured to provide such information in designated formats, in some cases customized for particular brand partners. In some embodiments, deployment of a new product is correlated with other sensed information such as foot traffic, viewing of the new product by potential customers, purchase of other products or related products at the vending store, length of time potential customers linger near the store or interact with product presentations, and the like.

Two or more sensors may be used in combinations to gather a complementary group of relevant parameters. For example, a vending store may use information from a combination of sensors to determine the impact of the presence of third parties on the purchasing behavior of a potential customer, who is interacting with the store's user interface or viewing a particular product in the product compartment. A proximity sensor may be used to detect one or more persons approaching or standing at a designated distance. Concurrently, a video camera may be used to detect reactions of the potential customer next to the store.

Some vending stores may have transparent product storage compartment doors, which allow customers to view product items inside the vending store. Visual appeal of the actual product items may compel customers to approach the product storage compartment doors before beginning to interact with the user interface. Retailers may be interested in capturing customer's attention early in the purchasing process and lead the customer through the process. To this end, a vending store may be equipped with a sensor that determines a customer's focus on a particular product item in the product storage compartment by tracking customer's eye motion (or points of gaze) or by detecting touching a particular point on a product storage door. In certain embodiments, an eye tracking system includes a camera that focuses on one or both eyes and records their movement as the customer looks at the door. Such system may use contrast to locate the center of the pupil as well as infrared and near-infrared non-collimated light to create a corneal reflection. The vector between these two features may then be used to compute gaze intersection with a surface of the door and determine customer's focus on a particular product.

In certain embodiments, an eye tracking system has an illumination source that is coaxial with the optical path where a customer's eye acts as a retro-reflector with the light reflecting off the retina creating a bright pupil effect similar to red eye. Alternatively, the illumination source may be offset from the optical path, where the pupil appears dark in the reflection. In some implementations, the sampling rate of the eye tracking system may be at least about 30 Hz, or more specifically at least about 100 Hz.

The eye tracking system may be configured to identify the location of one product item or a group of items currently being viewed by a potential customer. In certain configurations, the eye tracking system then provides this output to the vending store computer system, which retrieves corresponding product information and displays it on the user interface. In other examples, the computer system is programmed to focus lighting in the storage area on the corresponding product item or move a product compartment of the automated dispensing system next to the product compartment. These are examples in which processing logic on the vending store (or elsewhere) is configured to adjust the content, appearance, and other parameters on a user interface based upon sensor output.

Similarly, in certain embodiments, the transparent door or doors of the product storage module is equipped with sensors configured to recognize the location of a touch, which sensors may operate in a manner similar to a touch screen. Each location on the doors is associated with one corresponding product compartment. In some embodiments, the doors include a visible grid identifying areas on the door that correspond to product compartments. When a customer touches such door in a particular location, the sensor provides output to the computer system indicating the location of the touch and a corresponding product bin. The computer system may then invoke operations similar to ones described above, e.g., display specific product information on a user interface, and/or focus lightning.

In another specific example in which processing logic adjusts a user interface based on sensor output, when a vending store determines that a customer is about to retreat from the store, it may control its user interface to display an incentive to continue the interaction. A vending store may also initiate communication with a call center and have a call center operator communicate with the customer in an effort to persuade the customer to continue the interaction.

In certain embodiments, sensors are used to verify the identity of a user for security purposes. Identification is generally based on information provided by a physical objects (e.g., an access card, a drivers license, etc.), or entered by a person (e.g., a pin code), and/or biometric information (e.g., a fingerprint, a facial feature, and/or an iris image). In one implementation, a vending store is configured to identify and/or authenticate a service technician. In certain embodiments, the vending store uses the identification to determine which level of access should be granted to a technician. For example, a store may grant some technicians access only to an electronic module. It may grant other technicians additional access to a product storage module carrying low-value items. Further, it may grant yet other technicians access to the entire vending store. In certain embodiments, the sensor output is compared with the data on the computer system that was previously provided from the data center or other external source. The vending store may initiate communication with the data center or a call center, when a vending store is not capable of verifying identity of the technician. In the same or other embodiments, the vending store may collect and report sensor outputs to the data center for incident analysis. Examples of sensor outputs suitable for this purpose include images, biometrics, and other information gathered from a service technician during and/or after an initial verification process.

In the same or other implementations, a vending store is configured to identify a customer. In one example, a vending store is configured to request a driver license when a particular condition is met, e.g., the total purchase amount exceeded a threshold. In such cases, the vending store may issue a request to scan a drivers license for certain information (e.g., name, date of birth, address, photo, drivers license number) and compared to the information obtained from a purchasing system (e.g., address, date of birth) or store sensors (e.g., an face image, age estimate, gender estimate, height estimate). Additionally, the vending store may be configured to detect relevant features from and authenticate a drivers license based on one or more designated physical security features (e.g., UV imprints, infrared imprints, and magnetic ink imprints, and/or holograms).

On a vending store, associated sensors may be incorporated into an electrical module, a product storage module, and/or a separate module (e.g., a "new door"). As explained above, in certain embodiments, vending stores may have a modular design. In some implementations, one module is a sensor module designed to easily connect to a standalone vending store at the retail location. For example, a sensor module may be temporarily added to analyze local marketing conditions (e.g., traffic, demographics), support marketing campaigns (e.g., spray perfumes through atomizers, provide interactive product demonstrations, collect customers responses), and perform other functions. Such sensor module may have a separate computer system configured to analyze sensors' responses and provide analyzed data to the computer system of the vending store for subsequent communication to the data center.

It should be understood that any of the processing operations attributed to a vending store may be performed at various locations, not necessarily on the vending store itself. Because vending stores are generally networked to other processing entities such as a data center, the relevant processing logic may exist on or off the vending store. In various embodiments, decisions pertaining to use of sensed information are made by processors located at a data center or a third party node (e.g., a computer of a brand owner). In some implementations, multiple processors (possibly from multiple locations) collectively make decisions regarding actions to be taken in response to particular sensed information.

Figure 13:
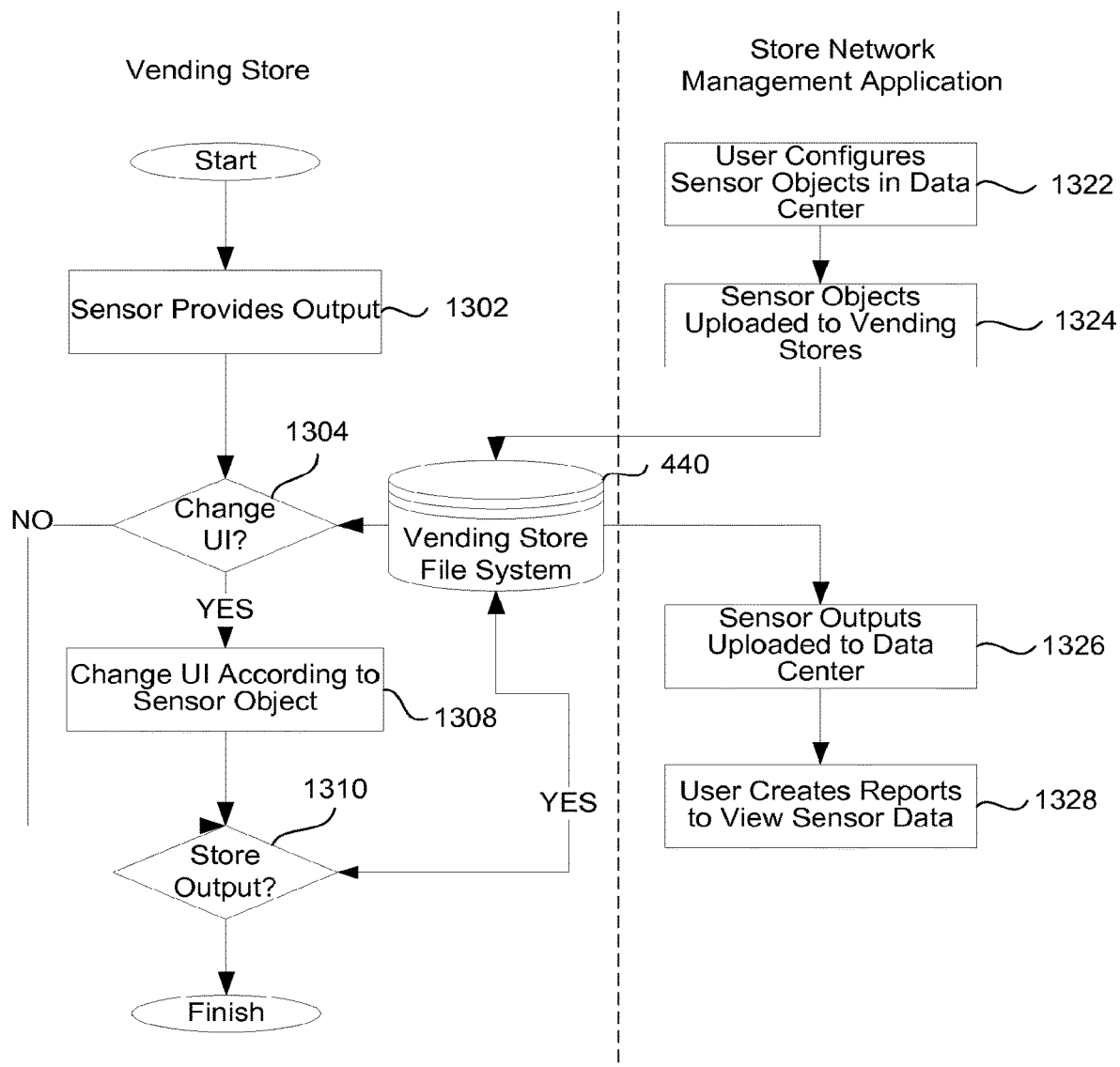
FIG. 13 is a general process flowchart corresponding to a process of using sensor outputs to control the user interface of a vending store and collect information for reporting to a data center in accordance with certain embodiments.

FIG. 13 is a process flow diagram illustrating optional responses of a vending store to events sensed at the vending store. The process may involve modifying the configuration of a user interface on the vending store and/or transmitting sensed information to the data center. The depicted process starts with a sensor reporting an event by providing output to the vending store computer system (block 1302). The computer system is configured apply rules to analyze the sensor output. In certain embodiments, the rules are supplied from the vending store file system 440 and can be downloaded to the file system from the data center during a communication session.

Examples of rules include: (1) adjusting the sound volume and/or visual content of the user interface according to a potential customer's proximity to the store (e.g., reduce the volume when the individual approaches the store), (2) adjusting the sound volume and/or visual content of the user interface when a customer retrieves an item from the store, (3) retrieving and displaying a product presentation designated for a specific demographic category upon determining that the customer belongs to this category, (4) recommending a product or service according to customer's response to receiving a sample, (5) recommending a product or service according to customer's focus (eye tracking or touching) on a particular product item displayed in the product storage, (6) adjusting sound volume and visual content of the user interface according to customer's prior interactions with the user interface, and (7) initiating a communication with a call center according to customer's prior interactions with the user interface. It should be understood that individual components of the user interface may reflect the changes separately or in concert. For example, in some cases a primary touch screen of the user interface may respond to the sensed output, while a video display screen placed on upper reaches of the vending store remains unchanged. In other cases, the video display screen changes its content, while other components of the user interface such as the touch screen remain unchanged.

Returning to the process shown in FIG. 13, the vending store logic may determine that the sensor output requires a change to the user interface (block 1304). For example, the computer system may provide product information specific to an identified demographic category determined for a user proximate to the vending store. If a change is required, then the computer system provides instructions to the user interface for presenting new information (block 1308).

Certain sensor outputs do not trigger changing the user interface (e.g., incrementing a traffic counter may not impact a user interface) or a rule indicates that no changes to the user interface are needed. Regardless of whether a change to the user interface is necessary, the process additionally determines whether the sensor output needs to be stored and/or reported to the data center (block 1310). In one implementation, the computer system invokes a set of rules from the file system 440 for storing data. These rules may instruct the computer system to, for example, (1) prepare the sensor output for uploading to the data center in the next host-sync operation; (2) analyze and/or modify the information; (3) store the information locally on the vending store; (4) incorporate the information in a report; and/or (5) discard some or all information. In certain embodiments, information may be initially processed by a vending store prior to transferring it to the data center. For example, certain information may be collected for temporary purposes and does not need to be uploaded to the data center. Further, some information may be aggregated and delivered in less granular form to the data center.

In certain embodiments, rules for determining whether to change the display or other aspect(s) of the user interface presentation in operation 1304 are stored in the vending store file system 440. Likewise, rules for determining whether to store sensor outputs in operation 1310 may also be stored in system 440. Still further, as well as any information (e.g., advertisements, product page) that may be needed to implement the changes in operation 1308 may be stored in system 440. Such rules and information may be uploaded to the file system 440 from the data center during one of the host-sync operations further described in the context of operation 1324. Additionally, the sensor outputs themselves and/or information corresponding to such outputs may be stored in the file system 440. Further, sensor outputs and/or the corresponding information may be uploaded from the file system 440 to the data center during one of the host-sync operations further described in the context of operation 1326.

A user (e.g., a brand owner) may access the store network management application that is available from the data center to configure pertinent settings regarding sensors and/or information collected from sensors (block 1322). This operation may involve creating new settings and information, editing and deleting existing settings and information, and setting attributes for these features, such as designating certain vending stores for uploading sensor information to, establishing timing for uploading and execution, and processing information received from vending stores. Pertinent sensor settings and information may include sensor configurations (e.g., for activating/deactivating sensors, for establishing sensing parameters and thresholds, and for establishing output parameters). Further, relevant configurations may include sensor output processing rules (e.g., for updating a user interface based on certain sensor outputs, for retrieving specific information from sensor outputs, and for storing certain information corresponding to sensor outputs) as well as other types of configuration information related to operations of sensors.

The store network management application may require a user to provide certain authentication information before operation 1322 can be initiated. For example, a user may be prompted to input a username and password combination that corresponds to a certain access level. The access level may restrict certain aspects of operation 1322, e.g., a user may be limited to designate only certain vending stores for uploading sensor information to and may be limited to certain types of sensor information and/or settings based on hardware and software configurations of the designated vending stores.

Once operation 1322 is completed, the configured sensor information and/or settings may be uploaded to the designated vending stores in operation 1324. Uploading is typically performed during a host-sync operation. Timing of the uploading event may be determined by sensor attributes. For example, uploading may be scheduled for the next host-sync operation or at some predetermined time in the future. Once the sensor settings and information are uploaded to the file system 440, the vending store may use these settings and information in operations 1302, 1304, 1308, and 1310 described above.

A user may be interested in receiving and analyzing certain information corresponding to sensor outputs. For example, a user may configure a sensor object (e.g., a collection of data and/or rules regarding one or more sensors) to collect traffic information, e.g., a number of people passing the vending store. In some embodiments, sensor outputs are stored in the file system 440. These outputs may be uploaded to the data center in operation 1326, e.g., during one of the host-sync operations. It should be noted that the sensor objects configured in operation 1322 and uploaded to the vending store in operation 1324 may direct the vending store to process sensor outputs prior to storing in the file system 440 and/or prior to uploading to the data center.

Finally, a user may access the store network management application to view sensor outputs uploaded to the data center in operation 1326. In certain embodiments, the application is configured to allow a user to create reports based on the uploaded information (block 1328). For example, a user may select information for specific vending stores, product items, periods of time, information type (e.g., traffic, demographic), and other criteria.

D. Troubleshooting Functionality

Vending stores and a data center may be configured to generate automatic alerts pertaining to various performance issues (e.g., hardware, software, inventory, transactions, etc). Some alerts may be initiated by customers during interaction with the user interface (e.g., reporting misvend) or by service call personnel (e.g., responding to a customer call). Alerts can be generally categorized into auto-alert, manual alerts, customer service calls, urgent parts requests, technician calls, and non-urgent part request, which are further defined in FIG. 14A.

Alerts may be assigned a severity level. In certain embodiments, the severity levels are categorized according to revenue generation capabilities of the vending store. Examples include, but are not limited to, "not capable of generating any revenues", "capable of generating revenue at a reduced level", "revenue generation is not affected."

Once an alert is addressed, the entity that addressed it may provide an entry into the data enter identifying the vending store, the status of the alert and corrective actions, servicer identification, timing of the alert and completion of the service, any task codes associated with the type of service, description of the service, repair category, repair code, and any miscellaneous notes. FIG. 14B illustrates some example of the correction codes.

E. Inventory Management

A store network management application module (element 504 in FIG. 5A) in combination with an Enterprise Resource Planning module (element 508 in FIG. 5A) and various external services allow the vending store operator to provide multiple supply chain functionalities. For example, a vending store operator may manage all movements of merchandise among third party logistic (3PL) services, which may include brand owner or retain warehouses, replenishment carriers, which are also referred to as restocking service providers, and actual vending stores.

Figure 15:
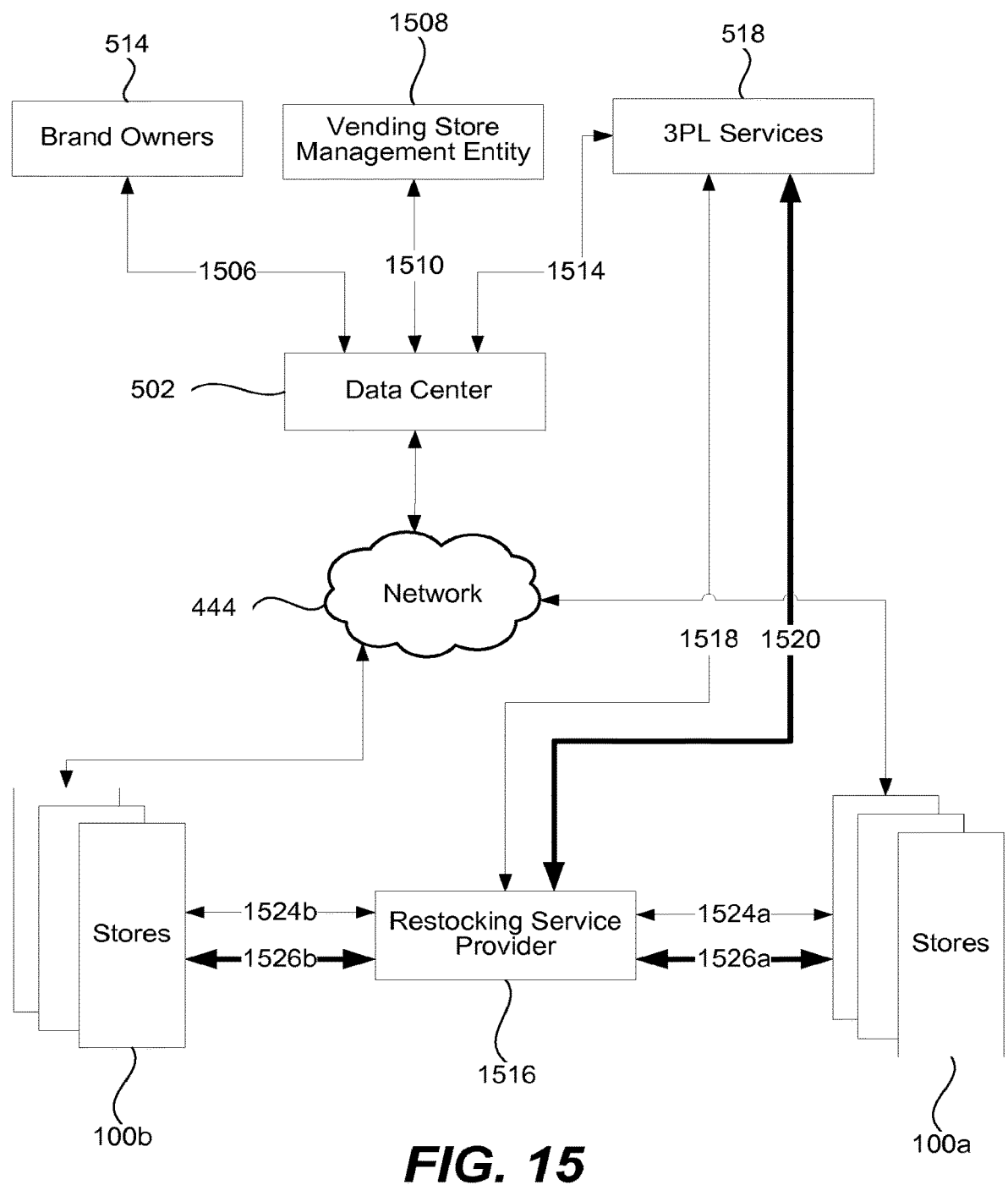
FIG. 15 is a flow chart showing interactions among various entities involved in managing inventory of vending stores.

FIG. 15 is an example block diagram showing interactions among various entities involved in managing inventory of vending stores in accordance with certain embodiments. The thin lines represent information flow, while the thick lines (1520, 1526a, and 1526b) represent the product flow. Three types of entities, specifically the brand owners 514, the vending store management entity 1508, and 3PL services 518, communicate with the data center 502. Detailed descriptions of the communication processes associated with lines 1506, 1510, and 1514 are provided in the context of FIG. 5A. In addition, the data center 502 communicates with vending stores 100a and 100b via a network 444. For example, the vending stores 100a-b may send inventory information to the data center 502. The data center 502 then processes this information and sends restocking requests to the 3PL services 518. The 3PL services 518 use these requests to pack the products and ship (line 1520) them to restocking service providers 1516. The 3PL service 518 may also send information (line 1518) on the shipment to the restocking service provider 1516. In certain embodiments, this may be a packing slip included with the package. In another or the same embodiment, this may be an electronic data transfer between the two entities.

The 3PL services 518 also communicate the information on the shipments to the data center 502, which then processes this information and further sends it to the vending stores 100a and 100b. Once the restocking service provider 1516 receives the shipment (line 1520) it stocks the shipped product to the designated stores 100a and 100b. The inventory transfer at this stage is shown with lines 1526a and 1526b. The vending stores 100a and 100b may prompt the restocking service provider 1516 to confirm the information received by the vending stores 100a and 100b from the data center 502. The process of confirming the information against the packing slip and the actual products received is shown with lines 1524a and 1524b. The store may also include an algorithm to deal with discrepancies. Moreover, the vending stores 100a-b may direct the restocking service provider 1516 to move some of its own inventory or redirect some of the incoming inventory to another vending store, which is also illustrated by lines 1526a and 1526b.

Figure 16:
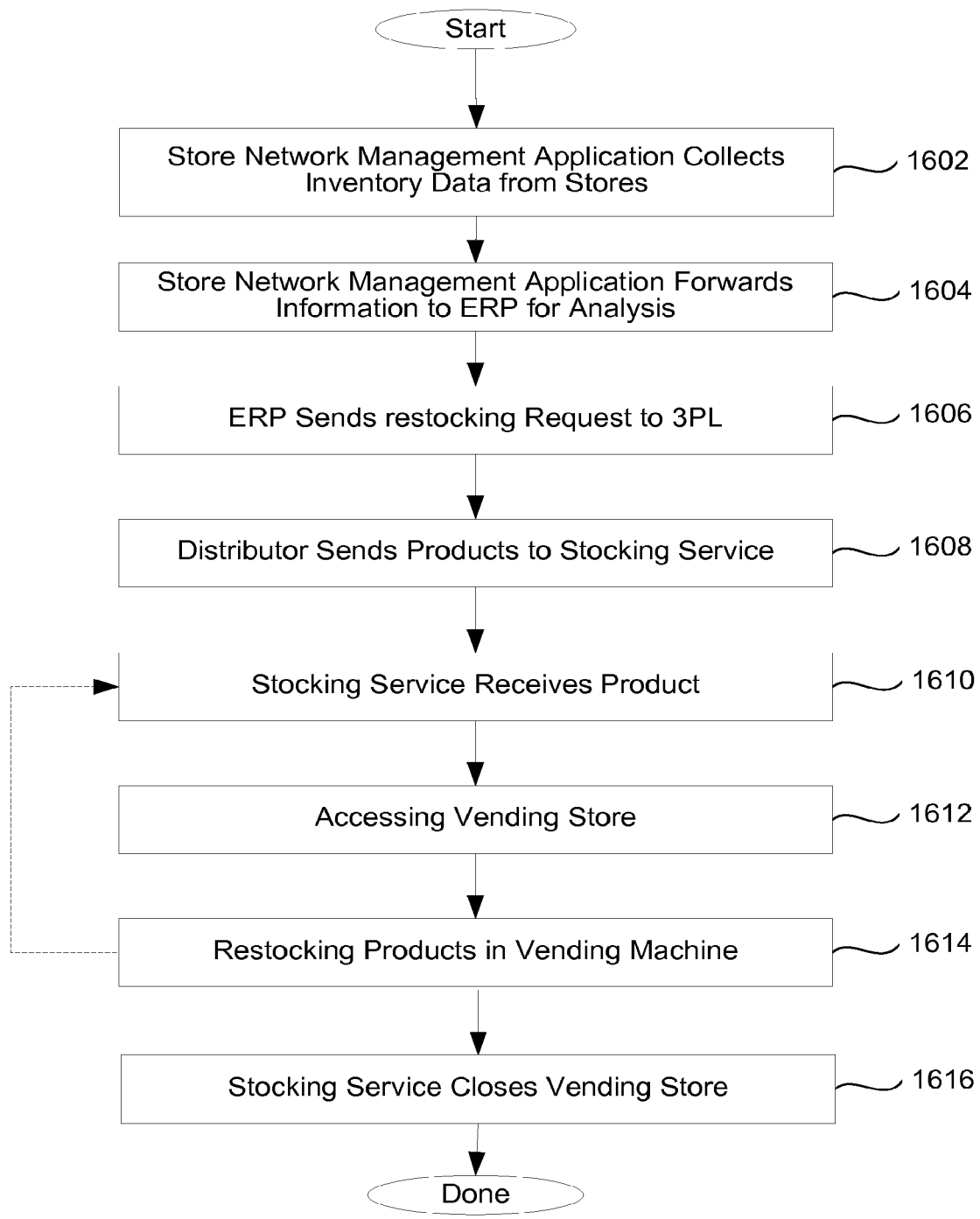
FIG. 16 illustrates a process of replenishing inventory of vending stores.

FIG. 16 illustrates a example process of replenishing inventory of the vending stores. In accordance with certain embodiments, the vending stores may stock much higher value inventory than other unattended retail devices, such as traditional vending machines. As such, it is important to be able to track the inventory of the vending stores very precisely every time it moves or changes custody to avoid products being out of stock or over-stocked or stolen from the supply chain. Such tracking may also resolve any discrepancies between suppliers, distributors, and vending store owners and allow the parties to allocate financial burdens among themselves. Inventory management systems, such as those described here, facilitate resolution of any inventory issues in precise and prompt manner keeping all parties informed.

The depicted process may start with the store network management application 504 collecting inventory information from vending stores (block 1602). This information may be collected during a typical communication session. Various methods may be used to collect and maintain inventory data in the vending stores. In certain embodiments, a vending store management entity 1508 or a restocking service provider 1516 takes physical inventory of the items in the vending store. For example, a serviceperson may take physical inventory when he or she accesses the product storage module. A serviceperson may use a variety of tools and methods to expedite the inventory tracking operation. Such tools include RFID and barcode technologies.

In another embodiment, the vending store may automatically collect inventory information. A products storage module may be equipped with one or more sensors to identify the presence of one or more product items. For example, each product item may carry an RFID tag that is periodically scanned with an RFID scanner in the vending store. Alternatively, a vending store may assess a number of product items in each product's compartment based on positions of respective product displacing mechanisms, e.g., a number of product items in each product compartment should be approximately proportional to a distance between the front edge of the shelf and the corresponding mechanism. The vending store or the store network management application 504 then monitors all products dispensed from the store and transferred into the store and calculates the remaining inventory. As explained below, a serviceperson may report inventory information to the store network management application 504 by entering such information in the user interface of the vending store, by telephoning the data center or a third party service provider home base, etc.

In some cases, the results of the physical inventory are compared with the most recent calculated inventory to identify and evaluate any discrepancy. Any discrepancy may be treated as part of the inventory data or handled separately. The vending store and/or the data center 502 may invoke a set of operations to deal with discrepancy. In certain embodiments, the vending store initiates an investigation request to determine the source of discrepancy including inventory and restocking history, access logs, and various sensors information.

Once the store network management application 504 receives inventory information from the vending store, it forwards this information to the ERP module 508 for analysis in operation 1604. The ERP module 508 may employ various inventory planning tools to analyze the information and combine it with other relevant data, such as new product releases, sales forecasts, distributors' inventories, and planograms, to generate restocking requests. In certain embodiments, the ERP module 508 creates restocking requests automatically using an inventory demand planning tool. Moreover, a planner may enter a request manually into the ERP module 508, upon reviewing current inventories, purchasing trends, etc. The planner may be a representative of a brand owner 514, a vending store management entity, or a third party.

During initial set up of a vending store, the inventory information and sales history data for the vending store is not available. In this case, a vending store operator may rely on the product capacity of the vending store (to completely fill the store with products during its first stocking) or some other algorithms to determine initial inventory.

Regardless of how they are generated, restocking requests are sent to 3PL services 518 in operation 1606. In certain embodiments, the request is transmitted using an FTP (file transfer protocol) or a standard messaging protocol to a 3PL's website, where it is later picked up and loaded onto a 3PL's system. An example of such request is a purchase order. The 3PL's system may contain a corresponding ERP module. Note that the stocking request may be generated and possibly transmitted by the ERP module 508 in the data center 502 for the vending stores.

After receiving the restocking request, the 3PL service 518 picks, packs, and ships the order to the restocking service provider 1516 in operation 1608. In certain embodiments, an intermediate warehouse that is managed by the vending store operator or a brand owner may be used in this transaction to accumulate and then redistribute the products. In such situations, the 3PL services may receive aggregate requests for multiple vending stores and/or longer time periods and then the intermediate warehouse fulfills immediate needs of each store. The shipment may need to be sent in multiple packages and the requested products may not all be sent due to availability. Details of the exact contents of each package are sent to a vending store management entity 1508. This may be accomplished by, for example, the 3PL services 518 posting a file to its FTP server where it is picked up by the vending store management entity 1508 and loaded onto the ERP module 508 of the data center 502. In general, the communication confirming shipment may be sent from the 3PL ERP module 519 to the vending management entity's ERP module 508. The information on the packages that are in transit to the store may include tracking numbers, contents, expected delivery dates, designated vending stores, recipient, shipping address for the pick up points, expected delivery time, etc. This information may be provided from the vending management entity's ERP module 508 to the store network management application 504, where it is uploaded to the corresponding vending store during the next communication session.

The vending management entity's ERP module 508 may add other information to packaging slip data provided by the 3PL services 518 before uploading it to corresponding vending stores. In some cases, distributors are not able to complete orders as requested, and the ERP module 508 needs to determine if any additional actions are required. For example, the ERP module 508 may request shipping of product items from other vending stores or retail outlets with sufficient inventory. In such cases, restocking service provider 1516 may be required not only to access a vending store to replenish inventory, but also to remove some inventory and send it other stores. Therefore, the inventory may be balanced among the stores. Additionally, the ERP module 508 may generate messages to be displayed on a user interface of a vending store with product availability dates, locations of the nearest vending stores and/or retail outlets stocking products items that are determined to be out of stock in the vending store.

In the depicted embodiment, the restocking service provider 1516 picks-up the shipment and delivers it to the vending store (1610). Typically, though not necessarily, the vending store will have already received the information about the incoming packages. In certain embodiments, the store may require the restocking service provider 1516 to verify packaging contents and report any items that are missing or damaged. For example, the vending store may require the personnel to resolve any issues before granting access into the product storage module of the vending store. The resolution may require contacting the vending management entity 1508 and/or the 3PL services 518 in charge of shipping this product. This approach effectively establishes a chain of custody for product items and enables precise identification of most inventory issues.

The restocking service provider 1516 then access the vending store (block 1612), which normally requires certain access privileges described above. These privileges may be differentiated based on the value of merchandise in the store and other parameters. In certain embodiments, the restocking service provider 1516 may enter an access code on a user interface, provide an access card to a card reader, provide biometric data to a biometric reader, and/or provide any other forms of identification. In certain embodiments, a combination of an access card and a security code may be used. Access codes may be uploaded during communication sessions. Access cards may contain various forms of physical and digital security. Once the information is verified, the vending store may grant access to the entire product storage module or a part of it. For example, a vending store may have several product compartments with different levels of access. Based on access information provided by the restocking service provider 1516, the vending store may determine which product compartments should be opened. The provider in charge of restocking lower value items may not be allowed to access compartment with high value items.

In certain embodiments, the vending store may record provided access information as well as time and duration of access. This information may be added to an access log. Additionally, corresponding inventory information, e.g., inventory of the vending store, inventory of the received packages, may also be a part of the access log. The access log may be later used to reconcile any discrepancies.

The product items are then stocked into the vending store (block 1614). The entire product delivery may be designated to a particular store or one delivery may be shared between multiple stores. The restocking service provider 1516 may be requested to perform physical inventory of all or selected items in the vending store before and/or after restocking. In certain embodiments, a vending store performs automatic verification of the products inside the store (using, e.g., sensors such as optical sensors or RFID sensors) and may request the restocking service provider 1516 to confirm the data. The vending store may require the restocking service provider 1516 to reconcile any discrepancies closing the product compartment of the vending store. The reconciliation operation may involve contacting the vending store management entity 1508.

The restocking request may also require that the restocking service provider 1516 remove some of product items from the vending store and restock the removed products into another vending store or ship them to another location, e.g., back to the distributor, another pick-up location, etc. The personnel may be required to confirm removal of the items from the vending store by providing an entry on the user interface. Moreover, the vending store may print a shipping label and a packing slip for shipping the products removed from the store.

Finally, the restocking service provider 1516 close the vending store (block 1616). This usually requires, at a minimum, physical closure of the access doors of the vending store. It may also require entering information related to the stocking on the vending store's user interface. For example, the restocking service provider 1516 may be required to enter inventory information and receive further directions on stocking designated product units. During a subsequent communication session, the vending store uploads to the store network management application 504, for example, information identifying which packages were received, their confirmed contents, any damages, and other relevant details. An integration process uses the received information in the store network management application 504 to update the ERP module 508. In specific embodiments, the process includes updating the perpetual inventory, creating exceptions if the inventory sent does not match the inventory received, and other operations In some cases, a vending store may have not been able to communicate with the store network management application 504 to learn about expected packages before they are received. In these circumstances, the above process may be modified. For example, if a package the restocking service provider 1516 has received is not listed at the vending store where the provider 1516 attempt to stock it (operation 1614), the restocking service provider 1516 may be required to enter this information manually. The vending store then communicates with the store network management application 504 and synchronizes the inventory data and, if appropriate, the stocking requests.

Figure 17:
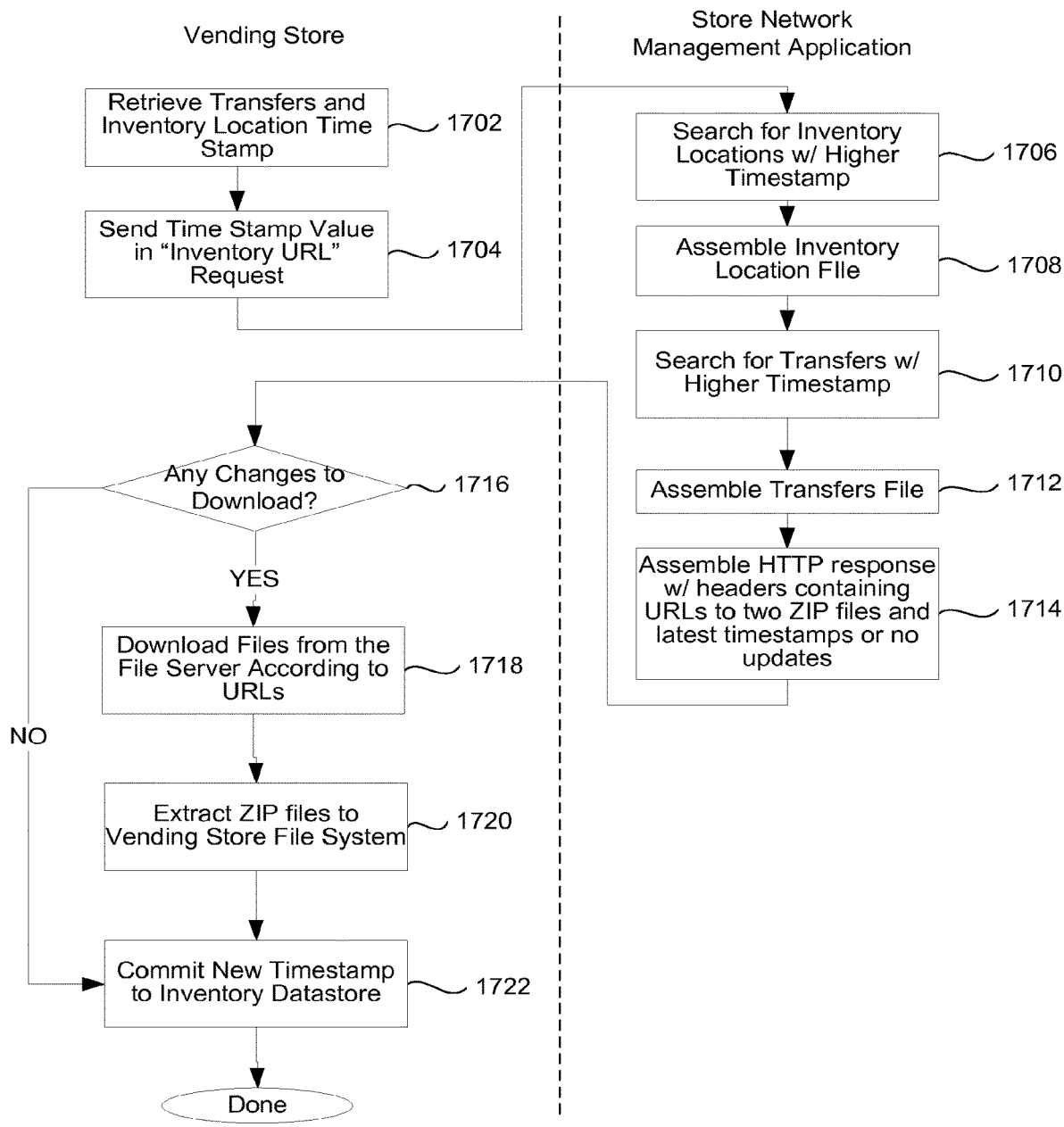
FIG. 17 illustrates a process of delivering inventory information during a communication session.

FIG. 17 illustrates an example process of delivering inventory transfer and inventory locations information during a communication session. In certain embodiments, this process corresponds to the download inventory objects operation 634 in the overall host-sync communication session described in the context of FIG. 6B. The depicted embodiment employs a database (e.g., the data store 510) on the store network management application 504 side to track new and modified objects identifying (1) valid inventory locations and (2) transfers between such locations. Specifically, the inventory locations objects provide a list of every valid location a transfer could be coming from or going to. These objects also identify whether a location is a distribution center, another vending store, or any other inventory carrying entity. The most recent information on inventory locations is useful to the restocking service provider 716, for example, to initiate inventory transfer from a vending store to another inventory location. The vending store will provide all available and possible locations for sending the items to. In certain embodiments, the inventory locations information may also include information on product types that correspond to this location. The information may also be specific to a brand owner or shared among various brand owners. For example, one distribution center may service products associated with multiple brand owners. The transfer object includes information about any incoming shipment from other inventory locations and requests for moving inventory from the store to another inventory location. The transfer information may be presented to the restocking service provider 716 during the restocking operation for the provider to verify the contents of the incoming packages, reporting any discrepancy, damages, etc.

The process depicted in FIG. 17 allows the data center 502 to ensure that the vending store has the most up to date inventory locations objects and transfers objects. When a vending store synchronizes with the data center 502, it sends its most recent timestamp values for the inventory and transfer objects in its database. This allows the data center 502 to query for changes on its side. Details of the specific process of FIG. 9 will now be presented.

When a vending store initiates a communication session, it first retrieves a value for transfer and inventory location timestamp (operation 1702) from its database. Typically, this value would correspond to the most recent successful completion of this entire process. The vending store then sends this time stamp value to the store network management application 504 as a part of an Inventory URL request (block 1704). The store network management application 504 receives the requests and initiates a search in its data for an inventory locations time stamp value that is higher than that provided by the vending store (operation 1706). If such inventory locations timestamp value is found, the application then assembles a first file (e.g., a zip file) with the inventory location information (operation 1708). The file may include the most recent information including all available inventory locations. In certain embodiments, the file includes only the update information, e.g., only new or changed locations. In other embodiments, the file includes all locations. Sometimes, the file may include inventory locations that only correspond to this vending store based on certain parameters, such as product types, brand ownership. The store network management application 504 proceeds with searching for another time stamp value, one corresponding to the transfers, that is higher than the one provided by the vending store (block 1710). If such transfer timestamp value is found, the application then assembles another file (e.g., a zip file) with the transfers information (operation 1712). The file may include all incoming shipments scheduled for this vending store, requests to transfer certain products from this store to other vending stores, etc. The store network management application 504 proceeds with compiling a response (e.g., an HTTP response in a web-based system) with (optionally) headers including URLs for the two files and the latest time stamp value (operation 1714). If the store network management application 504 has not found a higher value timestamp for either object (inventory locations objects and transfers objects), then the corresponding files are not assembled and no URL is provided (e.g., a "no updates" response is sent). Therefore, an HTTP response may include no URLs, one URL for one file corresponding to either the inventory locations object or the transfer object, or both URLs.

The vending store receives the response and performs a verification step to determine whether any changes are required (operation 1716). In certain embodiments, the vending store checks for the URL presence. If at least one URL is present, then the vending store proceeds with downloading the files from the file server of the data center 502 in operation 1718. In this situation, the vending store ensures that the downloaded files are not corrupt, and then extracts the downloaded files to the vending store file system 440 in operation 1720. The process continues with the vending store committing a new time stamp (received from the data center 502) to the appropriate location (block 1722). Similarly, if it has been identified in operation 1716 that there are no changes to download, the vending store commits a new time stamp (received from the data center 502) to the appropriate location (block 1720).

Figure 18:
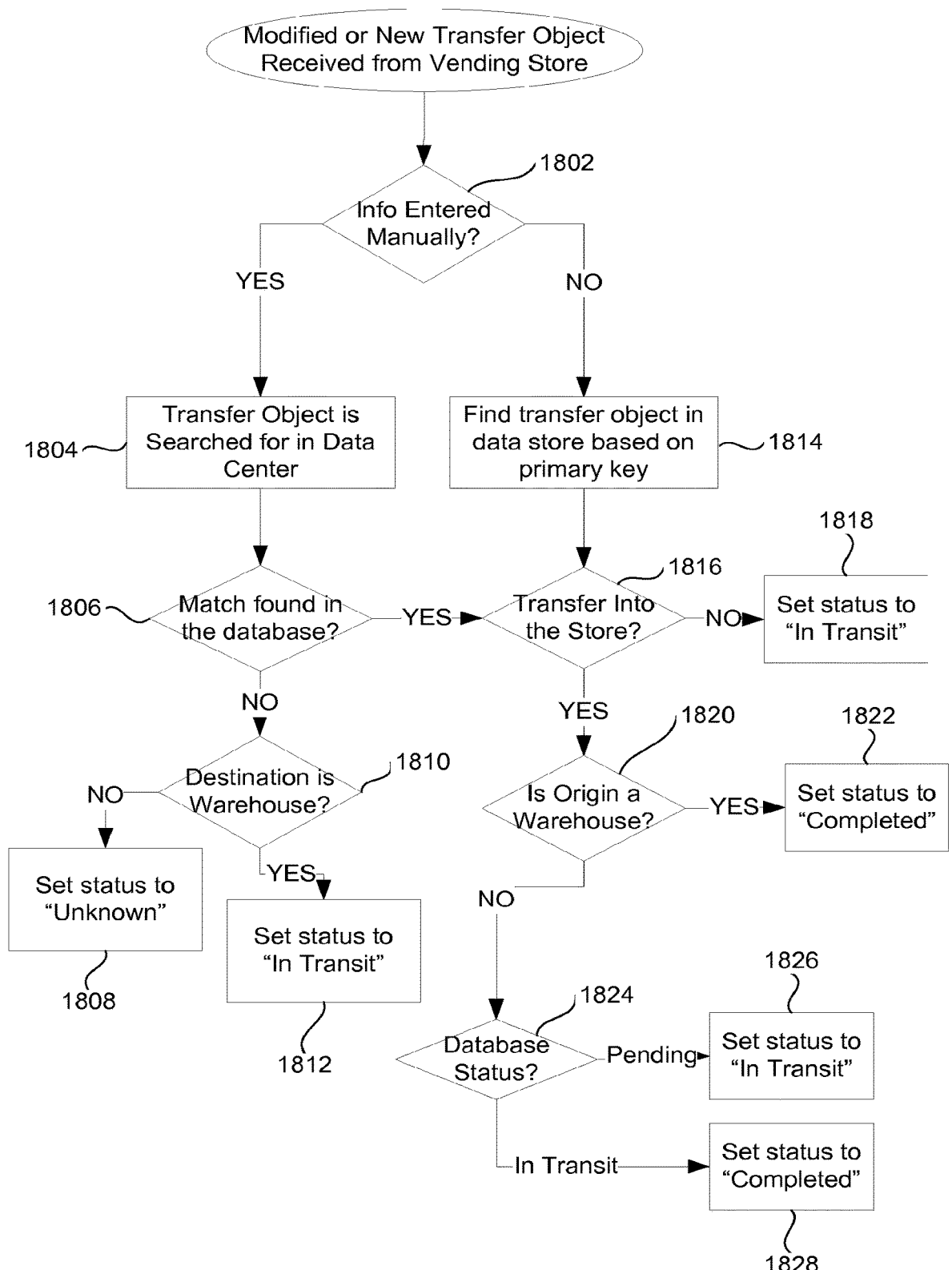
FIG. 18 illustrates a process of the store network management application updating its inventory data store based on information received from the vending stores.

FIG. 18 illustrates a process of the store network management application 504 updating its inventory data store based on information received from one or more vending stores. One of the operations during the communication session between the vending store and the data center 502 may include the vending store sending newly created transfer objects as well as modifications to the transfer objects that have been originally received from the store network management application 504. This may occur, for example, during the upload of model objects 626 described in the context of FIG. 6B. The store network management application 504 then processes the transfer objects according to the information included in these objects and in the data stores.

The process may start with the store network management application 504 examining all received transfer objects to determine whether the restocking service provider 716 entered the information corresponding to the transfer object manually on the user interface or the information was selected them from the list corresponding to one of the expected transfers (block 1802). For example, a vending store may receive a transfer object during one of the previous communication sessions. The information corresponding to this object may be then displayed on the user interface of the vending store and selected by the stocking personnel to match the shipment to this store. Alternatively, the restocking service provider 7161 may indicate that the received package does not match any information corresponding to the transfer objects currently available at the vending store. In this case, the vending store may allow the restocking service provider 716 to enter new information creating a new transfer object.

All transfer objects that correspond to selections from the list made by the restocking service provider 716 are then looked up by the store network management application 504 in its data store 510 in operation 1814. In certain embodiments, a primary key may be used for the search, such as a row identification or any other suitable identifier. The primary key may be unique for each transfer object to ensure the match. Thus, every transfer object created by the store network management application 504 and then uploaded to the vending store may be identified unambiguously. The store network management application 504 then checks whether the transfer object corresponds to the inventory coming into the vending store or going out of the vending store (block 1816). If the transfer is not going into the store, meaning the transfer is going from this vending store into another inventory location (e.g., a warehouse or another vending store), then the transfer object is marked "in transit" (block 1818). Various status labels and fields, such as "pending", "completed", "in transit", and "unknown" may be used for real-time reporting, so that an interested party of the distribution chain may gather various inventory information, e.g., package location. The status field can also be used in an integration process, since it could track inventory location and be the basis for reporting.

If the transfer object corresponds to the inventory moved into the vending store, then the store network management application 504 continues with checking whether the originating location of the inventory was a warehouse or another vending store (block 1820). If the inventory came from a warehouse, then it has reached its final destination (e.g., a package was sent from the warehouse and was loaded into the vending store that has provided the transfer object to the data center), and the transfer can be marked as "completed" (block 1822). If the inventory came from another vending store, then the store network management application 504 continues with checking whether the current status of this transfer is "pending" or "in transit" (block 1824). If the status is "pending", which means that the transfer was not initiated at the time the original status was set, then the status is updated to "in transit" (block 1826). If the status is already "in transit", which means that the package had left the originating store, then the status is now changed to "completed" to indicate that it has been received into the destination store (block 1828).

If the transfer object indicates that the information was entered manually (the decision block at 1802 was answered in the affirmative), then the store network management application 504 looks up the transfer object in its data store using various identifiers, such as a transfer number, a package tracking number, or any other suitable identifier (block 1804). If the store network management application 504 finds the origin of the transfer object in its data store 510, then it indicates that the transfer object should have appeared in the vending store list at the time of stocking the shipment. Sometimes a vending store may fail to establish communication with the data center and may be restocked with items from a new shipment before receiving the transfer object corresponding to these items. In this case, the process continues with verification of whether the transfer was designated to go into this vending store or out of the store (block 1816). Other operations then follow as described above. If the transfer object cannot be located by the store network management application 504 in the data store 510, then the application continues with checking whether the transfer is designated to a warehouse (block 1810). If a warehouse is designated as a destination point, then the store network management application 504 sets the status to "in transit", which means the transfer is an inventory return initiated by the restocking service provider (block 1812). This transfer may be then added to the ERP module 508 during the next integration process between the ERP module 508 and the store network management application 504. If the transfer is designated to a warehouse (i.e., not an inventory return), then its status is set to "unknown" (block 1808). The transfers with "unknown" statuses may be resolved manually as a part of a separate process.

F. Data Collection and Reporting

A network system may be configured to generate various reports for vending store operators and brand owners. A vending store operator may set a number of standard reports that include the most typical data available on or from the vending stores corresponding to a specific brand owner and/or retailer. Examples of such reports include sales and inventory snapshots, business review reports, and sale per product compartment. For example, a vending store operator may provide a daily report indicating previous day sales and inventory for each store. A more comprehensive report may be sent on a weekly basis and include, e.g., historical sales data (e.g., sales per machine over the last four weeks) for each product, sales mix percentages, inventory information (e.g., inventory remaining at the end of a period, the anticipated number of weeks of supply, put-of-stock, in-stock, and in transit). Higher level reports may include performance tracking as related to established goals, comparable performance to other stores, individual store sales and margins, sales per items and overall statistics for each items, average selling prices, unique user sessions (i.e., when a new customer touches the screen after the store enters the idle mode), and conversions. For example, a brand owner may be supplied with a report for each vending store assigned to the brand owner that indicates: a number of days since the last sale, a price of the mostly recently sold item, a percentage of items that are currently in stock, a number of items that are out of stock, and various data points for a predetermined period (e.g., total sales, a number of transactions, a number of user sessions, a conversion rate, an abandonment rate, a number and a rate of card reader errors). The data may be presented in a form of dash boards indicating both the current data and the trends, reports varying in types and granularity of data, and other formats appropriate for each particular user.

Other types of report may inform vending store operators and brand owners about network status and availability (e.g., number of hours certain stores or supporting data centers have been down), mis-vend reports (e.g., specific transactions where purchased items were not vended), and survey information and analysis reports (e.g., gathered information and application of business analytics). For example, a brand owner may be updated how many surveys were completed relative to the total number of the transactions on one or more vending stores and various data collected in the surveys (e.g., gender, age group, purpose of shopping, ethnicity, income level, evaluation of the transaction experience, last purchase information, suggested improvements, e-mail, zip code, and other information. In certain embodiments, information collected in the surveys is combined with information obtained from sensors, payment processing, and other ways to develop a report. FIGS. X and Y illustrates two examples of reports in accordance with certain embodiments.

Figure 19:
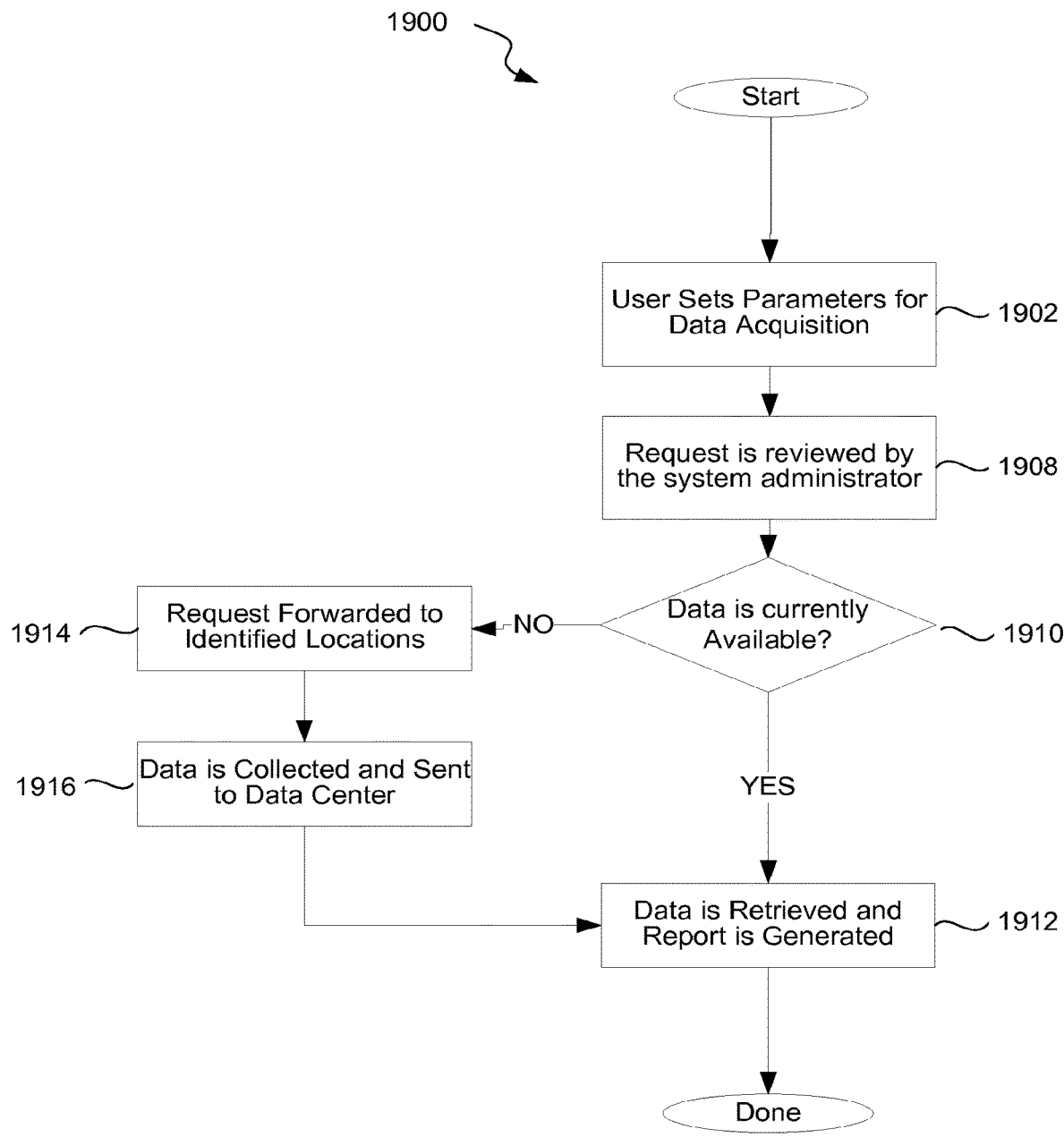
FIG. 19 illustrates an example of a general process flow chart for data collection using vending stores and presentation of the collected data to various entities of the networked system.

FIG. 19 illustrates a example of a general workflow or process flow chart for collecting data from different components of a networked system and presenting this data to authorized users. Such data may be collected by vending stores and may include, e.g., sales, inventory, consumer interactions, loyalty programs details, store availability (e.g., a period when a given store was operational during a predetermined period divided by the total number of retail hours in the period), store configuration, etc. As discussed above, such data may include sales data, inventory data, and/or customer interaction data. Data associated with consumer interactions include, for example, abandonment rate (i.e., the percentage of potential customers that start the purchase process (e.g., by providing at least one item in a shopping cart at a vending store) but do not complete a purchase), conversion rate, number of specific inquires at a user interface, proximity sensor response, and many other data points described in other parts of this document.

Collection and reporting of the data (collectively, "data management" in the context of this application) in the networked system may be centrally controlled, e.g. by the data center 502. The data center 502 may include a designated application for data management or may incorporate data management functions into one of the existing applications, such as the collaborative administrative application 506 or the store network management application 504. Any form of software or logic implementation is generically referred to as a "data application."

In certain embodiments, the data application requires that a user provide user identification or authentication information before accessing the application and/or the data available via the application. The application uses this information to determine an access level and, in certain embodiments, services available to the identified user.

Vending store management entity 708 can use the data application and various components of the networked system to provide various data collection options. For example, the entity may specifically configure a vending store's hardware (e.g., install or activate additional sensors) and/or software (e.g., identify data collection points or triggers during a user's interaction with a user interface).

Once the user is identified and the corresponding access level is determined, the user may be presented with one or more interfaces of the data application, such as an interface for requesting new data, an interface for searching available data, an interface for viewing data, an interface for reporting data, an interface for running reports, and/or other interfaces.

The data requesting interface is used to set various parameters for data collection (see block 1902). For example, the interface may have multiple fields to identify data types and other data parameters (e.g., time periods and/or specific vending stores) and to select presentation formats and delivery options. Optionally, the completed request may be reviewed by a system administrator or another appropriate reviewer (block 1908) to determine whether the requested data is being routinely collected, whether collecting requested data would require changes in hardware and/or software configurations, or any other potential issues associated with executing the request. In certain embodiments, the data application itself or another module of the data center 502 performs an automated review. The reviewer may then address the issues and notify the requestor.

In some cases, the requested data may be available only through a change in hardware and/or software configuration of the corresponding vending stores, then the reviewer may enter a work order for such changes or deny the request. For example, a user may request information on how many times a particular product page has been viewed by customers on the user interface of a particular vending store. Such request does not involve hardware configuration changes but requires the computer system of the vending store to register and report back to the data center 502 how many times the file corresponding to the particular product page has been invoked by the servlets of the web-server and then applets of the browser. As described above, the store network management application 504 provides software configuration updates to vending stores. The data application may deliver a request to the store network management application 504 to change software configurations of the vending store in order to enable collection of the requested data.

The data application may then review the requested data to determine whether it is immediately available from one or more of data stores (block 1910). It should be noted that, in some embodiments, the data availability determination 1910 is performed before the request review operation 1908. In some implementations, the network system may be configured to routinely collect and store some frequently requested data, such as sales, inventory, and vending store configurations. Such data may be retained for a predetermined period, such as 10 years, 1 year, 1 month, or 1 week. If the data application determines that the requested data is immediately available, then it retrieves the requested data and generates a report (block 1912). The report may be generated based on one or more templates provided by a user or system administrator.

If the requested data is not immediately available, then the data application generates a request for collecting the requested data from the corresponding elements of the networked system (block 1914). The requested data may come from one ore more of various resources available on the network. For example, inventory reconciliation data may come from the 3PL services 518, restocking service providers 716, and vending stores 100a-c. The requested data is then collected and communicated back to the data center 502 in operation 1916. Finally, the requested data is reported to the user (block 1912) as described above.

Surveys and Testimonials

Figure 20:
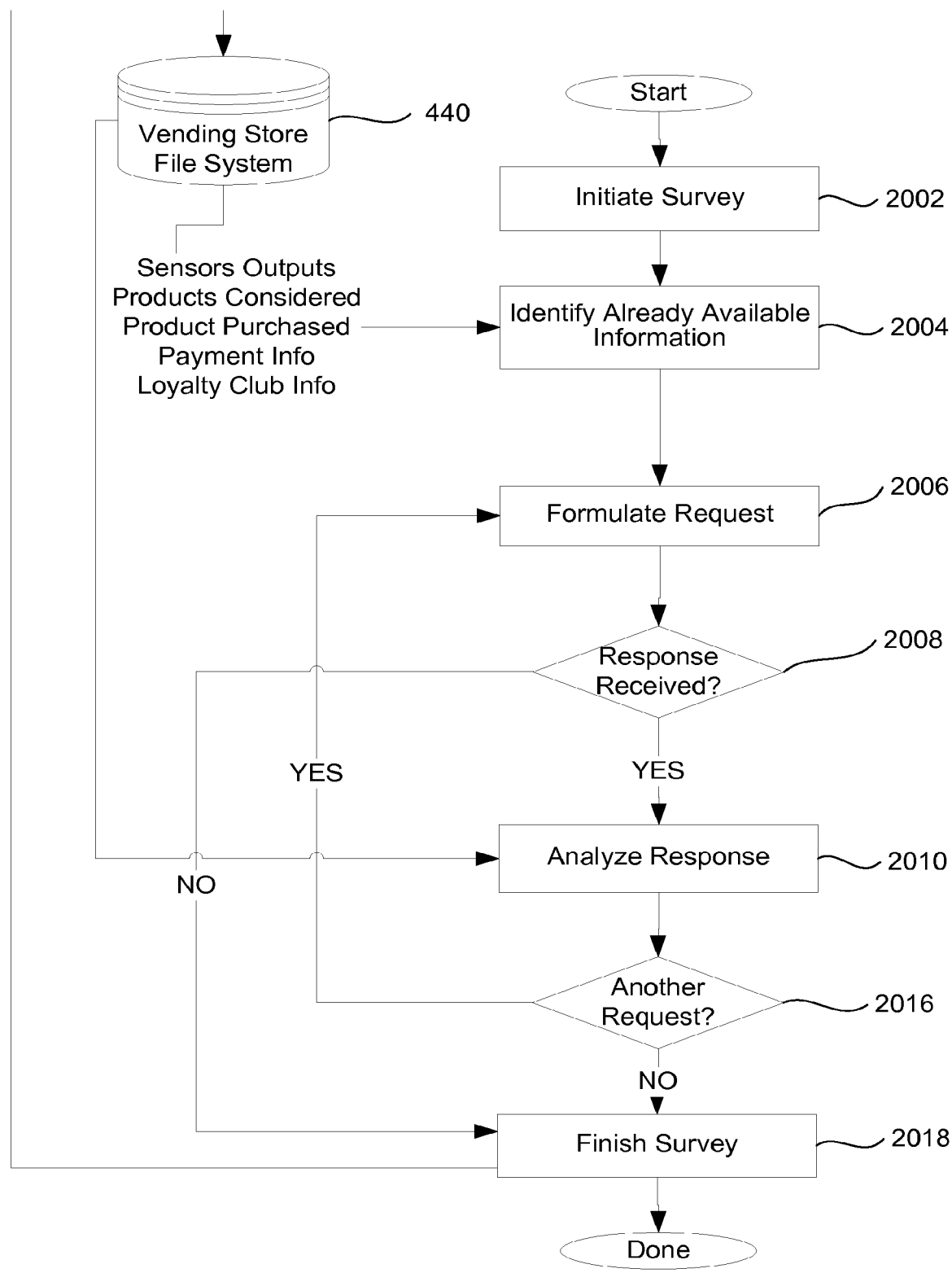
FIG. 20 is a general process flowchart for providing customer surveys based on sensor outputs and other information available to the vending store in accordance with certain embodiments.

FIG. 20 illustrates an example of a general process of surveying customers using vending store's user interface, sensor outputs, and other functionality available to the vending store. In accordance with certain embodiments, the vending store may suggest a customer to take a survey at any time during customer's interaction with the store (block 2002). For example, a survey may be offered at the beginning of a potential customer's interaction with a vending store in order to identify a customer's preferences and to tailor the rest of the interaction to the responses provided in the survey. Alternatively, the survey may be offered at the end of the interaction process (e.g., after the payment is completed) to gather customer's feedback on the process and use such feedback in future marketing efforts. In certain embodiments, in return for participating in a survey, a vending store may offer various incentives to the customer, such as discounts, coupons, samples, etc.

Once a customer elects to proceed with a survey, the computer system may identify any information about the customer or the transaction that is already available (block 2004). The information may include stored data about the customer or newly acquired information, e.g., information collected by vending store sensors during the customer's present interaction with the vending store. In some cases, the customer's prior interactions with the user interface, (e.g., catalog and product pages viewed, product items selected and added to the shopping cart) may be used. Further, the customer's personal information (e.g., membership in the loyalty club, payment information, contact information) may be considered at block 2004. The vending store may also gather information from other components of the networked system, such as the data center. All sources of information may, in certain embodiments, be used to customize the survey. Identifying available information eliminates redundant data gathering and allows customizing surveys that may lead to more effective information gathering and provide a generally positive experience for customers during surveying.

In the depicted embodiment, the computer system formulates questions for the survey at a block 2006. As indicated, the questions may make use of available information. Question may be tailored to products selected, products viewed, experiences with vending store operation, etc. After the questions are formulated and provided to the customer for response, the computer system may be configured to wait for the customer to respond for a predetermined period of time (block 2008). Depending on the mode of survey, the customer may respond using one ore more input devices provided on a vending store, e.g., a touch screen, a keyboard, a joystick, a computer mouse, a voice recognition system, etc.

If no response is received, the computer system may ask whether a customer needs additional time to respond and then wait for another predetermined period time. Eventually, if no response is received, the computer system aborts the survey and completes the process (block 2018). Alternatively, if a response is received, the computer system may acknowledge the receipt of the response and proceed with analyzing the response (block 2010). Responses may be used to generate specific questions or tailor follow on questions. The system then determines whether another request for information (e.g., a question) should be provided (block 2016). If so, the system repeats operations 2006, 2010, and 2016 as described above.

If no additional requests for information are identified as a part of the survey, then the computer system may finish the survey session (block 2018). The system may analyze the information provided in the survey and previously made available to the system. Furthermore, the system may issue incentives to the customer for taking the survey. The survey information may also be used to recommend additional products and services. In the depicted embodiment, the results of the survey are then uploaded to the data center.

Survey results may be reported using the survey screenshots. For example, a user interface may have indications of certain inputs (e.g., button areas on a touch screen). In the report, these indications may be overlaid with frequencies of the corresponding inputs (e.g., a percentage of selecting a particular input relative to all available input options). Some examples of such reports are presented in FIGS. 21A-E.

Digital Apparatus

As should be apparent, various embodiments of the present invention employ processes acting under control of instructions and/or data stored in or transferred through one or more computer systems. Embodiments of the present invention also relate to apparatus for performing these operations. Such apparatus may be specially designed and/or constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein. In some cases, however, it may be more convenient to construct a specialized apparatus to perform the required method operations. A particular structure for a variety of these machines will appear from the description given below.

In addition, embodiments of the present invention relate to computer readable media or computer program products that include program instructions and/or data (including data structures) for performing various computer-implemented operations. Examples of computer-readable media include, but are not limited to, magnetic media such as those conventionally deployed in disk drives; optical media such as CD-ROM devices and holographic devices; magneto-optical media; semiconductor memory devices, and hardware devices that are specially configured to store and perform program instructions, such as read-only memory devices (ROM) and random access memory (RAM), and sometimes application-specific integrated circuits (ASICs), programmable logic devices (PLDs) and signal transmission media for delivering computer-readable instructions, such as local area networks, wide area networks, and the Internet. The data and program instructions of this invention may also be embodied on a tangible transport medium or a tangible storage medium.

Examples of program instructions include both low-level code, such as produced by a compiler, and files containing higher level code that may be executed by the computer using an interpreter. Further, the program instructions include machine code, source code and any other code that directly or indirectly controls operation of a computing machine in accordance with this invention. The code may specify input, output, calculations, conditionals, branches, iterative loops, etc.

Any controller or computer optionally includes a monitor. Computer circuitry is deployed in one or more confined systems, each of which includes integrated circuit chips, such as a microprocessor, memory, interface circuits, and others. The system also optionally includes a hard disk drive, a high capacity removable drive such as a writeable CD-ROM, semiconductor memory, and other common peripheral elements. Inputting devices, such as a keyboard, microphone, and/or mouse, optionally provide for input from a user and for user selection of sequences to be compared or otherwise manipulated in the relevant computer system.

The computer typically includes appropriate software for receiving user instructions, either in the form of user input into a set parameter fields, e.g., in a GUI, or in the form of preprogrammed instructions, e.g., preprogrammed for a variety of different specific operations. The software then converts these instructions to appropriate language for instructing the system to carry out any desired operation.

Figure 22:
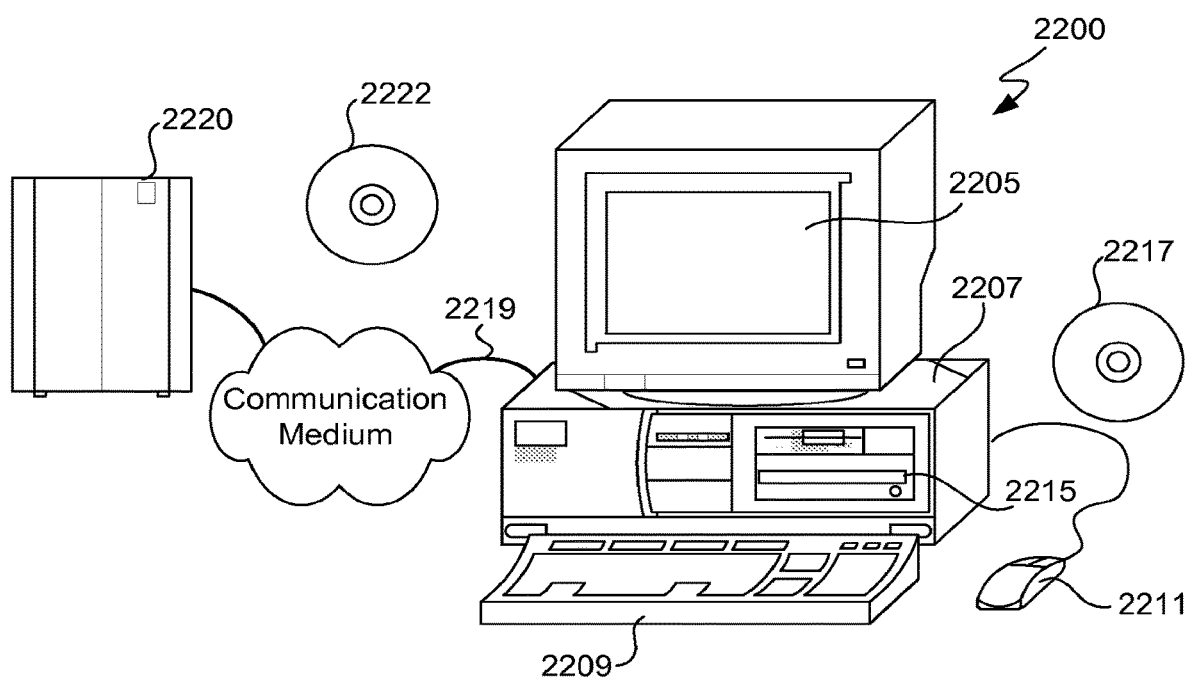
FIG. 22 illustrates an example digital apparatus in accordance with certain embodiments.

In one example, code embodying methods of the invention are embodied in a fixed media or transmissible program component containing logic instructions and/or data that when loaded into an appropriately configured computing device causes the device to perform various operations described in this document. FIG. 22 shows an example digital apparatus 2200 that should be understood to be a logical apparatus that can read instructions from media 2217, network port 2219, user input keyboard 2209, user input 2211 or other inputting means. One type of logical apparatus that can embody the invention is a computer system as in computer system 2200 comprising CPU 2207, optional user input devices keyboard 2209, and GUI pointing device 2211, as well as peripheral components such as disk drives 2215 and monitor 2205. Fixed media 2217 is optionally used to program the overall system and can include, e.g., a disk-type optical or magnetic media or other electronic memory storage element. Communication port 2219 can be used to program the system and can represent any type of communication connection.

The invention can also be embodied within the circuitry of an application specific integrated circuit (ASIC) or programmable logic device (PLD). In such a case, the invention is embodied in a computer readable descriptor language that can be used to create an ASIC or PLD. The invention can also be embodied within the circuitry or logic processors of a variety of other digital apparatus, such as handheld computational devices (e.g., PDAs), laptop computer systems, network terminals, displays, image editing equipment, etc.

Other Embodiments

In certain embodiments, a data center is configured to interface via a computer network with a plurality of vending stores, at least one of which is configured to vend a plurality of different products and has data collection and data processing capabilities. The data center includes a data store configured to store information about the plurality of different products including a planogram depicting a product layout for the at least one vending store. The data center also includes an administrative application for controlling analysis and/or presentation of product information pertaining to the plurality of different products provided in the at least one vending store configured to vend the plurality of different products. The data center also includes a network interface and associated logic for communicating with the plurality of vending stores and for communicating the product information to and/or from the at least one vending store configured to vend the plurality of different products.

In any one or more of the above data center embodiments, at least one of the plurality of different products includes content for download to a storage medium associated with a customer. In any one or more of these data center embodiments, the content includes entertainment content; and/or the content includes content selected from the group consisting of audio content, video content, and game content; and/or the storage medium associated with a customer is part of a portable player.

In any one or more of the above data center embodiments, at least one of the plurality of different products includes a tangible product having a value of at least about $20 US. At least two different products of the plurality of different products may be products of two different brand owners. At least one of the plurality of different products may be a tangible product and another of the plurality of different products may include content for download to a storage medium.

In certain embodiments, a method is implemented at a data store in communication with the plurality of vending stores, at least one of which is configured to vend a plurality of different products and has data collection and data processing capabilities. The method may include receiving information about the plurality of different products, preparing a planogram depicting a product layout for the at least one vending store, generating a product presentation for at least two of the plurality of different products (which product presentation provides separate information about each of the at least two different products and allows user interface navigation to each of these products), and deploying the product presentation on the at least one vending store. In any one or more of the above method embodiments, the data center includes a network interface and associated logic for communicating with the plurality of vending stores and for communicating the product information to and/or from the at least one vending store configured to vend the plurality of different products. Further, in one or more of the above method embodiments, the data center includes an administrative application for controlling analysis and/or presentation of product information pertaining to the plurality of different products provided in the at least one vending store configured to vend the plurality of different products.

In certain embodiments, a data center is configured to interface via a computer network with a plurality of vending stores, where each vending store has data collection and data processing capabilities, includes a data store configured to store information about the plurality of different products and the plurality of vending stores, an administrative application for defining which products will be vended by the vending stores and for providing product presentations to be displayed on a user interface of the vending stores, and a network interface and associated logic for communicating with the plurality of vending stores. In any one or more of these data center embodiments, the administrative application includes functionality for controlling analysis and/or presentation of product information on at least one of the vending stores, which product information pertains to a plurality of different products provided in the at least one of vending store. In one or more of the above data center embodiments, the data center also includes functionality allowing a data center operator and a brand owner or retailer to collaboratively design a planogram depicting a product layout for the at least one vending store. The collaboration may involve a collaboration between an vending store network operator and the retailer or brand owner. Further, in one or more of the above data center embodiments, the functionality allows the data center operator and the brand owner or retailer to collaboratively design one or more planograms depicting one or more product layouts for the at least two vending stores to be networked with the data center.

In some of the above embodiments, the data center further includes functionality allowing a data center operator, a brand owner, a retailer, or two or more of these to design a product presentation. The data center may also include functionality allowing a data center operator, a brand owner, a retailer, or two or more of these to set up merchant accounts. Furthermore, the data center may also include functionality allowing a data center operator, a brand owner, a retailer, or two or more of these to define a supply chain process, functionality allowing a data center operator, a brand owner, a retailer, or two or more of these to set up a loyalty program, functionality allowing a data center operator, a brand owner, a retailer, or two or more of these to provide call center support, and/or functionality for providing product presentations to the at least one vending store configured to vend the plurality of different products.

In certain embodiments, a method is implemented at a data store in communication with the plurality of vending stores (where each vending store has data collection and data processing capabilities) and the method includes receiving information about the plurality of different products and the plurality of vending stores, determining which products will be vended by the vending stores, providing product presentations to be displayed on a user interface of the vending stores, and communicating with the plurality of vending stores.

In certain embodiments, a computer implemented method for defining and programming operating parameters of a plurality of vending stores (where at least one of which is configured to vend a plurality of different products and each vending store has data collection, data processing, and network interface capabilities) includes receiving via a computer interface information and/or instructions from a vending store system operator and a separate retailer or brand owner and processing, via one or more computers, said information and/or instructions to define and program the following operating parameters: at least two product presentations for the different products to be vended from each of the plurality vending stores, a set of planograms, at least one for each of the vending stores, and back end integration parameters for the plurality of vending stores.

In one or more of the above computer implemented method embodiments, the back end integration parameters include two or more parameters selected from the group consisting of merchant accounts, accounting software tools, supply monitoring and control instructions or software, and loyalty program monitoring and reporting features. In the same or other embodiments, the processing said information and/or instructions is performed on a collaborative administrative application, which provides separate access to said operating parameters for the vending store system operator and the retailer or brand owner.

In certain embodiments, a networked system for vending products to customers includes a data center and a plurality of vending stores remotely locating from the data center. The data center may include one or more data stores for storing product data characterizing the products and a collaborative administrative application configured to allow two or more independent entities to collaboratively create, edit, and/or review the product data and to use product data to produce product presentations. The collaborative administrative application may be configured to restrict access to users of product data based on identification information provided to the collaborative administrative application. The application may also be configured to allow a system administrator to review and change the product data. The application may include templates for organizing the product data into a format suitable for displaying on the user interface.

In any one or more of the above embodiments, each vending store in the plurality of vending stores includes a user interface for displaying the product presentations to potential customers and allowing customers to select the products for immediate purchase and to tender a payment for the products, a storage space for storing the products, an automated dispensing mechanism for dispensing the products from the storage space to a customer, and a network interface for connecting to the data center and downloading the product presentations to at least one of the plurality of vending stores. The user interface may be used to display a subset of the product data. The vending store may be configured to display a selected part of the subset of the product data based on the customer's input.

In any one or more of the above embodiments, the data center is configured to receive and report data from the plurality of the vending stores and wherein the data include or more of the following: sales, inventory, conversion rate, abandonment, and/or store availability.

In any one or more of the above embodiments, one or more of the plurality of vending stores is configured to communicate with a loyalty club membership system, via the network interface, to retrieve membership information based on the customer's input. Further, one or more of the plurality of vending stores may include a mechanism to automatically retrieve information from a gift card reader. In some of these embodiments, the vending store is configured to communicate, via the network interface, the gift card information to a payment center.

In any one or more of the above embodiments, one or more of the plurality of vending stores further includes an audio input and an audio output. In some of these embodiments, the one or more vending stores is configured to communicate with a call center via the network interface using the audio input and the audio output. Further, one or more of the plurality of vending stores may include a video input and a video output, and these stores may be configured to communicate with a call center via the network interface using the video input and the video output.

In any one or more of the above embodiments, the storage space of one or more of the plurality of vending stores has at least two compartments for storing the products having different values, and the compartment for storing the higher-valued items has more restrictive access than the compartment for storing the less-restrictive items.

One or more of the plurality of vending stores may be configured to verify the identity of restocking personnel before granting access into the storage space by performing a technique, such as receiving a code input on the user interface, scanning an access card, receiving biometric data, and capturing images, and comparing the gathered information with access authorization information received from the data center.

In any one or more of the above embodiments, the automated dispensing mechanism in at least one of the plurality of vending stores is configured to identify a number and a type of product dispensed. The automated dispensing mechanism may include a bar-code scanner and/or an RFID scanner to verify the product type.

In any one or more of the above embodiments, at least one of the plurality of vending stores is configured to connect, via the network interface, to an antifraud system to authenticate the payment for the product.

In certain embodiments, a vending store for vending products to customers includes a network interface configured for connecting the vending store to a data center through a network, a computer system comprising a user interface configured to display product information to the customers and to receive input from the customers, an automated dispensing mechanism controlled by the computer system and used for dispensing the products from a storage space to the customers, and a sensor for sensing a customer action and/or a customer parameter and sending a sensor output representing the customer action and/or a customer parameter to the computer system. The computer system may be configured to process the sensor output and to create a report for uploading to the data center.

In any one or more of the above vending store embodiments, the sensor output includes a value identifying a number of people passed through a sensed area adjacent to the vending store. For examples, a vending store further may include a front side including the user interface. The sensed area may extend between about 3 and 12 feet from the front side. In certain embodiments, the sensed area extends between about 3 and 12 feet from the user interface.

In any one or more of the above vending store embodiments, the sensor is an infrared beam sensor or a computer vision sensor. The sensor output may represent a distance between a customer and the vending store. The sensor output may be analyzed by the computer system over a time period to determine whether a customer departs from the store. The sensor output may represent a gender, a race, or an age of a customer that interacts with the vending store. The sensor output may include biometric information.

In any one or more of the above vending store embodiments, the computer system compares the sensor output with information received from the data center for personal identification of a user that provided the biometric information. The vending store may also include a front side including the user interface and wherein the sensor is a video camera configured to capture a front-side video image. For example, the computer system may analyze the front-side video image to determine accuracy of product arrangements in the product storage space.

In any one or more of the above vending store embodiments, the vending store also includes a product display window, wherein the sensor is configured to track customer's eye motion or points of gaze, and wherein the sensor output comprises identification of a product item that the customer is looking at.

The vending store may be configured to highlight the product item that the customer is looking at. For example, a storage area of the vending store may include a number of lights each focused on the individual storage compartment. Depending on customer's focus one of the light is turned on to highlight the corresponding product item.

In any one or more of the above vending store embodiments, the vending store also includes a product display window. The sensor may be configured to sense customer's touch of the product display window, while the sensor output may include identification of a product item that the customer is pointing at. In any one or more of the above vending store embodiments, the sensor is a video camera capturing a video image of the customers interacting with the user interface or retrieving the products from the automated dispensing mechanism. Further, in the same or other embodiments, the computer system is configured to select the product information for display on the user interface based on the sensor output.

In any one or more of the above vending store embodiments, the computer system is configured to initiate a call to a call center when the sensor output indicates that a customer departs from the store. For example, a sound volume corresponding to the product information may be adjusted based on the sensor information.

Conclusion

Although the foregoing invention has been described in some detail for purposes of clarity of understanding, it will be apparent that certain changes and modifications may be practiced within the scope of the appended claims. It should be noted that there are many alternative ways of implementing the processes, systems and apparatus of the present invention. Accordingly, the present embodiments are to be considered as illustrative and not restrictive, and the invention is not to be limited to the details given herein.

What is claimed is:

1. A vending store, comprising:
   a processor; and
   a memory communicatively coupled to the processor and storing instructions that, when executed by the processor, perform operations, comprising:
   causing activation of a user interface provided on a housing of the vending store;
   receiving input provided to the user interface, the input indicating a selection of an item;
   causing a vended product to be dispensed from the vending store;
   receiving, from a dispensing sensor, information corresponding to the vended product in response to the dispensing sensor scanning the vended product;
   comparing the information corresponding to the vended product to the input associated with the selection of the item; and
   when the information corresponding to the vended product does not match the input associated with the selection of the item:
     transmitting a refund indication to a payment system associated via a network connection; and
     transmitting, via the network connection, inventory data to a remote computing device.

2. The system of claim 1, wherein the vending store comprises a motion sensor.

3. The system of claim 2, further comprising instructions for causing the motion sensor to track movement of associated with an individual.

4. The system of claim 1, further comprising instructions for:
   receiving an indication from a proximity sensor in the housing indicating an individual is within a distance from the vending store; and
   in response to receiving the indication from the proximity sensor, activating the user interface.

5. The system of claim 1, further comprising instructions for:
   receiving an indication from an inventory sensor; and
   using the received inventory indications to send the inventory data to the remote computing device.

6. The system of claim 5, wherein the inventory sensor is an RFID system.

7. The system of claim 1, further comprising instructions for receiving, via a microphone associated with the vending store, a voice command.

8. The system of claim 1, further comprising instructions for causing a sensor associated with the vending store to perform a facial recognition process on an individual.

9. A method, comprising:
   causing activation of a user interface associated with a vending machine;
   receiving input provided to the user interface, the input indicating a selection of an item;
   causing a vended product to be dispensed from the vending store;
   receiving, from a dispensing sensor, information corresponding to the vended product in response to the dispensing sensor scanning the vended product;
   comparing the information corresponding to the vended product to the input associated with the selection of the item; and when the information corresponding to the vended product does not match the input associated with the selection of the item:
transmitting a refund indication to a payment system associated via a network connection; and
transmitting, via the network connection, inventory data to a remote computing device.

10. The method of claim 9, further comprising receiving an indication of a voice command from a microphone associated with the vending machine.

11. The method of claim 9, further comprising receiving a stocking personnel indicator from a stocking input.

12. The method of claim 9, further comprising receiving a stocking personnel indicator from a stocking input, wherein the stocking input is a fingerprint reader and the personnel indicator is a fingerprint.

13. The method of claim 9, further comprising receiving a stocking personnel indicator from a stocking input, wherein the stocking input is a card reader and the personnel indicator is an ID card.

14. The method of claim 9, wherein the vending machine comprises a motion sensor.

15. The method of claim 14, further comprising receiving an indication, from the motion sensor, of movement associated with an individual.

16. The method of claim 9, further comprising performing a facial recognition process prior to dispensing the vended product.

17. The method of claim 9, further comprising:
receiving an indication from a proximity sensor associated with the vending machine that an individual is within a distance from the vending machine; and
in response to receiving the indication from the proximity sensor, causing activation of the user interface.

18. The method of claim 9, further comprising:
receiving an indication from an inventory sensor; and
using the received inventory indications to send the inventory data to the remote computing device.

19. A method, comprising:
receiving information corresponding to a selection of an item housed within a vending machine;
causing the item to be dispensed from the vending machine;
determining, based on information provided from a dispensing sensor, information about the item in response to the dispensing sensor scanning the item;
comparing the information about the item to the information corresponding to the selection of the item; and
when the information corresponding to the selection of the item does not match the information about the item, transmitting, via a network connection:
inventory data to a remote computing device; and
a refund indication to a payment system.

20. The method of claim 19, wherein the selection of the item is based, at least in part, on input provided on a user interface associated with the vending machine.

* * * * *